United States Patent
Nakajima et al.

(10) Patent No.: US 8,713,598 B2
(45) Date of Patent: Apr. 29, 2014

(54) ELECTRONIC DEVICE AND CONTROL METHOD THEREIN

(75) Inventors: Shinji Nakajima, Kanagawa (JP); Yasuhisa Nakajima, Kanagawa (JP)

(73) Assignee: Sony Corporation (JP)

( * ) Notice: Subject to any disclaimer, the term of this patent is extended or adjusted under 35 U.S.C. 154(b) by 1081 days.

(21) Appl. No.: 12/284,675

(22) Filed: Sep. 24, 2008

(65) Prior Publication Data

US 2009/0089850 A1 Apr. 2, 2009

(30) Foreign Application Priority Data

Sep. 28, 2007 (JP) ................................ P2007-255670

(51) Int. Cl.
- *H04N 7/10* (2006.01)
- *H04N 5/455* (2006.01)
- *H04N 7/18* (2006.01)
- *G06F 3/00* (2006.01)

(52) U.S. Cl.
USPC .................. 725/32; 725/52; 725/80; 715/723

(58) Field of Classification Search
None
See application file for complete search history.

(56) References Cited

U.S. PATENT DOCUMENTS

| 7,394,499 | B2 | 7/2008 | Okamoto et al. |
| 7,728,712 | B2 * | 6/2010 | Girgis et al. .................. 340/7.48 |
| 2002/0178445 | A1 * | 11/2002 | Eldering et al. ................. 725/32 |
| 2003/0223377 | A1 * | 12/2003 | Simmons et al. ............. 370/254 |
| 2004/0221311 | A1 * | 11/2004 | Dow et al. ........................ 725/52 |
| 2006/0140452 | A1 * | 6/2006 | Raynor et al. ................ 382/115 |
| 2008/0151113 | A1 * | 6/2008 | Park .............................. 348/500 |

FOREIGN PATENT DOCUMENTS

GB 2210526 A * 6/1989 ............... H03J 5/00
WO WO-02/078336 A1 10/2002

* cited by examiner

*Primary Examiner* — Jason J Chung
*Assistant Examiner* — James R Marandi
(74) *Attorney, Agent, or Firm* — Lerner, David, Littenberg, Krumholz & Mentlik, LLP

(57) ABSTRACT

An electronic device is disclosed. A signal transmission section transmits a video signal to an external device in a differential signal via a transmission path over a plurality of channels. A communication section executes bidirectional communication using a predetermined line constituting the transmission path. A signal reception section receives stream data received from the external device through the communication section, the stream data having been obtained by a broadcast reception section of the external device. An image analysis section executes image analysis on the stream data received by the signal reception section. A control section controls an operation of at least one of own electronic device and the external device based on a result of analysis obtained by the image analysis section.

15 Claims, 31 Drawing Sheets

TMDS TRANSMISSION DATA STRUCTURE

FIG. 9

HDMI PIN ARRANGEMENT (TYPE-A)

| PIN | SIGNAL ASSIGNMENT | PIN | SIGNAL ASSIGNMENT |
|---|---|---|---|
| 1 | TMDS DATA2+ | 2 | TMDS DATA2 SHIELD |
| 3 | TMDS DATA2− | 4 | TMDS DATA1+ |
| 5 | TMDS DATA1 SHIELD | 6 | TMDS DATA1− |
| 7 | TMDS DATA0+ | 8 | TMDS DATA0 SHIELD |
| 9 | TMDS DATA0− | 10 | TMDS CLOCK+ |
| 11 | TMDS CLOCK SHIELD | 12 | TMDS CLOCK− |
| 13 | CEC | 14 | RESERVED (N.C. ON DEVICE) |
| 15 | SCL | 16 | SDA |
| 17 | DDC/CEC GROUND | 18 | +5V POWER |
| 19 | HOT PLUG DETECT | | |

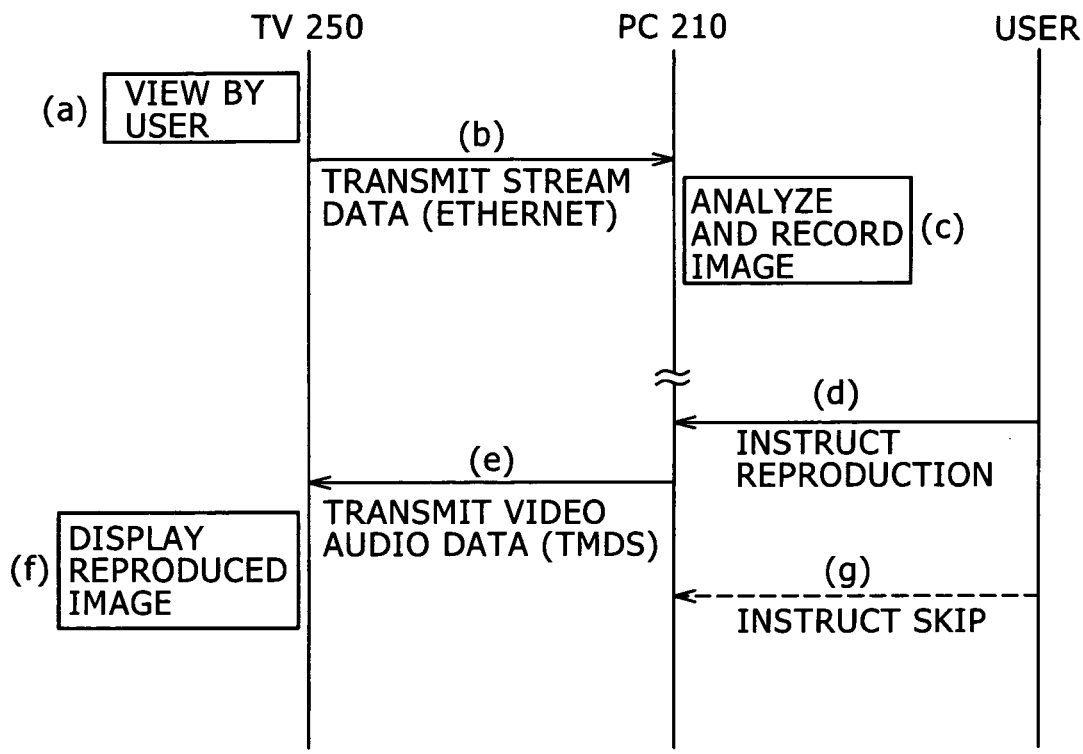
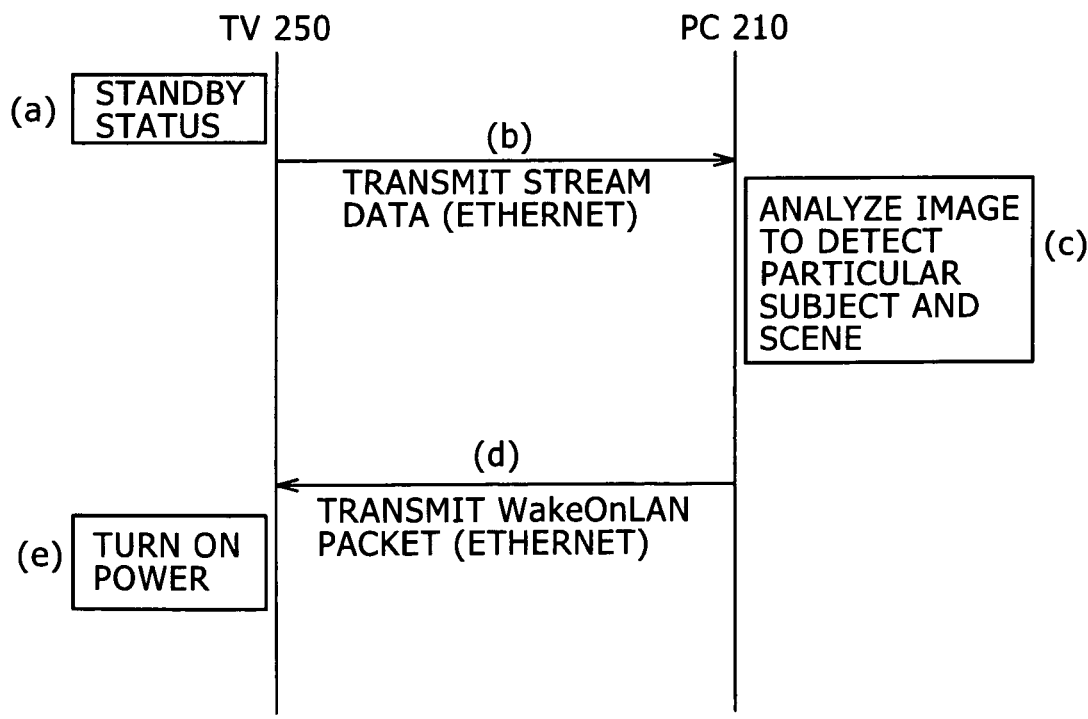

FIG. 24

| Byte# | 7 | 6 | 5 | 4 | 3 | 2 | 1 | 0 |
|---|---|---|---|---|---|---|---|---|
| 0 | Vendor-specific tag code (=3) | | | Length (=N) | | | | |
| 1...3 | 24bit IEEE Registration Identifier (0x000C03) LSB first | | | | | | | |
| 4 | A | | | | | B | | |
| 5 | C | | | | | D | | |
| 6 | Supports-AI | DC_48bit | DC_36bit | DC_30bit | DC_Y444 | Reserved (0) | Reserved (0) | DVI-Dual |
| 7 | Max_TMDS_Clock | | | | | | | |
| 8 | Latency | Full Duplex | Half Duplex | Reserved (0) | | | | |
| 9 | Video Latency | | | | | | | |
| 10 | Audio Latency | | | | | | | |
| 11 | Interlaced Audio Latency | | | | | | | |
| 12 | Interlaced Audio Latency | | | | | | | |
| 13...N | Reserved (0) | | | | | | | |

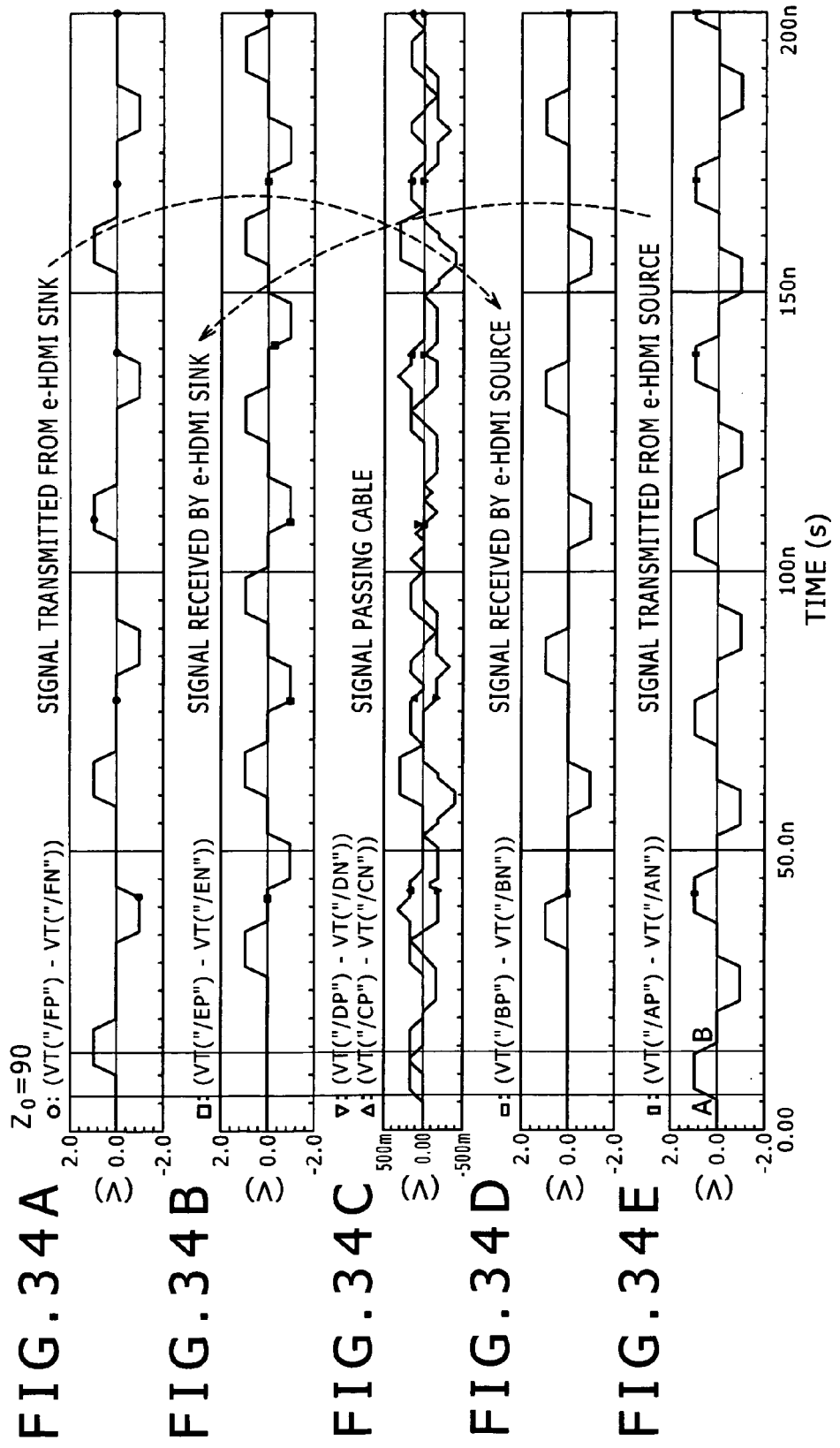

ELECTRONIC DEVICE AND CONTROL
METHOD THEREIN

CROSS REFERENCES TO RELATED
APPLICATIONS

The present application claims priority from Japanese Patent Application JP No. 2007-255670 filed in the Japan Patent Office on Sep. 28, 2007, the entire content of which is incorporated herein by reference.

BACKGROUND OF THE INVENTION

1. Field of the Invention

The present invention relates to an electronic device, such as a personal computer, for example. To be more specific, the present invention relates to an electronic device that is a transmission apparatus for transmitting video signals to an external device via a transmission path, in which stream data obtained by a broadcast reception section of this external device is received therefrom through a communication section for executing bidirectional communication by use of a predetermined line constituting the transmission path, image analysis is executed on the received stream data, and an operation of at least own electronic device or the external device is controlled on the basis of results of the image analysis, thereby providing an effective utilization of image analysis performance.

2. Description of the Related

Recently, HDMI (High Definition Multimedia Interface) has been gaining popularity as a high-speed transmission communications interface configured to transmit at high speeds digital video signals, namely, non-compressed (or baseband) video signals (hereafter referred to as image data) and digital audio signals (hereafter referred to as audio data) accompanying the image data from AV (Audio Visual) sources including a DVD (Digital Versatile Disc) recorder and a set-top box to display devices including a television receiver and a projector, for example. PCT Patent Publication No. WO2002/078336 describes details of the HDMI standard, for example.

SUMMARY OF THE INVENTION

In the case of an AV system connected with a television receiver and a digital camera via an HDMI cable, for example, the CEC standard allows control to a degree of turning on/off the power to and increase and decrease of the volume of a television receiver from a digital camera. However, the CEC standard does not specify complicated operations (displaying of a home menu screen and a program guide and switching of television settings and receiving channels, for example) on the side of a television receiver, so that these operations cannot be controlled from the digital camera side, thereby requiring the user to operate the remote controller or controls on the television receiver side.

For example, an AV system is possible in which a television receiver and a personal computer are interconnected with an HDMI cable. In this configuration, it is desired to use a relatively excellent user interface of the personal computer side to allow the user to execute the above-mentioned complicated operations with ease. In addition, in this configuration, it would be convenient if image analysis capabilities of the personal computer can be effectively used.

It should be noted that the user interface of the personal computer side includes not only hardware interface such as a keyboard and a mouse connected to the personal computer in a wired or wireless manner, but also graphic user interface (GUI) displayed on a personal computer screen.

Therefore, the present invention addresses the above-identified and other problems associated with related-art methods and apparatuses and solves the addressed problems by providing an electronic device and a control method for the electronic device that are configured for the effective use of the image analysis capabilities of a personal computer and the like connected to a television receiver, for example.

According to an embodiment of the present invention there is provided an electronic device including:

a signal transmission section configured to transmit a video signal to an external device in a differential signal via a transmission path over a plurality of channels;

a communication section configured to execute bidirectional communication by use of a predetermined line constituting the transmission path;

a signal reception section configured to receive stream data received from the external device through the communication section, the stream data having been obtained by a broadcast reception section of the external device;

an image analysis section configured to execute image analysis on the stream data received by the signal reception section; and a control section configured to control an operation of at least one of own electronic device and the external device on the basis of a result of analysis obtained by the image analysis section.

According to another embodiment of the present invention there is provided a control method in an electronic device having a signal transmission section for transmitting a video signal to an external device in a differential signal via a transmission path over a plurality of channels, including the steps of:

arranging a communication section for executing bidirectional communication by use of a predetermined line constituting the transmission path;

receiving stream data from the external device through the communication section, the stream data having been obtained by the broadcast reception section of the external device;

executing image analysis on the received stream data; and controlling an operation of at least one of an operation of own electronic device and an operation of the external device on the basis of a result of analysis obtained by the image analysis.

BRIEF DESCRIPTION OF THE DRAWINGS

FIG. 9 is a schematic diagram illustrating a pin arrangement (type A) of an HDMI terminal;

FIG. 11 a sequence diagram illustrating an exemplary operation sequence in which a predetermined program received by the television receiver is recorded and reproduced by the personal computer;

FIG. 12 is a sequence diagram illustrating an exemplary operation sequence in which the television is powered on when a particular subject (a person or an object) or a particular scene is detected from a predetermined program being received by the television receiver (in a standby status);

FIG. 24 is a schematic diagram illustrating a structure of E-EDID vendor-specific data block;

FIGS. 34A through 34E are waveform diagrams illustrating bidirectional communication waveforms.

DETAILED DESCRIPTION OF THE PREFERRED EMBODIMENTS

Figure 1:
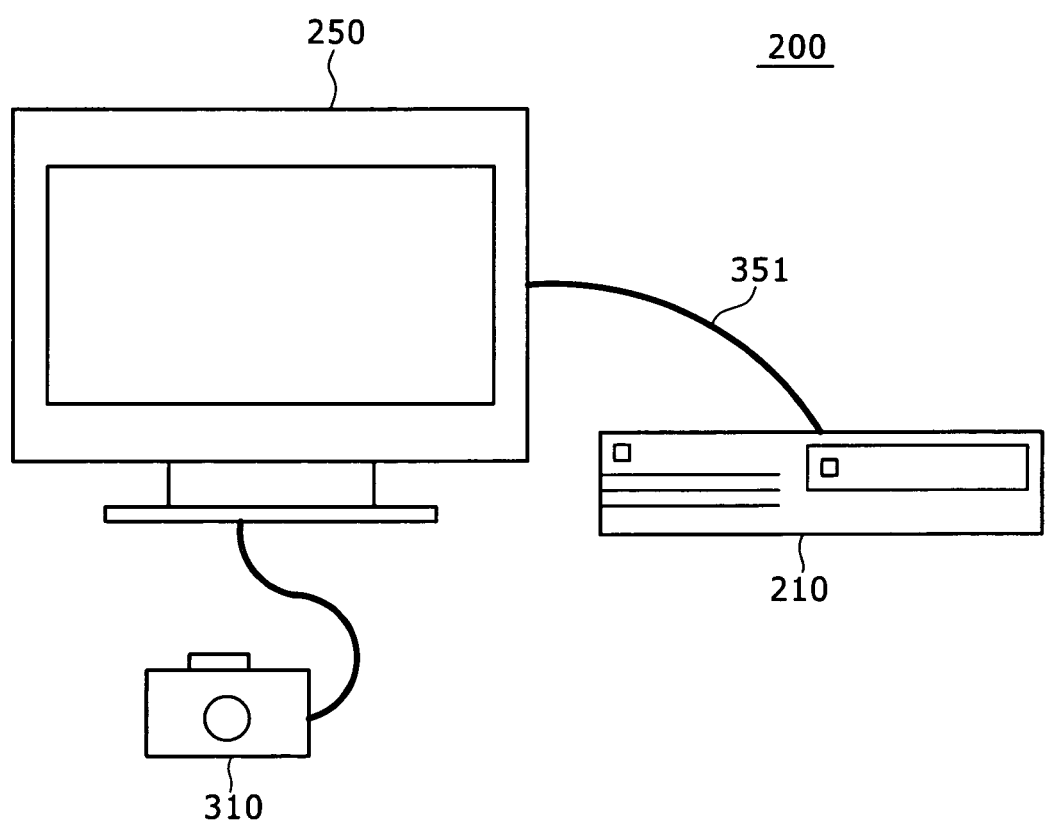
FIG. 1 is a block diagram illustrating an exemplary configuration of an AV system practiced as one embodiment of the invention.

The present invention will be described in further detail by way of embodiments thereof with reference to the accompanying drawings. Now, referring to FIGS. 1 and 2, there are shown exemplary configurations of an AV (Audio Visual) system 200 practiced as one embodiment of the invention. The AV system 200 has a personal computer 210 as a source device, a television receiver 250 as a sink device, and a digital camera 310 as a source device.

The personal computer 210 and the television receiver 250 are interconnected with an HDMI cable 351. The personal computer 210 has an HDMI terminal 211 connected with an HDMI transmission section (HDMI TX) 212 and a high-speed data line interface (I/F) 213. The television receiver 250 has an HDMI terminals 251 and 254 connected with HDMI reception sections (HDMI RX) 252, 255 and high-speed data line interface (I/F) 253, 256. One end of the HDMI cable 351 is connected to the HDMI terminal 211 of the personal computer 210 and one end of the HDMI cable 351 is connected to the HDMI terminal 251 of the television receiver 250.

The television receiver 250 and the digital camera 310 are interconnected with the HDMI cable 352. The digital camera has an HDMI terminal 311 connected with an HDMI transmission section (HDMI TX) 312 and a high-speed data line interface (I/F) 313. One end of the HDMI cable 352 is connected to the HDMI terminal 311 of the digital camera 310 and the other end of the HDMI cable 352 is connected to an HDMI terminal 254 of the television receiver 250.

Figure 3:
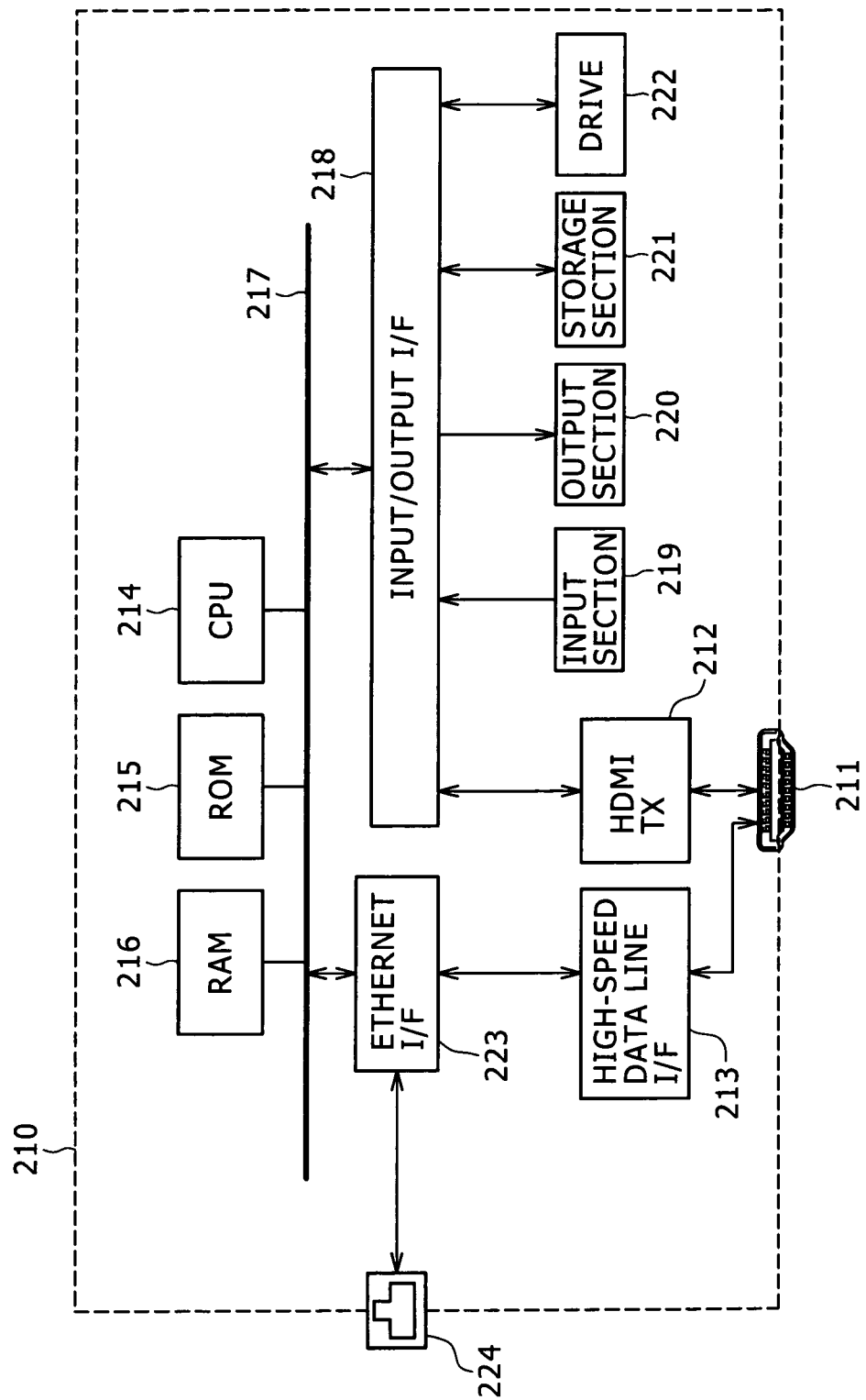
FIG. 3 is a block diagram illustrating an exemplary configuration of a personal computer (or a source device) constituting the AV system shown in FIG. 1.

FIG. 3 shows an exemplary configuration of the personal computer 210. The personal computer 210 has the HDMI terminal 211, the HDMI transmission section 212, the high-speed data line interface 213, a CPU (Central Processing Unit) 214, a ROM (Read Only Memory) 215, a RAM (Random Access Memory) 216, a bus 217, an input/output interface 218, an input section 219, an output section 220, a storage section 221, a drive 222, an Ethernet interface (I/F) 223, and a network terminal 224. It should be noted that "Ethernet" is a registered trademark.

With the personal computer 210, the CPU 214, the ROM 215, and the RAM 216 are interconnected via the bus 217. Further, the bus 217 is connected with the input/output interface 218. The input/output interface 218 is connected with the input section 219, the output section 220, the storage section 221, the drive 222, and the HDMI transmission section 212.

The input section 219 is made up of a keyboard, a mouse, and a microphone, or the like. The output section 220 is made up of a display, and a loudspeaker, or the like. The storage section 221 is made up of a HDD (Hard Disk Drive), a nonvolatile memory, or the like. The drive 222 is configured to drive a magnetic disk, an optical disk, a magneto-optical disk, a memory card, and other removable media.

The bus 217 is connected with the Ethernet interface 223. The Ethernet interface 223 is connected with the network terminal 224 and the high-speed data line interface 213. The high-speed data line interface 213 is a bidirectional interface that uses a predetermined line (a reserved line or an HPD line in this embodiment) making up the HDMI cable. Details of this high-speed data line interface 213 will be described later.

With the personal computer 210 configured as shown in FIG. 3, the CPU 214 loads a program stored in the storage section 221 into the RAM 216 via the input/output interface 218 and the bus 217 and executes the loaded program, thereby executing a series of processing operations to be described later.

Figure 4:
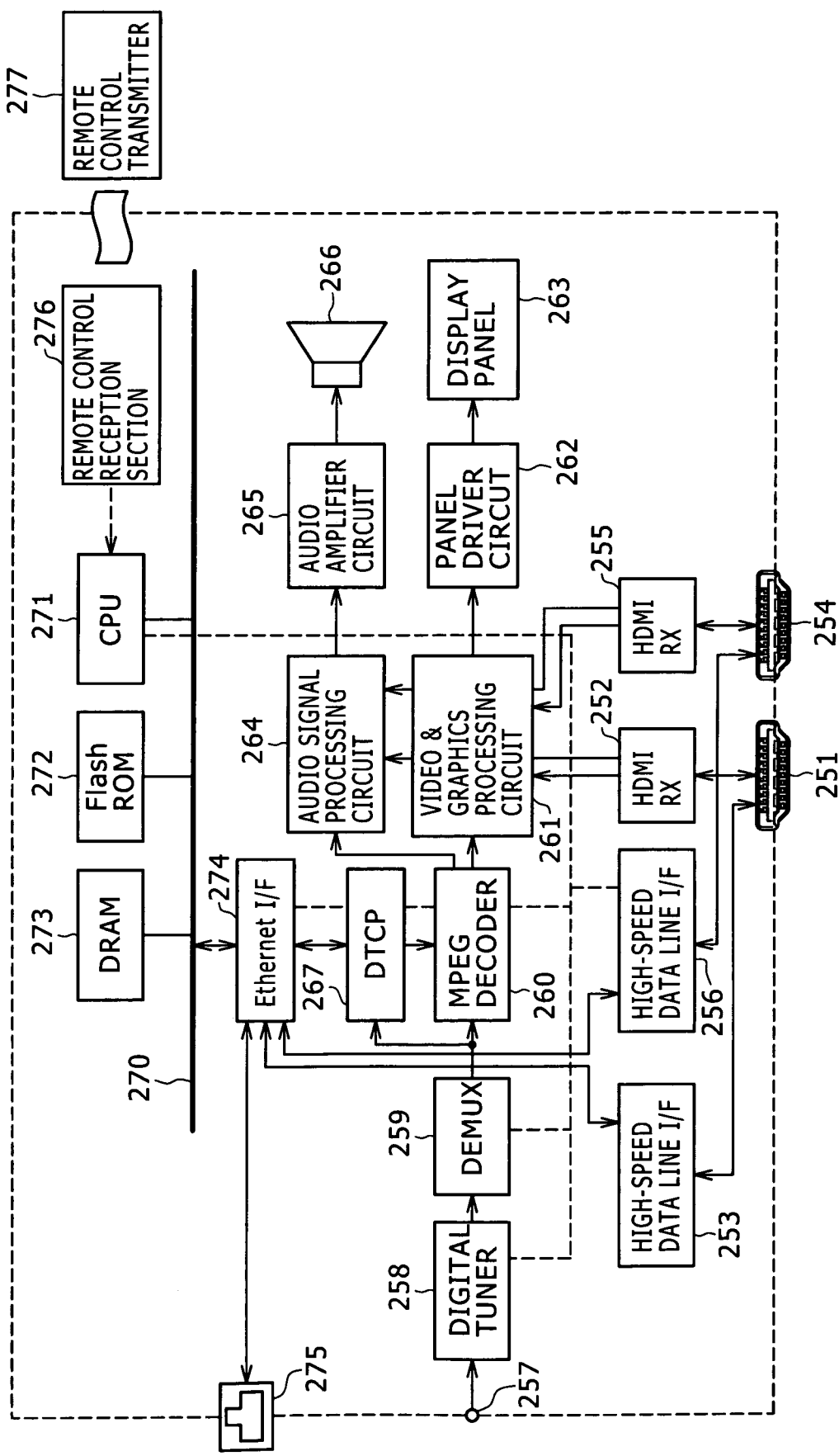
FIG. 4 is a block diagram illustrating an exemplary configuration of a television receiver (or a sink device) constituting the AV system shown in FIG. 1.

FIG. 4 shows an exemplary configuration of the television receiver 250. The television receiver 250 has HDMI terminals 251, 254, HDMI reception sections 252, 255, high-speed data line interfaces 253, 256, an antenna terminal 257, a digital tuner 258, a demultiplexer 259, an MPEG (Moving Picture Expert Group) decoder 260, a video & graphics processing circuit 261, a panel driver circuit 262, a display panel 263, an audio signal processing circuit 264, an audio amplifier circuit 265, a loudspeaker 266, a DTCP circuit 267, an internal bus 270, a CPU 271, a flash ROM 272, a DRAM 273, an Ethernet interface (I/F) 274, a network terminal 275, a remote control reception section 276, and a remote control transmitter 277.

The antenna terminal 257 is a terminal at which a television broadcast signal received by an reception antenna (not shown) is entered. The digital tuner 258 processes the television broadcast signal received through the antenna terminal 257 and outputs a predetermined transport stream corresponding to a user-selected channel. The demultiplexer 259 extracts a partial TS (Transport Stream) (namely, a TS packet of video data and a TS packet of audio data) corresponding to the user-selected channel from the transport stream obtained by the digital tuner 258.

The demultiplexer 259 also extracts PSI/SI (Program Specific Information/Service Information) from the transport stream obtained by the digital tuner 258 and outputs the extracted PSI/SI to the CPU 271. The transport stream obtained by the digital tuner 258 is multiplexed with two or more channels. The processing of extracting a partial TS on a given channel from the transport stream by the demultiplexer 259 is enabled by obtaining the packet ID (PID) information of that channel from the PSI/SI (PAT/PMT). It should be noted that the digital tuner 258 and the demultiplexer 259 make up a broadcast reception section.

The MPEG decoder 260 executes decoding on a video PES (Packetized Elementary Stream) packet made up of a TS packet of video data obtained by the demultiplexer 259, thereby obtaining video data. Also, the MPEG decoder 260 executes decoding on an audio PES packet made up of a TS packet of audio data obtained by the demultiplexer 259, thereby obtaining audio data. It should be noted that the MPEG decoder 260 executes decoding on the video and audio PES packets decoded by the DTCP circuit 267, thereby obtaining video and audio data, as required.

The video & graphics processing circuit 261 executes multiscreen processing and graphics data superimposition processing on the video data obtained by the MPEG decoder 260, as required. The panel driver circuit 262 drives the display panel 263 on the basis of the audio data outputted from the video & graphics processing circuit 261. The display panel 263 is made up of an LCD (Liquid Crystal Display), a PDP (Plasma Display Panel), or the like. The audio signal processing circuit 264 executes D/A conversion and other necessary processing on the audio data obtained in the MPEG decoder 260. The audio amplifier circuit 265 amplifies an audio signal outputted from the audio signal processing circuit 264 and supplies the obtained audio signal to the loudspeaker 266.

The DTCP circuit 267 encrypts the partial TS extracted by the demultiplexer 259. In addition, the DTCP circuit 267 decrypts the encrypted data supplied from the network terminal 275 or the high-speed data line interface (I/F) 253 to the Ethernet interface 274.

The CPU 271 controls the operation of each component of the television receiver 250. The flash ROM 272 stores control software and data. The DRAM 273 constitutes a work area for use by the CPU 271. The CPU 271 expands the software and data read from the flash ROM 272 into the DRAM 273 to start the software, thereby controlling each component of the television receiver 250. The remote control reception section 276 receives a remote control signal (a remote control code) supplied from the remote control transmitter 277 and supplies the received signal to the CPU 271. The CPU 271, the flash ROM 272, the DRAM 273, and the Ethernet interface 274 are connected to the internal bus 270.

The HDMI reception sections (HDMI sink) 252, 255 receive baseband video (image) data and audio data supplied to the HDMI terminals 251, 254. Details of these HDMI reception sections 252, 255 will be described later. The high-speed data line interfaces 253, 256 provide bidirectional communication interfaces by use of a predetermined line (the reserved line and the HDMI cable in this embodiment) constituting the HDMI cable. Details of these high-speed data line interfaces 253, 256 will be described later.

The following briefly describes an operation of the television receiver 250 shown in FIG. 4. A television broadcast signal entered in the antenna terminal 257 is supplied to the digital tuner 258. The digital tuner 258 processes the received television signal to output a predetermined transport stream corresponding to a user-specified channel. This transport stream is supplied to the demultiplexer 259. The demultiplexer 259 extracts, from the supplied transport stream, a partial TS (a video data TS packet and an audio data TS packet) corresponding to the user-specified channel, supplying the extracted partial TS to the MPEG decoder 260.

The MPEG decoder 260 decodes the video PES packet made up of the video data TS packet to provide video data. The video & graphics processing circuit 261 executes multiscreen processing and graphics data superimposition processing on this video data, supplying the processed video data to the panel driver circuit 262. Consequently, an image corresponding to the user-specified channel is displayed on the display panel 263.

Also, the MPEG decoder 260 decodes the audio PES packet made up of the audio data TS packet, thereby obtaining audio data. The audio signal processing circuit 264 executes necessary processing, such as D/A conversion, on this audio data. The audio amplifier circuit 265 amplifies the processed audio data and supplies the amplified audio data to the loudspeaker 266. Consequently, the sound corresponding to the user-specified channel is outputted from the loudspeaker 266.

In transmitting the partial TS extracted by the demultiplexer 259 to a network or a high-speed data line configured by a predetermined line of an HDMI cable to be described later at the time of receiving a television broadcast signal, this partial TS is encrypted by the DTCP circuit 267 before being supplied to the network terminal 275 or the high-speed data line interfaces 253, 256 via the Ethernet interface 274.

The remote control reception section 276 receives a remote control code (a remote control signal) from the remote control transmitter 277 and supplies the received remote control code to the CPU 271. If this remote control code is associated with control of the television receiver 250, the CPU 271 controls the television receiver 250 as specified by this remote control code.

In addition, the CPU 271 generates an IP packet that includes a remote control code supplied from the remote control reception section 276. The generated IP packet is outputted to the network terminal 275 via the Ethernet interface 274. At the same time, this IP packet is outputted to the HDMI terminals 251, 254 via the Ethernet interface 274 and the high-speed data line interfaces 253, 256, as required.

The encrypted partial TS that is supplied from the network terminal 275 to the Ethernet interface 274 or from the HDMI terminals 251, 254 to the Ethernet interface 274 via the high-speed data line interfaces 253, 256 is decoded by the DTCP circuit 267 to be supplied to the MPEG decoder 260. Subsequently, the same operation as at the above-mentioned reception of television broadcast signal takes place, in which the image is displayed on the display panel 263 and the sound is outputted from the loudspeaker 266.

A control signal, an operation signal, and a notification signal from an external device that are supplied from the network terminal 275 to the Ethernet interface 274 or from the HDMI terminals 251, 254 to the Ethernet interface 274 via the high-speed data line interfaces 253, 256 are supplied to the CPU 271 via the Ethernet interface 274. On the basis of the received control signal, operation signal, and notification signal, the CPU 271 controls the television receiver 250.

The HDMI reception sections 252, 255 obtain video (image) data and audio data that are entered in the HDMI terminals 251, 254 via the HDMI cable. These video data and audio data are supplied to the video & graphics processing circuit 261 and the audio signal processing circuit 264, respectively. Subsequently, the same operation as at the above-mentioned reception of television broadcast signal takes place, in which the image is displayed on the display panel 263 and the sound is outputted from the loudspeaker 266.

Figure 5:
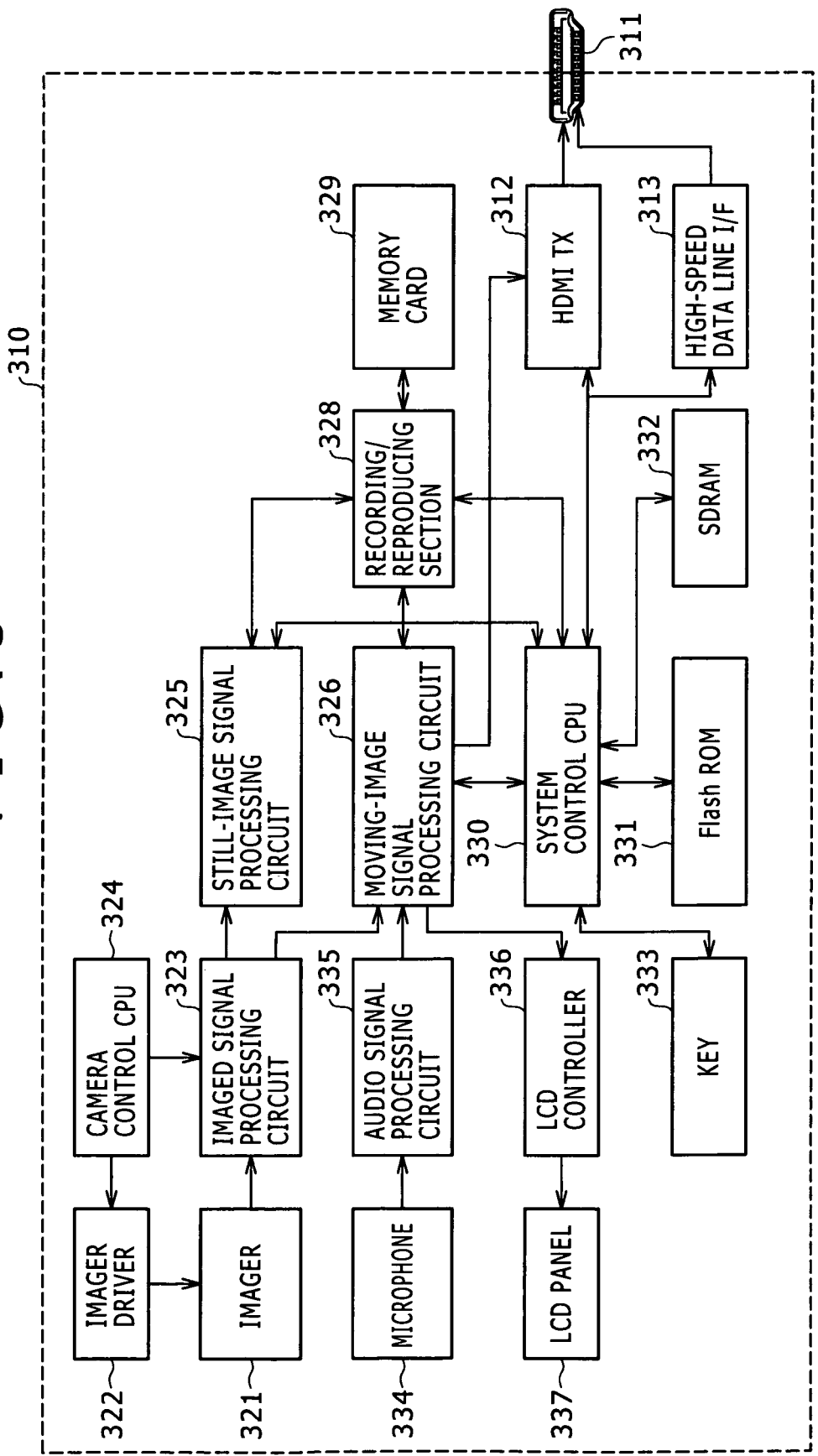
FIG. 5 is a block diagram illustrating an exemplary configuration of a digital camera constituting the AV system shown in FIG. 1.

FIG. 5 shows an exemplary configuration of the digital camera 310. The digital camera 310 has an HDMI terminal 311, ah HDMI transmission section 312, a high-speed data line interface 313, an imager 321, an imager driver 322, an imaged signal processing circuit 323, a camera control CPU 324, a still-image signal processing circuit 325, a moving-image signal processing circuit 326, a recording/reproducing section 328, a memory card 329, a system control CPU 330, a flash ROM 331, an SDRAM 332, a key 333, a microphone 334, an audio signal processing circuit 335, an LCD controller 336, and an LCD panel 337.

The imager 321 is made up of a CMOS imaging element or a CCD imaging element. The imager driver 322 drives the imager 321. The imaged signal processing circuit 323 processes an imaged signal obtained by the imager 321 to generate image data (captured image data) corresponding to a subject of imaging. The camera control CPU 324 controls operations of the imager driver 322 and the imaged signal processing circuit 323.

The still-image signal processing circuit 325 executes compression coding, in JPEG (Joint Photographic Experts Group) for example, on the image data obtained by the imaged signal processing circuit 323 at the time of taking a still image, thereby generating still-image data.

The audio signal processing circuit 335 executes A/D conversion and so on on the audio signal obtained through the microphone 334 to provide the audio data corresponding to the captured image data. The moving-image signal processing circuit 326 executes, at capturing a moving image, compression coding compliant with a recording media format on the image data obtained by the imaged signal processing circuit 323 and the audio data obtained by the still-image signal processing circuit 325, thereby generating moving-image data attached with the audio data.

The recording/reproducing section 328, at the time of capturing a still image, writes the still-image data generated by the still-image signal processing circuit 325 to the loaded memory card 329 or the flash ROM 331 via the system control CPU 330. Also, the recording/reproducing section 328, at the time of capturing a moving image, writes the moving-image data generated by the moving-image signal processing circuit 326 to the loaded memory card 329 or the flash ROM 331 via the system control CPU 330. Further, the recording/reproducing section 328, at the time of reproducing a still image or a moving image, reads moving-image data from the memory card 329 or the like and decodes the moving-image data to provide reproduced image data.

The LCD controller 336 drives an LCD (Liquid Crystal Display) panel 327 on the basis of image data outputted from the imaged signal processing circuit 323 or reproduced image data generated by the recording/reproducing section 328, thereby displaying the captured image (moving image) or the reproduced image (still image or moving image) on the LCD panel 327.

The system control CPU 330 controls operations of the still-image signal processing circuit 325, the moving-image signal processing circuit 326, and the recording/reproducing section 328. The system control CPU 330 is connected with the flash ROM 331, the SDRAM 332, and the key 333. The flash ROM 331 stores control programs and so on for use by the system control CPU 330. The SDRAM 332 temporarily stores the data necessary for the system control CPU 330 to execute control processing thereby.

The key 333 constitutes a user operation unit. The system control CPU 330 determines the operation state of the key 333 to control the operation of the digital camera 310. The user can operate the key 333 to execute an operation of entering various kinds of additional information, in addition to an imaging (recording) operation and a reproducing operation.

By the communication compliant with HDMI, the HDMI transmission section (HDMI source) 312 transmits baseband image (video) and audio data from the HDMI terminal 311 to the HDMI cable. Details of the HDMI transmission section 312 will be described later. The high-speed data line interface 313 is a bidirectional data line interface that uses a predetermined line constituting the MDMI cable. The high-speed data line interface 313 is arranged between the system control CPU 330 and the HDMI terminal 311.

The high-speed data line interface 313 transmits the transmission data supplied from the system control CPU 330, from the HDMI terminal 311 to the HDMI cable. Also, the high-speed data line interface 313 supplies the reception data received from a other device, from the HDMI cable to the system control CPU 330 via the HDMI terminal 311. Details of this high-speed data line interface 313 will be described later.

The following briefly describes an operation of the digital camera 310 shown in FIG. 5. an image signal obtained by the imager 321 is processed by the imaged signal processing circuit 323 to provide image data (captured image data) corresponding to a subject of imaging. At the time of capturing a still image, the still-image signal processing circuit 325 executes compression coding on the image data outputted from the imaged signal processing circuit 323 to provide still-image data. This still-image data is recorded by the recording/reproducing section 328 to the memory card 329, for example.

At the time of capturing a moving image, the moving-image signal processing circuit 326 executes compressing coding compliant with recording media format on the image data outputted from the imaged signal processing circuit 323 and the audio data outputted from the audio signal processing circuit 335, thereby generating moving image data attached with the audio data. This moving image data is recorded by the recording/reproducing section 328 to the memory card 329.

At the time of reproducing a still image, the still image data is read from the memory card 329 for example and this still image data is decoded by the still-image signal processing circuit 325 into reproduced image data. This reproduced image data is supplied to the moving-image signal processing circuit 326 via the system control CPU 330 and the LCD controller 336 to be displayed on the LCD panel 327.

At the time of reproducing a moving image, moving image data is read by the recording/reproducing section 328 from the memory card 329 for example and the moving image data is decoded by the moving-image signal processing circuit 326 into reproduced image data. Then, the reproduced image data is supplied to the LCD controller 326 to be displayed on the LCD panel 327.

In transmitting image and audio data associated with still image data or moving image data recorded to the memory card 329 to an external device, the still image data or moving image data is read from the memory card 329 to be supplied to the still-image signal processing circuits 325, 326, in which decoding and other processing are executed on the supplied image data to provide the baseband image and audio data. Then, the baseband image and audio data are supplied to the HDMI transmission section 312 to be transmitted to the HDMI cable connected to the HDMI terminal 311.

For the HDMI cable connected to the HDMI terminal 311, a transmission line for control data is prepared in addition to the transmission line for video data. The control data transmission data is configured for bidirectional data transmission. Therefore, the HDMI transmission section 312 has a function of receiving control data (control signals) in addition to the function of transmitting video signals. The control data received by the HDMI transmission section 312 is supplied to the system control CPU 330. Also, the control data (control signals) to be transmitted by the HDMI transmission section 312 is supplied from the system control CPU 330.

Figure 2:
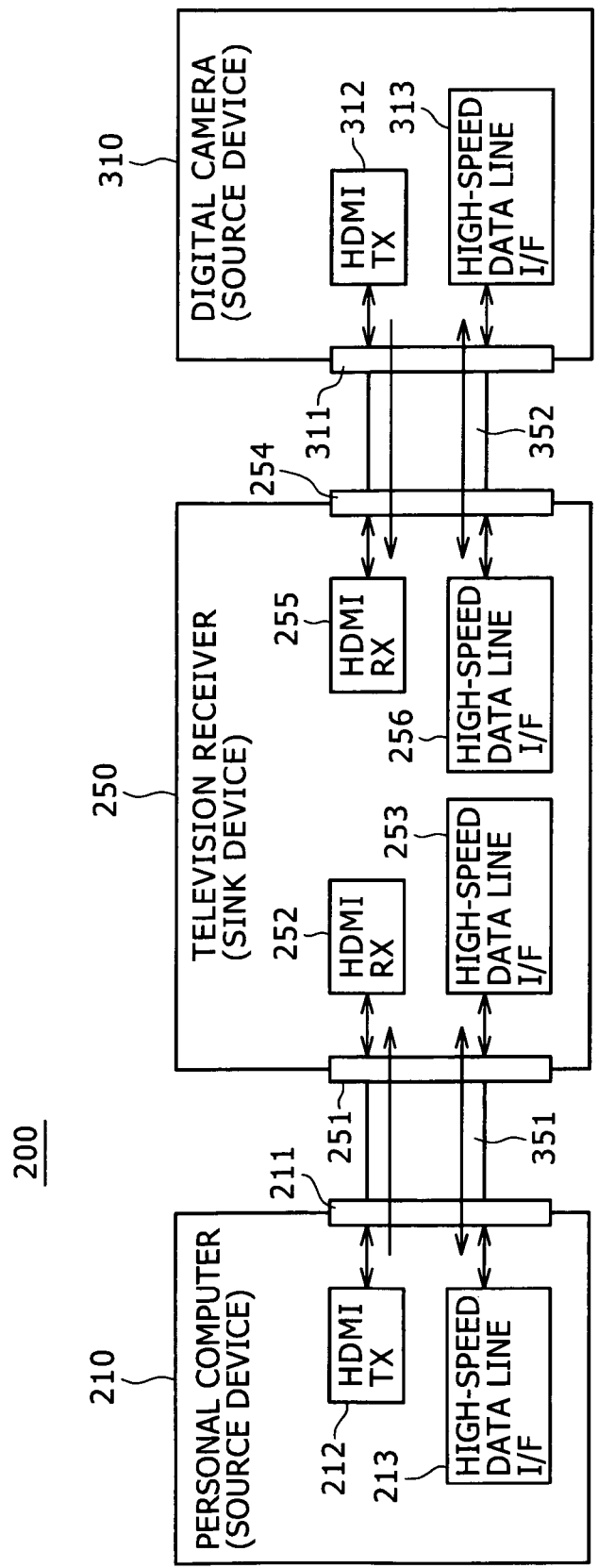
FIG. 2 is a block diagram illustrating an exemplary configuration of the AV system shown in FIG. 1.
Figure 6:
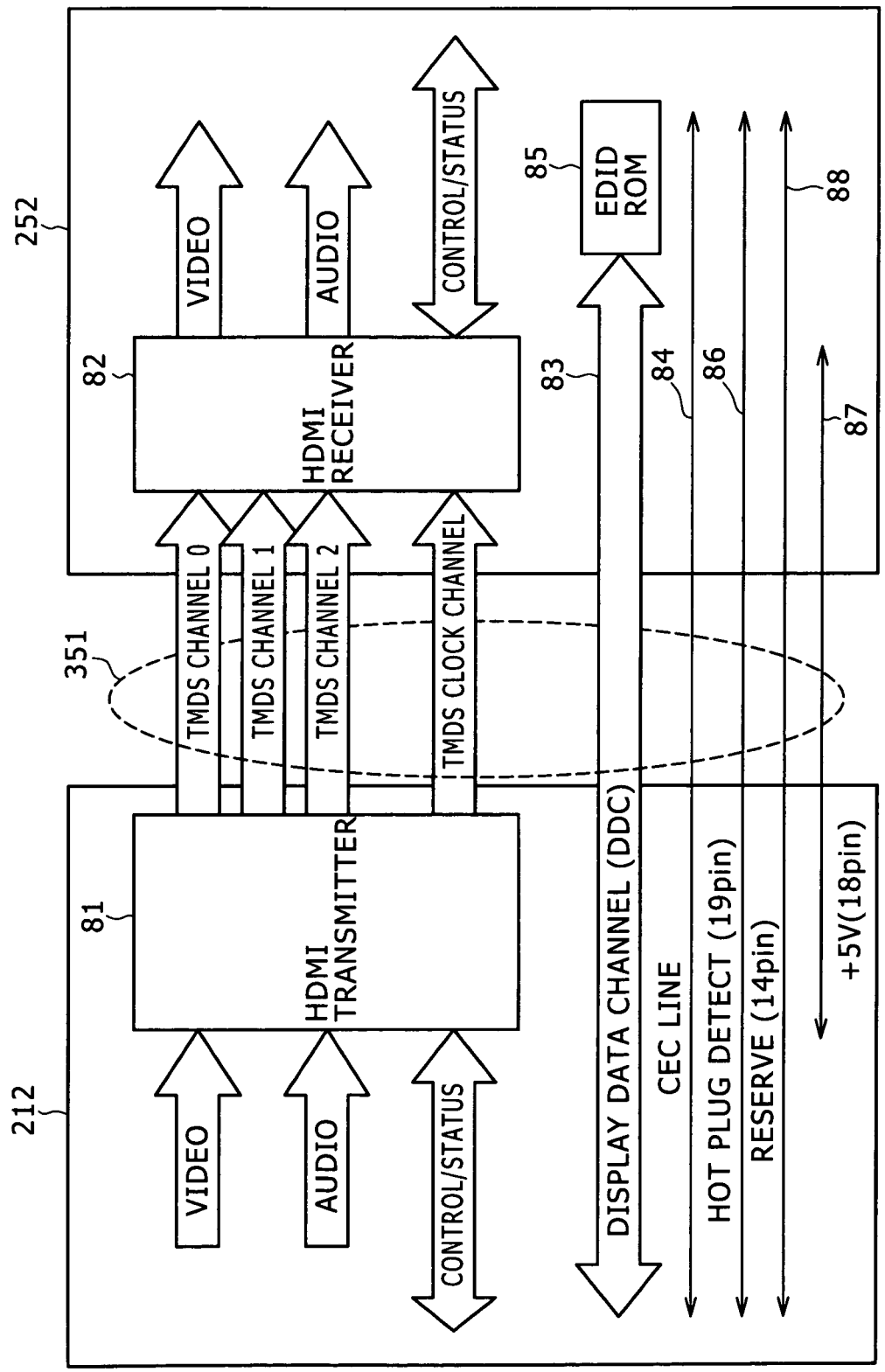
FIG. 6 is a block diagram illustrating exemplary configurations of an HDMI transmission section (or an HDMI source) and an HDMI reception section (HDMI sink)

Referring to FIG. 6, there are shown exemplary configurations of the HDMI transmission section 212 (HDMI source) of the personal computer 210 and the HDMI reception section 252 (HDMI sink) of the television receiver 250 in the AV system 200 shown in FIGS. 1 and 2.

The HDMI source 212 unidirectionally transmits a differential signal corresponding to pixel data of an image for one non-compressed screen to the HDMI sink 252 on a two or more channels in an effective image interval (hereafter referred to as an active video interval) obtained by removing a horizontal blanking interval and a vertical blanking interval from an interval between one vertical sync signal to the following vertical sync signal and, at the same time, unidirectionally transmits a differential signal corresponding to at least audio data and control data accompanying the image and other auxiliary data to the HDMI sink 252 on two or more channels in a horizontal blanking interval or a vertical blanking interval.

Namely, the HDMI source 212 has a transmitter 81. The transmitter 81 converts baseband pixel data of an image into corresponding differentials signal and unidirectionally serial transmits the differential signals to the HDMI sink 252 via the HDMI cable 351 over three TMDS channels #0, #1, and #2.

Further, the transmitter 81 converts the audio data accompanying a baseband image, necessary control data, and other auxiliary data into corresponding differential signals and transmits the differential signals to the HDMI sink 252 connected via the HDMI cable 351 over the three TMDS channels #0, #1, and #2.

In addition, the transmitter 81 transmits a pixel clock synchronized with pixel data to be transmitted over the three TMDS channels #0, #1, and #2 to the HDMI sink 252 connected via the HDMI cable 351 over a TMDS clock channel. It should be noted that, on one TMDS channel #i (i=0, 1, 2), pixel data of 10 bits is transmitted in one pixel clock.

In an active video interval, the HDMI sink 252 receives a differential signal corresponding to pixel data unidirectionally transmitted from the HDMI source 212 over two or more channels in an active video interval and, at the same time, receives a differential signal corresponding to audio data and control data unidirectionally transmitted from the HDMI source 212 over two or more channels in a horizontal blanking interval or a vertical blanking interval.

Namely, the HDMI sink 252 has a receiver 82. The receiver 82 receives a differential signal corresponding to pixel data and a differential signal corresponding to audio data and control data unidirectionally transmitted from the HDMI source 212 connected via the HDMI cable 351 over the TMDS channels #0, #1, and #2, in synchronization with a pixel clock transmitted from the HDMI source 212 over the TMDS clock channel.

The transmission channels of the HDMI system based on the HDMI source 212 and the HDMI sink 252 include the three TMDS channels #0 through #2 for unidirectionally serial transmitting pixel data and audio data in synchronization with a pixel clock to the HDMI source 212 and the HDMI sink 252, the TMDS clock channel for transmitting a pixel clock, and transmission channels referred to as a DDC (Display Data Channel) 83 and a CEC line 84.

The DDC 83 is made up of two signal lines, not shown, included in the HDMI cable 351 and is used for the HDMI source 212 to read E-EDID (Enhanced Extended Display Identification Data) from the HDMI sink 252 connected via the HDMI cable 351.

Namely, in addition to the transmitter 81, the HDMI sink 252 has an EDID ROM 85 that stores E-EDID that is performance information associated with the configuration/capability of the HDMI sink 252 itself. The HDMI source 212 reads, via the DDC 83, the E-EDID of the HDMI sink 252 from the HDMI sink 252 connected via the HDMI cable 351 and, on the basis of this E-EDID, recognizes the setting of the performance of the HDMI source 212, namely, a format (or a profile) of an image to which an electronic device having the HDMI sink 252 corresponds, RGB, YCbCr4:4:4, and YCbCr4:2:2, for example.

The CEC line 84 is made up of one signal line, not shown, included in the HDMI cable 351 and is used for the bidirectional control data communication between the HDMI source 212 and the HDMI sink 252.

The HDMI cable 351 also includes a line 86 that is connected to a pin referred to as HPD (Hot Plug Detect). By use of the line 86, each source device can detect the connection of each sink device. In addition, the HDMI cable 351 includes a line 87 that is used to supply power from the source device to the sink device. Further, the HDMI cable 351 includes a reserved line 88.

Figure 7:
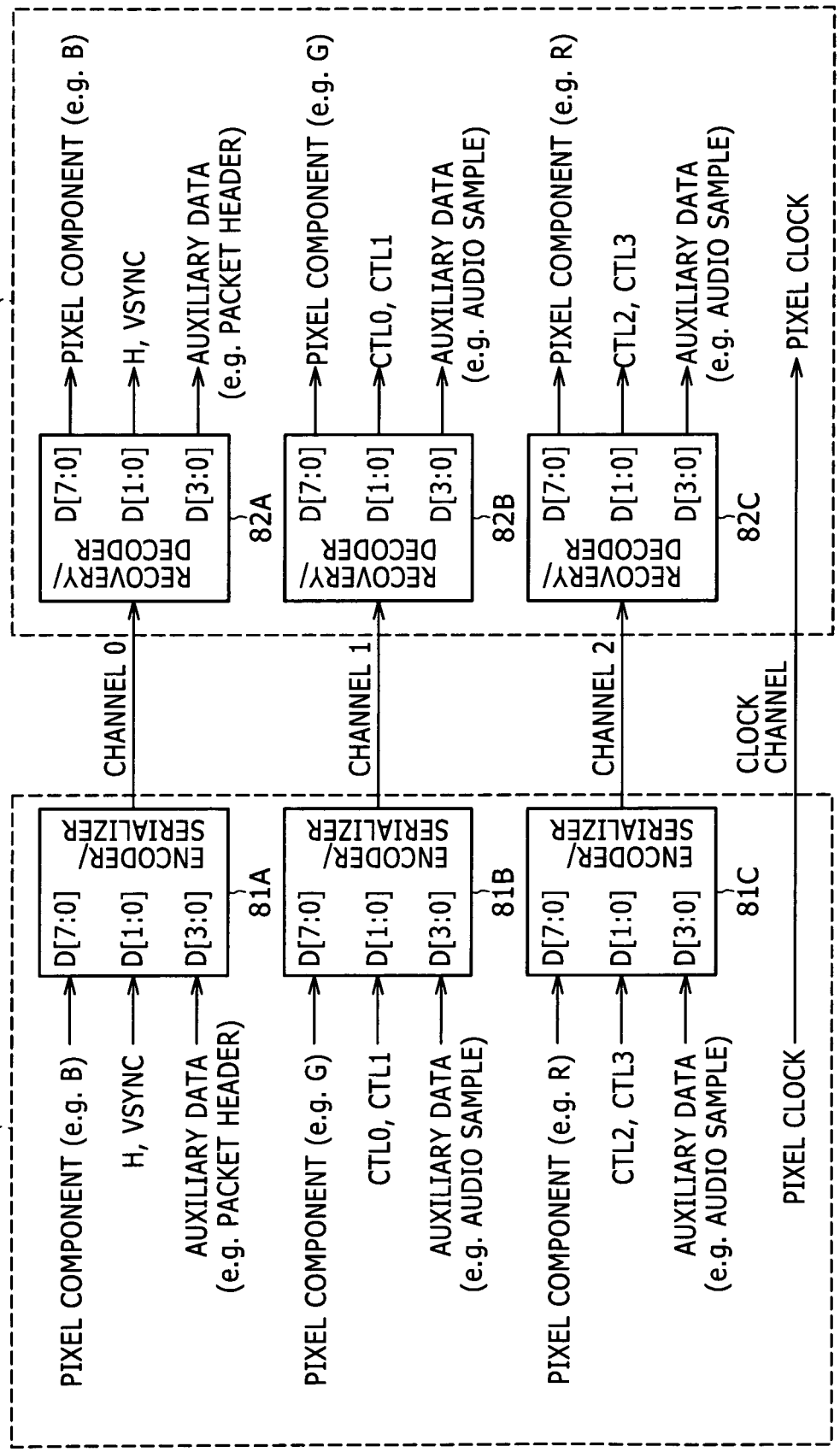
FIG. 7 is a block diagram illustrating exemplary configurations of an HDMI transmitter and an HDMI receiver.

FIG. 7 shows an exemplary configuration of the HDMI transmitter 81 and the HDMI receiver 82 shown in FIG. 6.

The transmitter 81 has three encoders/serializers 81A, 81B, and 81C corresponding to the three TMDS channels #0,

1, and #2, respectively. Each of the three encoders/serializers 81A, 81B, and 81C encodes image data, auxiliary data and control data supplied thereto to covert these data from parallel to serial, the resultant data being transmitted by differential signals. If the image data has three components, R (Red), G (Green), and B (Blue), for example, the B component is supplied to the encoder/serializer 81A, the G component to the encoder/serializer 81B, and the R component to the encoder/serializer 81C.

The auxiliary data include audio data and control packet data, for example. The control packet data is supplied to the encoder/serializer 81A and the audio data is supplied to the encoder/serializer 81B and encoder/serializer 81C.

Further, the control data include a 1-bit vertical sync signal (VSYNC), a 1-bit horizontal sync signal (HSYNC), and 1-bit control signals CTL0, CTL1, CTL2, and CTL3. The vertical sync signal and the horizontal sync signal are supplied to the encoder/serializer 81A. The control bits CTL0 and CTL1 are supplied to the encoder/serializer 81B. The control bits CTL2 and CTL3 are supplied to the encoder/serializer 81C.

The encoder/serializer 81A transmits, in a time division manner, B component of the supplied image data, the supplied vertical sync signal and horizontal sync signal, and the supplied auxiliary data. Namely, the encoder/serializer 81A converts B component of the image data supplied thereto into 8-bit parallel data that is the fixed number of bits. Further, the encoder/serializer 81A encodes this parallel data into serial data and transmits the serial data over TMDS channel #0.

Also, the encoder/serializer 81A encodes 2-bit parallel data of a vertical sync signal and a horizontal sync signal supplied thereto into serial data and transmits this serial data over TMDS channel #0. In addition, the encoder/serializer 81A converts auxiliary data supplied thereto into 4-bit parallel data. Then, the encoder/serializer 81A encodes and converts this parallel data into serial data and transmits this serial data over TMDS channel #0.

The encoder/serializer 81B transmits, a time division manner, G component of image data, control bits CTL0, CTR1, and auxiliary data supplied thereto. Namely, the encoder/serializer 81B converts G component of the image data supplied thereto into 8-bit parallel data that is the fixed number of bits. Further, the encoder/serializer 81B encodes and converts this parallel data into serial data and transmits the serial data over TMDS channel #1.

The encoder/serializer 81B encodes and converts 2-bit parallel data of control bits CTL0 and CTL1 into serial data and transmits this serial data over TMDS channel #1. Further, the encoder/serializer 81B converts the auxiliary data supplied thereto into 4-bit parallel data. Then, the encoder/serializer 81B encodes and converts this parallel data into serial data and transmits this serial data over the TMDS channel #1.

The encoder/serializer 81C transmits, in a time division manner, R component of image data, control bits CTL2, CTL3, and auxiliary data supplied thereto. Namely, the encoder/serializer 81B converts R component of the image data supplied thereto into 8-bit parallel data that is the fixed number of bits. Further, the encoder/serializer 81C encodes and converts this parallel data into serial data and transmits the serial data over TMDS channel #2.

The encoder/serializer 81C encodes and converts 2-bit parallel data of control bits CTL2 and CTL3 into serial data and transmits this serial data over TMDS channel #2. Further, the encoder/serializer 81C converts the auxiliary data supplied thereto into 4-bit parallel data. Then, the encoder/serializer 81C encodes and converts this parallel data into serial data and transmits this serial data over the TMDS channel #2.

The receiver 82 has three recoveries/decoders 82A, 82B, and 82C corresponding to three TMDS channels #0, #1, and #2, respectively. Each of the recoveries/decoders 82A, 82B, and 82C receives image data, auxiliary data, and control data transmitted by differential signals over TMDS channels #0, #1, and #2. Further, each of the recoveries/decoders 82A, 82B, and 82C converts the received image data, auxiliary data, and control data from serial to parallel and decodes the resultant parallel data, outputting the decoded data.

Namely, the recovery/decoder 82A receives B component of image data, a vertical sync signal, horizontal sync signal, and auxiliary data transmitted by differential signals over TMDS channel #0. Then, the recovery/decoder 82A converts these B component of image data, vertical sync signal, horizontal sync signal, and auxiliary data from serial to parallel and decodes the parallel data, outputting the decoded data.

The recovery/decoder 82B receives G component of image data, control bit CTL0, control bit CTL1, and auxiliary data transmitted by differential signals over TMDS channel #1. Then, the recovery/decoder 82B converts these G component of image data, control bit CTL0, control bit CTL1, and auxiliary data from serial to parallel and decodes the parallel data, outputting the decoded data.

The recovery/decoder 82C receives R component of image data, control bit CTL2, control bit CTL3, and auxiliary data transmitted by differential signals over TMDS channel #2. Then, the recovery/decoder 82C converts these R component of image data, control bit CTL2, control bit CTL3, and auxiliary data from serial to parallel and decodes the parallel data, outputting the decoded data.

Figure 8:
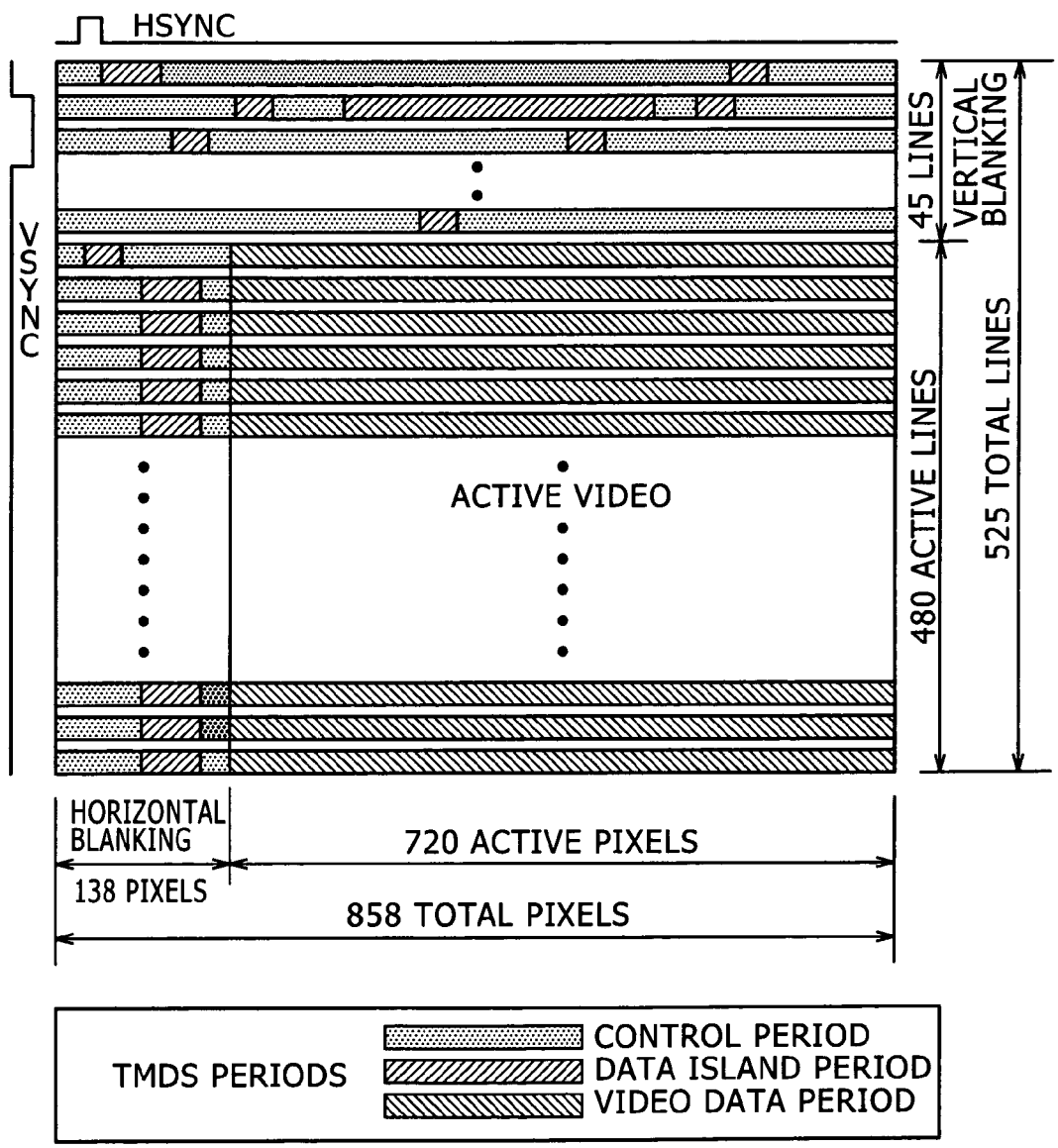
FIG. 8 is a schematic diagram illustrating a structure of TMDS transmission data.

FIG. 8 shows an example of transmission periods in which various kinds of transmission data are transmitted over the three TMDS channels of HDMI. It should be noted that FIG. 8 shows periods of various kinds of transmission data in the case where a progressive image of 720 (wide)×480 (high) pixels is transmitted over TMDS channels #0, #1, and #2.

A video field in which transmission data is transmitted over the three TMDS channels #0, #1, and #2 of HDMI has three kinds of periods, a video data period, a data island period, and a control period depending on the type of transmission data.

The video field period is a period between the active edge of a vertical sync signal to the active edge of the next vertical sync signal. The video field period is divided into a horizontal blanking, a vertical blanking, and an active video period obtained by removing horizontal blanking and vertical blanking from the video field period.

The video data period is allocated to the active video period. In this video data period, data made up of active pixels for 720 pixels×480 lines making up the image data for one baseband screen is transmitted.

A data island period and a control period are allocated to horizontal blanking and vertical blanking. In the data island period and a control period, auxiliary data is transmitted.

Namely, a data island period is allocated to parts of horizontal blanking and vertical blanking. In this data island period, of the auxiliary data, the data not associated with control, such as an audio data packet for example, is transmitted.

The control period is allocated to other parts of horizontal blanking and vertical blanking. In this control period, of the auxiliary data, the data associated with control, such as a vertical sync signal, a horizontal sync signal, and a control packet, is transmitted.

In the current HDMI standard, the frequency of a pixel clock transmitted on the TMDS clock channel is 165 MHz for example; in this case, the transfer rate of the data island period is approximately 500 Mbps.

FIG. 9 shows a pin arrangement of HDMI terminals 29, 31. This pin arrangement is called a type-A pin arrangement.

Two differential lines along which TMDS Data #i+ and TMDS Data #i−, differential signals of TMDS channel #i, are transmitted are connected to pins (pin numbers 1, 4, and 7) to which TMDS Data #i+ is allocated and pins (pin numbers 3, 6, and 9) to which TMDS Data #i− is allocated.

The CEC line 84 along which a CEC signal that is data for control is transmitted is connected to a pin whose pin number is 13. A pin whose pin number is 14 is a reserved pin. A line along which an SDA (Serial Data) signal, such as E-EDID, is transmitted is connected to a pin whose pin number is 16. A line along which an SCL (Serial Clock) signal that is a clock signal for use in synchronization at the time of SDA signal transmission or reception is transmitted is connected to a pin whose pin number is 15. The above-mentioned DDC 83 is made up of the line along which a SDA signal is transmitted and the line along which an SCL signal is transmitted.

As described above, the line 86 for a source device to detect the connection of a sink device is connected to a pin whose pin number is 19. Further, as described above, the line 87 for supplying power is connected to a pin whose pin number is 18.

It should be noted that FIG. 6 shows exemplary configurations of the HDMI transmission section (the HDMI source) 212 of the personal computer 210 and the HDMI reception section (the HDMI sink) 252 of the television receiver 250 in the AV system 200 shown in FIG. 1 and FIG. 2. Although details are omitted, the other HDMI transmission section and HDMI reception section in the AV system 200 shown in FIG. 1 and FIG. 2 are configured in substantially the same manner as above.

Figure 10:
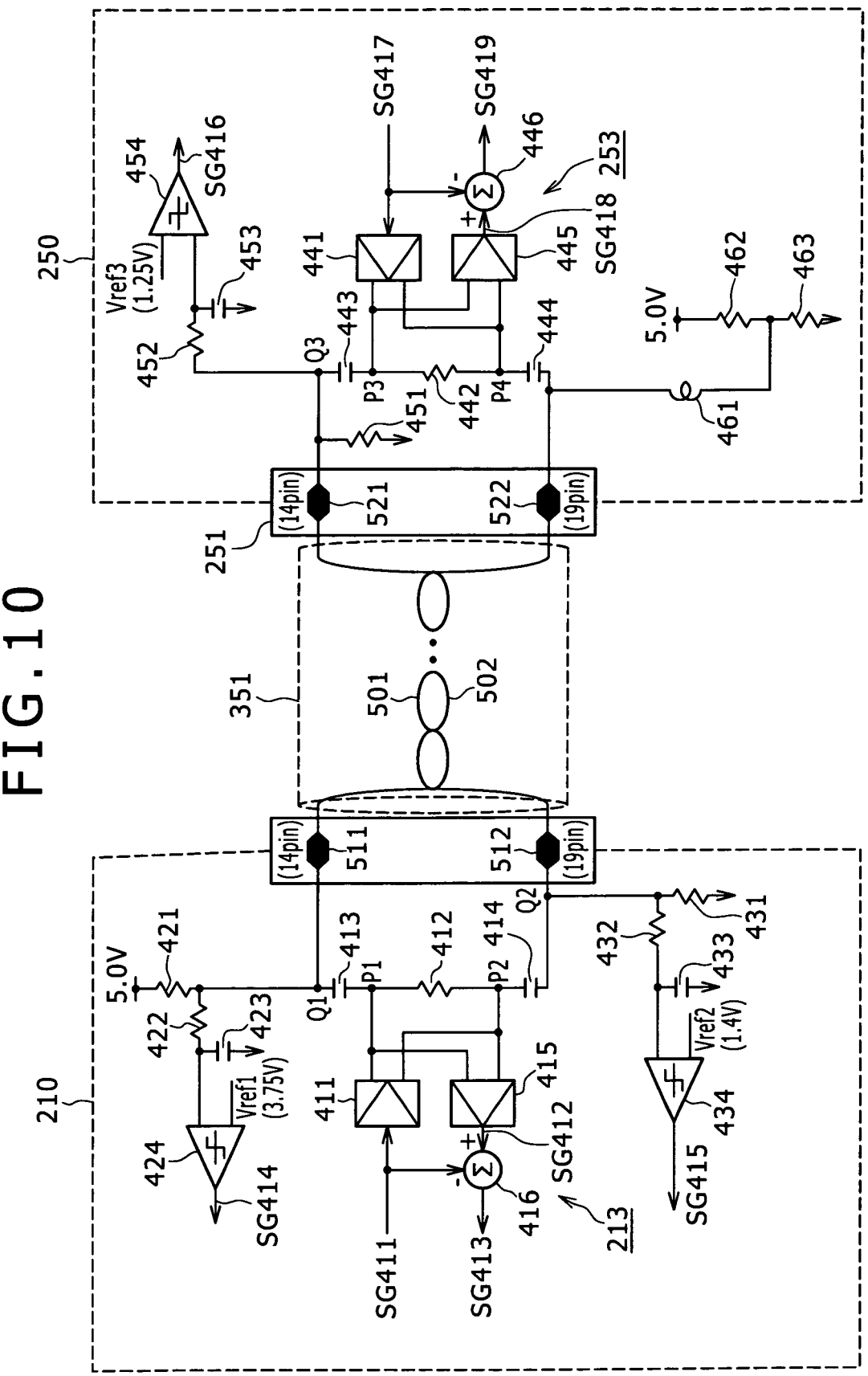
FIG. 10 is a connection diagram illustrating an exemplary configuration of a high-speed data line interface for the personal computer and the television receiver.

Referring to FIG. 10 there are shown exemplary configurations of the high-speed data line interface 213 of the personal computer 210 and the high-speed data line interface 253 of the television receiver 250 in the AV system 200 shown in FIG. 1. These interfaces 213, 253 constitute a communication section configured to execute LAN (Local Area Network) communication. This communication section executes communication by use of a pair of differential lines of two or more lines constituting the HDMI cable 351, namely, the reserved line (Ethernet−line) corresponding to the reserved pin (pin 14) and the HPD line (Ethernet+line) corresponding to the HPD pin (pin 19).

The personal computer 210 has a LAN signal transmission circuit 411, a terminal resistor 412, AC coupling capacitors 413, 414, a LAN signal reception circuit 415, a subtraction circuit 416, a pullup resistor 421, a resistor 422 and a capacitor 423 making up a lowpass filter, a comparator 424, a pulldown resistor 431, a resistor 432 and a capacitor 433 making up a lowpass filter, and a comparator 434. The high-speed data line interface 213 is made up of the LAN signal transmission circuit 411, the terminal resistor 412, the AC coupling capacitors 413, 414, the LAN signal reception circuit 415, and the subtraction circuit 416.

A series circuit of the pullup resistor 421, the AC coupling capacitor 413, the terminal resistor 412, the AC coupling capacitor 414, and the pulldown resistor 431 is connected between a power supply line (+5.0 V) and a ground line. A connection point P1 shared by the AC coupling capacitor 413 and the terminal resistor 412 is connected to the positive output side of the LAN signal transmission circuit 411 and the positive input side of the LAN signal reception circuit 415. A connection point P2 shared by the AC coupling capacitor 414 and the terminal resistor 412 is connected to the negative output side of the LAN signal transmission circuit 411 and the negative input side of the LAN signal reception circuit 415.

To the input side of the LAN signal transmission circuit 411, a transmission signal (transmission data) SG411 is supplied.

The positive terminal of the subtractor 416 is supplied with output signal SG412 of the LAN signal reception circuit 415 and the negative terminal of this subtractor 416 is supplied with transmission signal (transmission data) SG411. The subtractor 416 subtracts the transmission signal SG411 from the output signal SG412 of the LAN signal reception circuit 415 to provide reception signal (reception data) SG413.

A connection point Q1 shared by the pullup resistor 421 and the AC coupling capacitor 413 is connected to the ground line via a series circuit of the resistor 422 and the capacitor 423. An output signal of a lowpass filter formed at the connection point between the resistor 422 and the capacitor 423 is supplied to one input terminal of the comparator 424. The comparator 424 compares the output signal of the lowpass filter with reference voltage Vref1 (+3.75 V) to be supplied to the other input terminal. Output signal SG414 of the comparator 424 is supplied to the CPU 214.

A connection point Q2 shared by the AC coupling capacitor 414 and the pulldown resistor 431 is connected to the ground line via a series circuit of the resistor 432 and the capacitor 433. An output signal of a lowpass filter formed at the connection point between the resistor 432 and the capacitor 433 is supplied to one input terminal of the comparator 434. The comparator 434 compares the output signal of the lowpass filter with reference voltage Vref2 (+1.4 V) to be supplied to the other input terminal. Output signal SG415 of the comparator 434 is supplied to the CPU 214.

The television receiver 250 has a LAN signal transmission circuit 441, a terminal resistor 442, AC coupling capacitors 443, 444, a LAN signal reception circuit 445, a subtraction circuit 446, a pulldown resistor 451, a resistor 452 and a capacitor 453 making up a lowpass filter, a comparator 454, a choke coil 461, a resistor 462, and a resistor 463. The high-speed data line interface 253 is made up of the LAN transmission signal transmission circuit 441, the terminal resistor 442, AC coupling resistors 443, 444, the LAN signal reception circuit 445, and the subtraction circuit 446.

A series circuit of the resistor 462 and the resistor 463 is connected between the power supply line (+5.0 V) and the ground line. A series circuit made up of the choke coil 461, the AC coupling resistor 444, the terminal resistor 442, the AC coupling resistor 443, and the pulldown resistor 451 is connected between the connection point of the resistor 462 and the resistor 463 and the ground line.

A connection point P3 shared by the coupling resistor 443 and the terminal resistor 442 is connected to the positive output side of the LAN signal transmission circuit 441 and to the positive input side of the LAN signal reception circuit 445. A connection point P4 shared by the AC coupling resistor 444 and the terminal resistor 442 is connected to the negative output side of the LAN signal transmission circuit 441 and to the negative input side of the LAN signal reception circuit 445. To the input side of the LAN signal transmission circuit 441, transmission signal (transmission data) SG417 is supplied.

To the positive terminal of the subtraction circuit 446 is supplied with output signal SG418 of the LAN signal reception circuit 445. To the negative terminal of the subtraction circuit 446 is transmission signal SG417 is supplied. The subtraction circuit 446 subtracts transmission signal SG417 from output signal SG418 of the LAN signal reception circuit 445 to provide reception signal (reception data) SG419.

Connection point Q3 shared by the pulldown resistor 451 and the AC coupling resistor 443 is connected to the ground line via a series circuit of the resistor 452 and the capacitor

453. An output signal of a lowpass filter obtained at the connection point between the resistor 452 and the capacitor 453 is connected to one input terminal of the comparator 454. The comparator 454 compares the output signal of the lowpass filter with reference voltage Vref3 (+1.25 V) to be supplied to the other input terminal. Output signal SG416 of this comparator 454 is supplied to the CPU 271.

A reserved line 501 and an HPD line 502 contained in the HDMI cable 351 form a differential twisted pair. A source-side terminal 511 of the reserved line 501 is connected to 14-pin of the HDMI terminal 211 and a sink-side terminal 521 of the reserved line 501 is connected to 14-pin of the HDMI terminal 251. A source-side terminal 512 of the HPD line 502 is connected to 19-pin of the HDMI terminal 211 and a sink-side terminal 522 of the HPD line 502 is connected to 19-pin of the HDMI terminal 251.

In the personal computer 210, the above-mentioned connection point Q1 between the pullup resistor 421 and the AC coupling capacitor 413 is connected to 14-pin of the HDMI terminal 211 and the above-mentioned connection point Q2 between the pulldown resistor 431 and the AC coupling capacitor 414 is connected to 19-pin of the HDMI terminal 211. On the other hand, in the television receiver 250, the above-mentioned connection point Q3 between the pulldown resistor 451 and the coupling resistor 443 is connected to 14-pin of the HDMI terminal 251 and the above-mentioned connection point Q4 between the choke coil 461 and the AC coupling resistor 444 is connected to 19-pin of the HDMI terminal 251.

The following describes an operation of LAN communication based on the high-speed data line interfaces 213, 253 configured as described above.

In the personal computer 210, transmission signal (transmission data) SG411 is supplied to the input side of the LAN signal transmission circuit 411. From this LAN signal transmission circuit 411, differential signals (a positive output signal and a negative output signal) corresponding to transmission signal SG411 are outputted. The differential signals outputted from the LAN signal transmission circuit 411 are supplied to connection points P1 and P2 to be transmitted to the television receiver 250 via the pair of lines (the reserved line 501, the HPD line 502) of the HDMI cable 351.

In the television receiver 250, transmission signal (transmission data) SG417 is supplied to the input side of the LAN signal transmission circuit 441 and differential signals (a positive output signal and a negative output signal) corresponding to transmission signal SG417 is outputted from the LAN signal transmission circuit 441. The differential signals outputted from the LAN signal transmission circuit 441 are supplied to connection points P3 and P4 to be transmitted to the personal computer 210 via the pair of lines (the reserved line 501 and the HPD line 502) of the HDMI cable 351.

In the personal computer 210, the input side of the LAN signal reception circuit 415 is connected to the connection points P1 and P2, so that a signal obtained by adding a transmission signal corresponding to the differential signal (a current signal) outputted from the LAN signal transmission circuit 411 to a reception signal corresponding to the differential signal transmitted from the television receiver 250 as described above is obtained as output signal SG412 of the LAN signal reception circuit 415. The subtractor 416 subtracts transmission signal SG411 from output signal SG412 of the LAN signal reception circuit 415. Hence, output signal SG413 of the subtractor 416 corresponds to transmission signal (transmission data) SG417 of the television receiver 250.

In the television receiver 250, the input side of the LAN signal reception circuit 445 is connected to connection points P3 and P4, so that a signal obtained by adding a transmission signal corresponding to the differential signal (a current signal) outputted from the LAN signal transmission circuit 441 to a reception signal corresponding to the differential signal transmitted from the personal computer 210 as described above is obtained as output signal SG418 of the LAN signal reception circuit 445. The subtraction circuit 446 subtracts transmission signal SG417 from output signal SG418 of the LAN signal reception circuit 445. Hence, output signal SG419 of the subtraction circuit 446 corresponds to transmission signal (transmission data) SG411 of the personal computer 210.

Thus, between the high-speed data line interface 213 of the personal computer 210 and the high-speed data line interface 253 of the television receiver 250, bidirectional LAN communication can be executed.

It should be noted that, in FIG. 10, the HPD line 502 notifies the personal computer 210 of the connection of the HDMI cable 351 with the television receiver 250 on a DC bias level, in addition to the above-mentioned LAN communication. Namely, when the HDMI cable 351 is connected to the television receiver 250, the resistors 462 and 463 and the choke coil 461 bias the HPD line 502 to approximately 4 V via 19-pin of the HDMI terminal 251. The personal computer 210 detects the DC bias of the HPD line 502 through a lowpass filter made up of the resistor 432 and the capacitor 433, which is compared with reference voltage Vref2 (1.4 V for example) through the comparator 434.

If the HDMI cable 351 is not connected to the television receiver 250, a voltage on 19-pin of the HDMI terminal 211 is lower than reference voltage Vref2 because of the existence of the pulldown resistor 431. Conversely, if the HDMI cable 351 is connected to the television receiver 250, the voltage is higher than reference voltage Vref2. Therefore, if the HDMI cable 351 is connected to the television receiver 250, output signal SG415 of the comparator 434 is at the high level; otherwise, output signal SG415 is at the low level. Consequently, the CPU 214 of the personal computer 210 can recognize whether the HDMI cable 351 is in connection with the television receiver 250 on the basis of output signal SG415 of the comparator 434.

Referring to FIG. 10, the present embodiment also has capabilities by which the devices connected on both ends of the HDMI cable 351 can mutually recognize whether each is LAN-communication enabled (hereafter referred to as "e-HDMI compliant device") or LAN-communication disabled (hereafter referred to as "e-HDMI noncompliant device"), at a DC bias potential of the reserved line 501.

As described above, the personal computer 210 pulls up (+5 V) the reserved line 501 and the television receiver 250 pulls down the reserved line 501 by the pulldown resistor 451. None of the pullup resistors 421, 451 is arranged in e-HDMI noncompliant devices.

As described above, the personal computer 210 causes the comparator 424 to compare the DC potential of the reserved line 501 that has passed the lowpass filter composed of the resistor 422 and the capacitor 423 with reference voltage Vref1. If the television receiver 250 is an e-HDMI compliant device and has the pulldown resistor 451, then the voltage of the reserved line 501 is 2.5 V. However, if the television receiver 250 is an e-HDMI non-compliant device and has not pulldown resistor 451, the voltage of the reserved line 501 is 5 V due to the presence of the pullup resistor 421.

Hence, if reference voltage Vref1 is 3.75 V for example, output signal SG414 of the comparator 424 goes low when the television receiver 250 is an e-HDMI compliant device; otherwise, output signal SG414 goes high. Consequently, the CPU 214 of the personal computer 210 can recognize, on the basis of output signal SG414 of the comparator 424, whether the television receiver 250 is an e-HDMI compliant device or not.

Likewise, as described, above, the television receiver 250 causes the comparator 454 to compare the DC potential of the reserved line 501 that has passed the lowpass filter composed of the resistor 452 and the capacitor 453 with reference voltage Vref3. If the personal computer 210 is an e-HDMI compliant device and has the pullup resistor 421, then the voltage of the reserved line 501 is 2.5 V. However, if the personal computer 210 is an e-HDMI non-compliant device and has not pullup resistor 421, the voltage of the reserved line 501 is 0 V due to the presence of the pulldown resistor 451.

Hence, if reference voltage Vref3 is 1.25 V for example, output signal SG416 of the comparator 454 goes high when the personal computer 210 is an e-HDMI compliant device; otherwise, output signal SG416 goes low. Consequently, the CPU 271 of the television receiver 250 can recognize, on the basis of output signal SG416 of the comparator 454, whether personal computer 210 is an e-HDMI device or not.

According to the exemplary configuration shown in FIG. 10, with an interface in which one HDMI cable 351 carries out the transmission of video and audio data, the exchange and authentication of connected device information, the communication of device control data, and LAN communication, LAN communication is executed in a bidirectional communication manner via one pair of differential transmission paths and the connection status of the interface is notified by at least one of the DC bias potentials of the transmission paths, so that spatial separation can be made in which an SCL line and an SDA line are not physically used for LAN communication. As a result, this separation can form a circuit for LAN communication without regard to the electrical specifications defined for DDC, thereby realizing stable, certain, and low-cost LAN communication.

It should be noted that FIG. 10 shows an exemplary configuration of the high-speed data line interface 213 of the personal computer 210 and the high-speed data line interface 253 of the television receiver 250 in the AV system 200 shown in FIGS. 1 and 2.

The following describes an operation of the AV system 200 shown in FIGS. 1 and 2.

In the AV system 200, a predetermined program being received by the television receiver 250 is recorded by the personal computer 210 and reproduced as required.

In this case, the television receiver 250 transmits a partial TS (video data TS packet and audio data TS packet) obtained by the demultiplexer 259 to the personal computer 210 via the high-speed data line. Namely, the television receiver 250 encrypts the partial TS through the DTCP circuit 267 and then supplies the encrypted partial TS to the high-speed data line interface 253 via the Ethernet interface 274. The high-speed data line interface 253 transmits the received partial TS to the HDMI cable 351 from the HDMI terminal 251, from which the partial TS is transmitted to the personal computer 210.

The high-speed data line interface 213 of the personal computer 210 receives the partial TS of the above-mentioned predetermined program transmitted from the television receiver 250 via the HDMI cable 351 and supplies the received partial TS to the CPU 214 via the Ethernet interface 223. Then, at the time of recording, the CPU 214 decodes this partial TS and then stores the decoded partial TS to the storage section 221, a HDD for example.

In this case, the CPU 214 of the personal computer 210 executes image analysis on the partial TS (stream data) received from the television receiver 250 to execute ticker recognition or face recognition. Then, the CPU 214 tags a result of the recognition before recording the partial TS to the storage section 221 as described above.

Also, at the time of reproduction, the CPU 214 of the personal computer 210 reproduces the partial TS of a predetermined program from the storage section 221 and decodes the partial TS to obtain baseband video (image) and audio data. Then, the CPU 214 supplies the baseband video and audio data to the HDMI source 212. The HDMI source 212 transmits the received video and audio data to the television receiver 250 over the TMDS channel of HDMI.

The HDMI reception section 252 of the television receiver 250 receives the video and audio data from the personal computer 210. The video and audio data are then supplied to the video & graphics processing circuit 261 and the audio signal processing circuit 264, respectively. Consequently, on the television receiver 250, a reproduced image is displayed on the display panel 263 and reproduced sound is outputted from the loudspeaker 266.

It should be noted that, if a skip instruction (a ticker or a particular person) is given by the user, the CPU 214 executes skip reproduction for each ticker or reproduction of only a part in which only a particular person is shown on the basis of the ticker recognition or face recognition made at the time of the tagging at recording as described above. Accordingly, the user watches the image and listens to the sound for each ticker, or watches the image of the parts only the particular person shown and listens to the sound of the same.

FIG. 11 shows one example of an operation sequence in which a predetermined program being received by the television receiver 250 is recorded and reproduced by the personal computer 210 as described above.

(a) When the user is viewing a predetermined program being received by the television receiver 250 as described above, (b) the partial TS of the predetermined program obtained by the demultiplexer 259 is transmitted from the television receiver 250 to the personal computer 210 by use of the high-speed data line (Ethernet). (c) The personal computer 210 records the received partial TS to the storage section 221; in this case, the personal computer 210 executes image analysis on the partial TS for ticker recognition or face recognition, tagging a result of this recognition to the partial TS to be recorded to the storage section 221. Namely, the CPU 214 attaches a result of the recognition to the header of the stream data as a recognition result tag.

(d) Next, when the user gives a reproduction instruction to the personal computer 210, (e) then the personal computer 210 reproduces the partial TS of the predetermined program from the storage section 221, decodes the reproduced partial TS, and transmits the video (image) and audio baseband data to the television receiver 250 over the TMDS channel. (f) Consequently, the television receiver 250 advances to a reproduced program viewing status. (g) When the user gives a skip instruction (a ticker or a particular person) to the personal computer 210 in this status, the personal computer 210 executes skip reproduction on the basis of a result of ticker recognition or face recognition tagged to the recorded partial TS as described above.

In the AV system 200 shown in FIGS. 1 and 2, if a particular subject (person or object) or a particular scene is detected in a predetermined program being received by the broadcast reception section (the tuner) of the television receiver 250 in the standby status, the power to the television receiver 250 is turned on.

In this case, in the standby status, the television receiver 250 transmits the partial TS (the video data TS packet and the audio data TS packet) of the predetermined program obtained by the demultiplexer 259 to the personal computer 210 by use the high-speed data line. Namely, the television receiver 250 encrypts the partial TS through the DTCP circuit 267 and then supplies the encrypted partial TS to the high-speed data line interface 253 via the Ethernet interface 274. The high-speed data line interface 253 transmits the received partial TS from the HDMI terminal 251 to the HDMI cable 351, eventually transmitting the partial TS to the personal computer 210.

The high-speed data line interface 213 of the personal computer 210 receives the above-mentioned partial TS of the predetermined program from the television receiver 250 via the HDMI cable 351 and supplied the receives partial TS to the CPU 214 via the Ethernet interface 223. The CPU 214 executes image analysis on this partial TS to detect a particular subject or a particular scene.

When a particular subject or a particular scene is detected, the CPU 214 of the personal computer 210 generates a WakeOnLAN packet and transmits the generated packet to the television receiver 250 over the high-speed data line. Namely, the CPU 214 supplies the WakeOnLAN packet to the high-speed data line interface 213 via the Ethernet interface 223. The high-speed data line interface 213 transmits the received WakeOnLAN packet from the HDMI terminal 211 to the HDMI cable 351, eventually transmitting this packet to the television receiver 250.

The high-speed data line interface 253 of the television receiver 250 receives the WakeOnLAN packet transmitted from the personal computer 210 via the HDMI cable 351 and transmits the received packet to the CPU 271 via the Ethernet interface 274. The CPU 271 turns on the power to the television receiver 250 on the basis of this WakeOnLAN packet.

FIG. 12 shows one example of an operation sequence in which the power to the television receiver 250 is turned on when a particular subject (person or object) or a particular scene is detected from a predetermined program being received by the television receiver 250 in the standby status as described above.

(a) In the standby status, (b) the television receiver 250 transmits a partial TS of a predetermined program obtained by the demultiplexer 259 to the personal computer 210 by use the high-speed data line (Ethernet). (c) The personal computer 210 executes image analysis on the received partial TS to detect a particular subject or a particular scene.

(d) Upon detection of a particular subject or a particular scene, the personal computer 210 transmits a WakeOnLAN packet to the television receiver 250 by use of the high-speed data line. (e) Receiving this packet, the television receiver 250 turns on the power thereto. Consequently, the viewing of a program in which a particular subject or a particular scene is included becomes ready for viewing.

In the AV system 200 shown in FIGS. 1 and 2, when a program being received by the broadcast reception section (the tuner) of the television receiver 250 advances to a commercial period, the commercial display on the television receiver 250 is suppressed.

In this case, with the user viewing a predetermined program (a channel) on the television receiver 250, television receiver 250 transmits the partial TS (video data TS packet and audio data TS packet) of the predetermined program obtained by the demultiplexer 259 to the personal computer 210 over the high-speed data line. To be more specific, the television receiver 250 encrypts the partial TS through the DTCP circuit 267 and then transmits the encrypted partial TS to the high-speed data line interface 253 via the Ethernet interface 274. The high-speed data line interface 253 transmits the received partial TS from the HDMI terminal 251 to the HDMI cable 351, eventually transmitting the partial TS to the personal computer 210.

The high-speed data line interface 213 of the personal computer 210 receives the above-mentioned partial TS of the predetermined program transmitted from the television receiver 250 via the HDMI cable 351 and supplies the received partial TS to the CPU 214 via the Ethernet interface 223. The CPU 214 executes image analysis on this partial TS to detect the beginning of a commercial.

Upon detection of the beginning of a commercial, the CPU 214 of the personal computer 210 generates an operation packet for channel change for example so as to suppress commercial display and transmits the generated operation packet to the television receiver 250 along the high-speed data line. Namely, the CPU 214 supplies the operation packet for channel change for example to the high-speed data line interface 213 via the Ethernet interface 223. The high-speed data line interface 213 transmits the received packet from the HDMI terminal 211 to the HDMI cable 351, eventually transmitting this packet to the television receiver 250.

The high-speed data line interface 253 of the television receiver 250 receives the above-mentioned operation packet transmitted from the personal computer 210 via the HDMI cable 351 and supplies the received packet to the CPU 271 via the Ethernet interface 274. On the basis of this operation packet, the CPU 271 suppresses the commercial display on the television receiver 250.

For example, an operation packet is used to change reception channels in the broadcast reception section (the tuner) of the television receiver 250. In this example, the CPU 271 of the television receiver 250 changes reception channels in the broadcast reception section (the tuner) on the basis of the operation packet.

Also, for example, an operation packet is used to display a channel index screen on the television receiver 250. In this example, the CPU 271 of the television receiver 250 controls the broadcast reception section (the digital tuner 258 and the demultiplexer 259) and the video & graphics processing circuit 261 to generate a video signal for a channel index screen on which a list or an index of channel images is displayed, thereby displaying the generated channel index screen on the display panel 263.

Further, for example, an operation packet is used to sequentially change reception channels in the broadcast reception section (the tuner) of the television receiver 250, namely, a packet for so-called zapping. In this example, the CPU 271 of the television receiver 250 sequentially changes reception channels in the broadcast reception section (the tuner) on the basis of the operation packet.

Thus, even if the commercial display on the television receiver 250 is in a suppressed status, the television receiver 250 intermittently transmits the partial TS of the original channel by use of the high-speed data line to the personal computer 210. The CPU 214 of the personal computer 210 executes image analysis on this partial TS to detect the end of the commercial.

When the end of the commercial has been detected, the CPU 214 of the personal computer 210 generates a channel return operation packet for returning the current channel to the original channel of the television receiver 250 and transmits the generated operation packet to the television receiver 250 along the high-speed data line. Namely, the CPU 214 supplies the channel return operation packet to the high-speed data line interface 213 via the Ethernet interface 223. The high-speed data line interface 213 transmits the received operation packet from the HDMI terminal 211 to the HDMI cable 351, eventually transmitting this operation packet to the television receiver 250.

The high-speed data line interface 253 of the television receiver 250 receives the above-mentioned channel return operation packet transmitted from the personal computer 210 via the HDMI cable 351 and supplies the received packet to the CPU 271 of the Ethernet interface 274. On the basis of the received operation packet, the CPU 271 returns the current reception channel in the broadcast reception section of the television receiver 250 to the original channel. Consequently, the television receiver 250 returns to a status where the original channel (program) can be viewed.

Thus, in the television receiver 250, during a period from the beginning to the end of a commercial, another channel (program) can be viewed or a channel index screen can be displayed or a channel zapping status can be entered, so that the user (viewer) may be prevented from growing tired.

Figure 13:
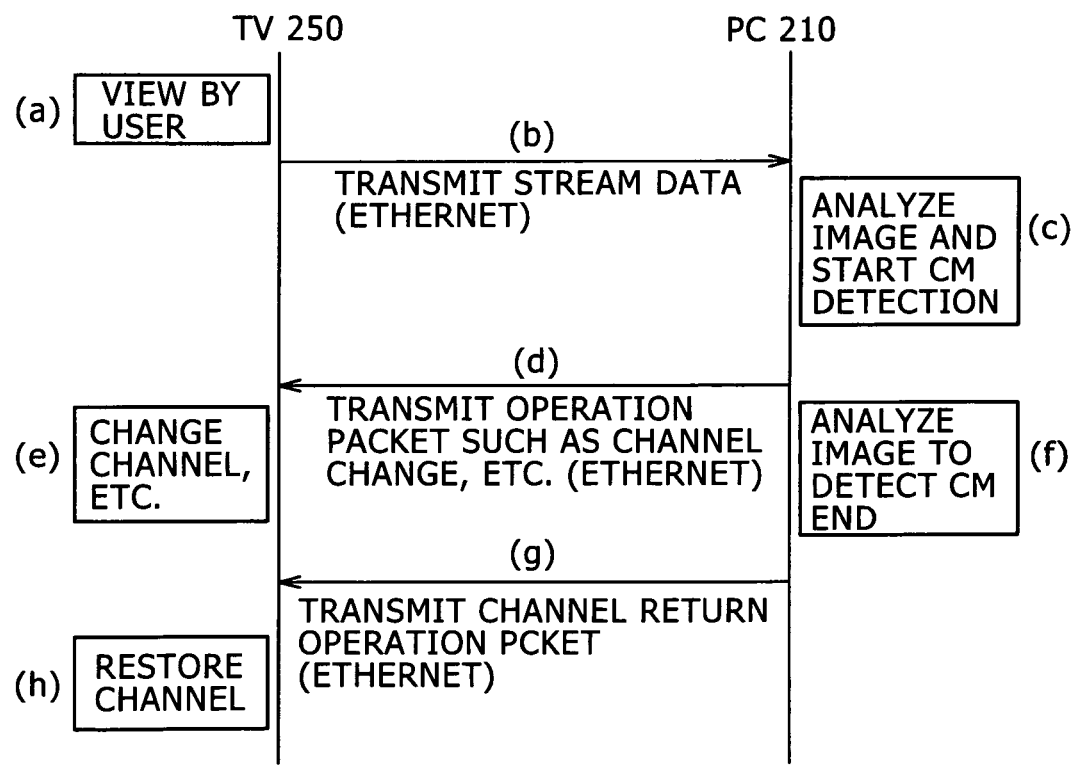
FIG. 13 is a sequence diagram illustrating an exemplary operation sequence in which, when a predetermined program being viewed on the television receiver advances to a commercial period, a screen different from that commercial is provided to a user.

FIG. 13 shows an exemplary operation sequence in which, when a predetermined program being viewed on the television receiver 250 advances to a commercial period as described above, a screen different from that commercial screen is provided to the user.

(a) With the user viewing a predetermined program (channel) on the television receiver 250 as described above, (b) the television receiver 250 transmits a partial TS of the predetermined program obtained by the demultiplexer 259 to the personal computer 210 by use of the high-speed data line (Ethernet). (c) The personal computer 210 executes image analysis on the received partial TS to detect the beginning of a commercial.

(d) Upon detection of the beginning of a commercial, the personal computer 210 transmits an operation packet for channel change for example to the television receiver 250 by use of the high-speed data line. (e) In response, the television receiver 250 changes reception channels for example and provides the user a screen different from the commercial, thereby suppressing commercial display.

(f) Next, the personal computer 210 executes image analysis on the partial TS of the original reception channel intermittently transmitted from the television receiver 250, detecting the end of the commercial. (g) Upon detection of the commercial end, the personal computer 210 transmits a channel return operation packet to the television receiver 250 by use of the high-speed data line. (h) In response, the television receiver 250 returns the current channel to the original channel to let the user view the original channel.

Also, in the AV system 200 shown in FIGS. 1 and 2, a leave-it-to-you program guide is generated on the basis of the viewing information of the user (viewer) and, on the basis of the generated program guide, the television receiver 250 automatically receives programs.

In this case, every time the user views a program, the CPU 271 of the television receiver 250 transmits the program viewing information (viewing during, reception channel, program title, and so on) to the personal computer 210 via the high-speed data line. Namely, the CPU 271 supplies the program viewing information to the high-speed data line interface 253 via the Ethernet interface 274. The high-speed data line interface 253 transmits the received program viewing information to the HDMI cable 351 from the HDMI terminal 251, eventually transmitting the program viewing information to the personal computer 210.

The high-speed data line interface 213 receives the above-mentioned program viewing information transmitted from the television receiver 250 via the HDMI cable 351 and supplies the received program viewing information to the CPU 214 via the Ethernet interface 223. Then, the CPU 214 stores the received program viewing information on the HDD for example that is the storage section 221. Next, the CPU 214 generates a program viewing database from the stored program viewing information.

If the user selects the "Leave-it-to-you uninterrupted broadcast" mode by use of the remote control transmitter 277 of the television receiver 250, then the television receiver 250 transmits a mode selection notifying packet to the personal computer 210 by use of the high-speed data line.

To be more specific, the CPU 271 generates a mode selection notifying packet and supplies the generated mode selection notifying packet to the high-speed data line interface 253 via the Ethernet interface 274. The high-speed data line interface 253 transmits the received mode selection notifying packet to the HDMI cable 351 from the HDMI terminal 251, eventually transmitting this packet to the personal computer 210.

The high-speed data line interface 213 of the personal computer 210 receives the above-mentioned mode selection notifying packet transmitted from the television receiver 250 via the HDMI cable 351 and supplies the received packet to the CPU 214 via the Ethernet interface 223. Next, on the basis of the received mode selection notifying packet, the CPU 214 references the program viewing database generated as described above to generate a leave-it-to-you program guide. For example, this leave-it-to-you program guide is a program viewing schedule in which user preference programs are listed.

Then, on the basis of the schedule of the leave-it-to-you program guide, the CPU 214 of the personal computer 210 transmits a channel change notifying packet to the television receiver 250. Namely, the CPU 214 transmits the channel change notifying packet to the high-speed data line interface 213 via the Ethernet interface 223. The high-speed data line interface 213 transmits the received channel change notifying packet to the HDMI cable 351, eventually transmitting this packet to the television receiver 250.

The high-speed data line interface 253 of the television receiver 250 receives the above-mentioned channel change notifying packet transmitted from the personal computer 210 via the HDMI cable 351 and supplies the received packet to the CPU 271 of the Ethernet interface 274. On the basis of this channel change notifying packet, the CPU 271 changes channels in the broadcast reception section.

Consequently, in the television receiver 250, user-preference programs are sequentially automatically received. In this case, the user can successively view user-preference programs without searching the program guide for preference programs.

Figure 14:
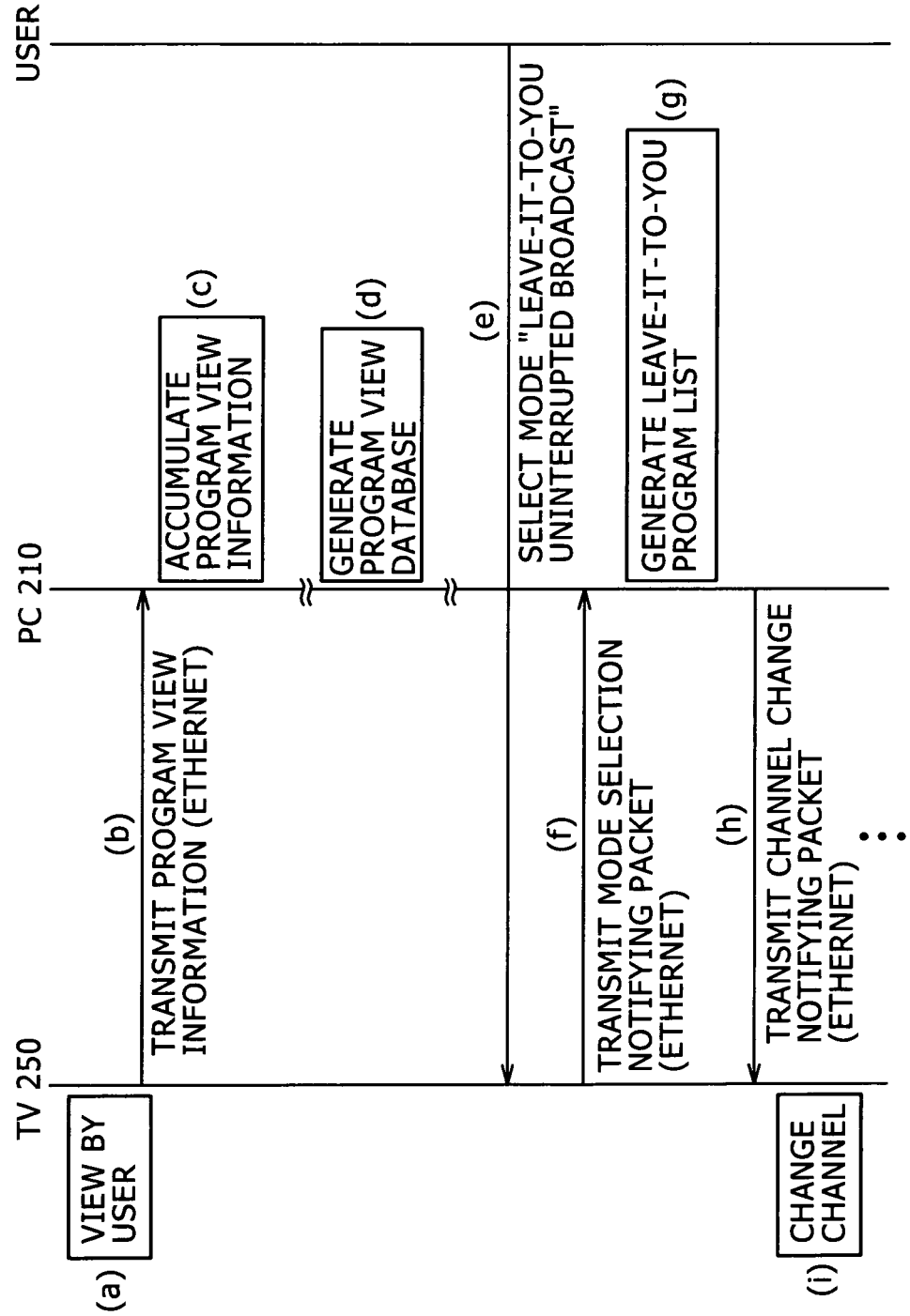
FIG. 14 is a sequence diagram illustrating an exemplary operation sequence in which automatic reception is made by the television receiver on the basis of a leave-it-to-you program guide.

FIG. 14 shows an exemplary operation sequence in which programs are automatically received on the television receiver 250 on the basis of a leave-it-to-you program guide.

(a) Every time the user executes program viewing on the television receiver 250, (b) the television receiver 250 transmits program viewing information to the personal computer 210 by use of the high-speed data line (Ethernet). (c) The personal computer 210 stores the received program viewing information in the HDD for example that is the storage section 221. (d) Next, the personal computer 210 generates a program viewing database on the basis of the stored program viewing information.

(e) Then, when the user operates the remote control transmitter 277 to select "Leave-it-to-you uninterrupted broadcast," (f) the television receiver 250 transmits a mode selection notifying packet to the personal computer 210 by use the high-speed data line. (g) In response, the personal computer 210 references the program viewing database to generate a leave-it-to-you program guide.

(h) Next, on the basis of the schedule of the leave-it-to-you program guide, the personal computer 210 sequentially transmits channel change notifying packets to the television receiver 250 via the high-speed data line. (i) In response, the television receiver 250 sequentially changes reception channels. Consequently, user-preference programs are sequentially automatically received.

Also, in the AV system 200 shown in FIGS. 1 and 2, the television receiver 250 automatically receives a program that is nearest to the user preference from among the currently broadcast programs.

In this case, every time the user views a program, the CPU 271 of the television receiver 250 transmits program viewing information (viewing duration, reception channel, program title, and so on) to the personal computer 210 via the high-speed data line. Namely, the CPU 271 supplies the program viewing information to the high-speed data line interface 253 via the Ethernet interface 274. The high-speed data line interface 253 transmits the received program viewing information to the HDMI cable 351 from the HDMI terminal 251, eventually transmitting this information to the personal computer 210.

The high-speed data line interface 213 of the personal computer 210 receives the above-mentioned program viewing information transmitted from the television receiver 250 via the HDMI cable 351 and supplies the received program viewing information to the CPU 214 via the Ethernet interface 223. Then, the CPU 214 stores the received information in the HDD for example that is the storage section 221. Next, the CPU 214 generates a program viewing database from the stored program viewing information.

If the user selects "Leave-it-to-you channel sort" mode by use of the remote control transmitter 277 for example of the television receiver 250, then the television receiver 250 transmits a mode selection notifying packet to the personal computer 210 by use of the high-speed data line.

Namely, the CPU 271 generates a mode selection notifying packet and supplies the generated mode selection notifying packet to the high-speed data line interface 253 via the Ethernet interface 274. The high-speed data line interface 253 transmits this mode selection notifying packet to the HDMI cable 351 from the HDMI terminal 251, eventually transmitting this packet to the personal computer 210.

The high-speed data line interface 213 of the personal computer 210 receives the above-mentioned mode selection notifying packet transmitted from the television receiver 250 via the HDMI cable 351 and supplies the received packet to the CPU 214 of the Ethernet interface 223. Then, on the basis of this mode selection notifying packet, the CPU 214 references the program viewing database generated as described above, thereby selecting a program that is nearest to user preference from among currently broadcast programs.

Next, the CPU 214 of the personal computer 210 transmits a channel change notifying packet for changing a current channel to a channel of the selected program to the television receiver 250 via the high-speed data line. Namely, the CPU 214 supplies the channel change notifying packet to the high-speed data line interface 213 via the Ethernet interface 223. The high-speed data line interface 213 transmits this channel change notifying packet from the HDMI terminal 211 to the HDMI cable 351, eventually transmitting this packet to the television receiver 250.

The high-speed data line interface 253 of the television receiver 250 receives the above-mentioned channel change notifying packet transmitted from the personal computer 210 via the HDMI cable 351 and supplies the received channel change notifying packet to the CPU 271 via the Ethernet interface 274. On the basis of this channel change notifying packet, the CPU 271 changes reception channels in the broadcast reception section. Consequently, in the television receiver 250, a program that is nearest to user preference is automatically selected from among currently broadcast programs.

Subsequently, substantially the same operation as described above is repeated every the user selected "Leave-it-to-you channel sort" mode.

Figure 15:
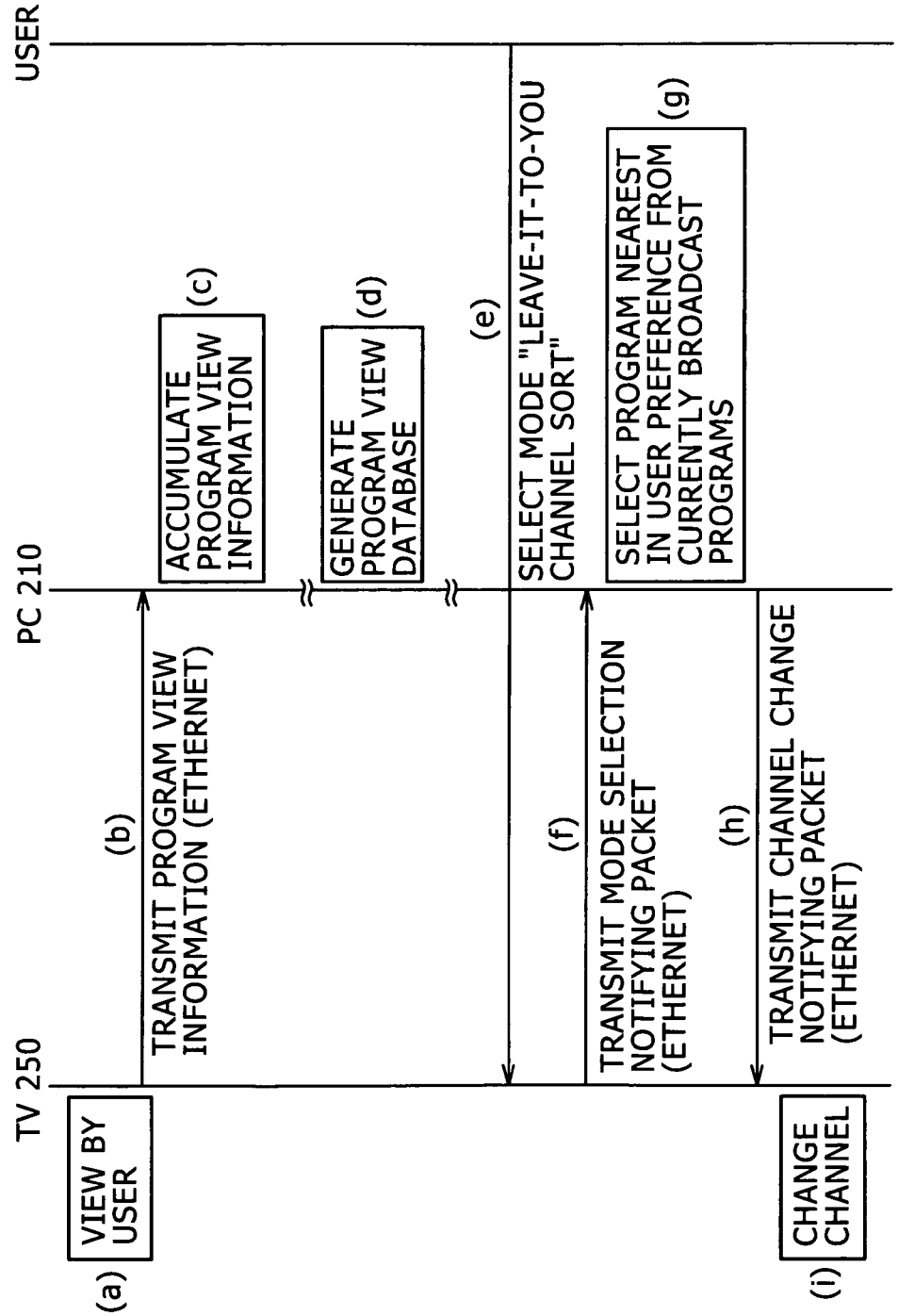
FIG. 15 is a sequence diagram illustrating an exemplary operation sequence in which a program nearest to user preference is automatically received by the television receiver from currently broadcasting programs.

FIG. 15 shows an exemplary operation sequence in which, in the television receiver 250, a program that is nearest to user preference is automatically selected from among currently broadcast programs as described above.

(a) Every time the user executes program viewing on the television receiver 250, (b) the television receiver 250 transmits program viewing information to the personal computer 210 by use of the high-speed data line (Ethernet). (c) The personal computer 210 stores the received program viewing information in the HDD for example that is the storage section 221. (d) Next, the personal computer 210 generates a program viewing database on the basis of the stored program viewing information.

(e) Then, when the user operates the remote control transmitter 277 to select "Leave-it-to-you channel sort" mode, (f) the television receiver 250 transmits a mode selection notifying packet to the personal computer 210 by use the high-speed data line. (g) In response, the personal computer 210 references the program viewing database to select a program that is nearest to user preference.

(h) Next, the personal computer 210 transmits a channel change notifying packet for changing a current channel to a selected channel to the television receiver 250 via the high-speed data line. (i) In response, the television receiver 250 changes reception channels. Consequently, in the television receiver 250, a program that is nearest to user preference is automatically selected from among currently broadcast programs without searching the program guide for a program of user preference.

Further, in the AV system 200 shown in FIGS. 1 and 2, a user's operation on the personal computer 210 allows displaying of a home menu screen on the television receiver 250 and an operation of menu screens becomes possible.

In this case, on the personal computer 210, "TV home menu" button arranged on the input section 219 for example is operated by the user. In response to the operation done by the user, the CPU 214 of the personal computer 210 generates a TV home menu display instruction notifying packet and transmits the generated packet to the television receiver 250. Namely, the CPU 214 supplies the TV home menu display instruction notifying packet to the high-speed data line interface 213 via the Ethernet interface 223. The high-speed data line interface 213 transmits the received notifying packet from the HDMI terminal 211 to the HDMI cable 351, eventually transmitting to the television receiver 250.

The high-speed data line interface 253 of the television receiver 250 receives the above-mentioned TV home menu display instruction notifying packet transmitted from the personal computer 210 via the HDMI cable 351 and supplies the received packet to the CPU 271 via the Ethernet interface 274. On the basis of this notifying packet, the CPU 271 controls the video & graphics processing circuit 261 and so on to display a home menu screen.

When a menu operation by a mouse for example is done in this status on the personal computer 210, the CPU 214 of the personal computer 210 transmits a home menu operation packet to the television receiver 250 via the high-speed data line. Namely, the CPU 214 supplies the home menu operation packet to the high-speed data line interface 213 via the Ethernet interface 223. The high-speed data line interface 213 transmits this operation packet from the HDMI terminal 211 to the HDMI cable 351, eventually transmit the packet to the television receiver 250.

The high-speed data line interface 253 of the television receiver 250 receives the above-mentioned home menu operation packet transmitted from the personal computer 210 via the HDMI cable 351 and supplies the received packet to the CPU 271 via the Ethernet interface 274. On the basis of the received operation packet, the CPU 271 controls the video & graphics processing circuit 261 and so on to change home menu screens.

Figure 16:
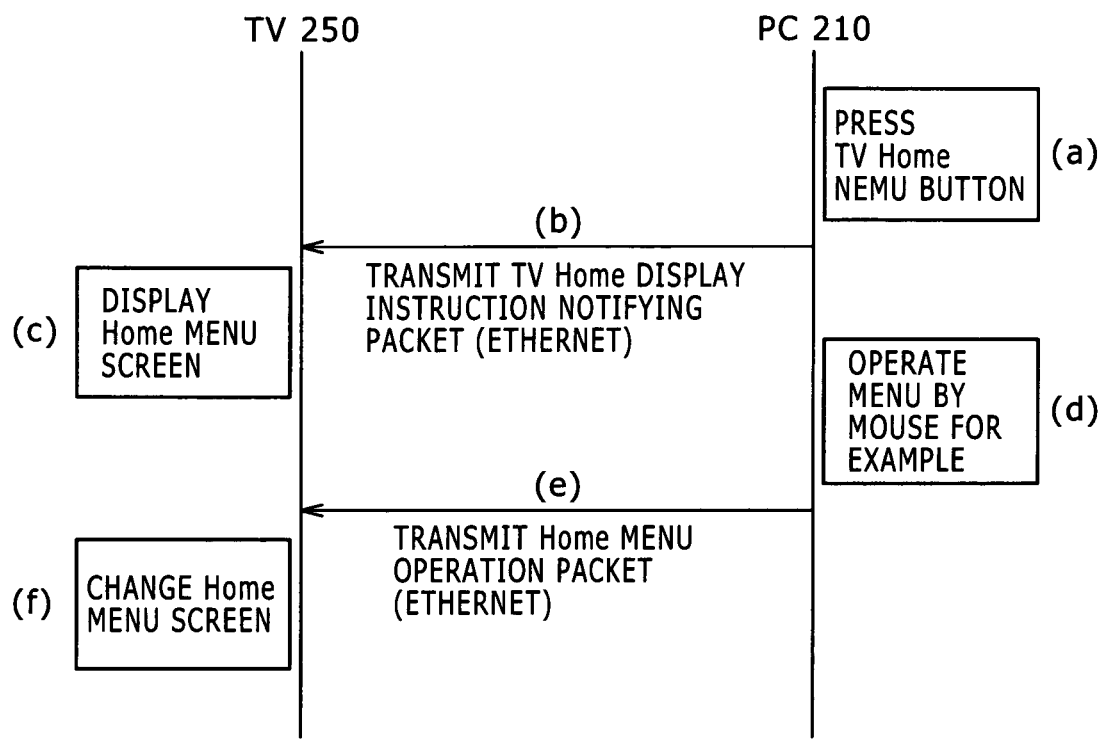
FIG. 16 is a sequence diagram illustrating an exemplary operation sequence in which a home menu screen is displayed and a menu screen is operated on the television receiver from the personal computer.

FIG. 16 shows an exemplary operation sequence in which a home menu screen is displayed on the television receiver 250 and menu screen are operated by the user through the personal computer 210.

(a) When the user presses "TV home menu" button on the personal computer 210 as described above, (b) the personal computer 210 transmits a TV home menu display instruction notifying packet to the television receiver 250 by use of the high-speed data line. (c) In response, the television receiver 250 displays a home menu screen. (d) When the user executes a menu operation by the mouse for example on the personal computer 210 in this status, (e) the personal computer 210 transmits a home menu operation packet to the television receiver 250 by use of the high-speed data line. (f) In response, the television receiver 250 changes home menu screens.

In the AV system 200 shown in FIGS. 1 and 2, if the television receiver 250 has a recording function or is externally connected with a recording device, not shown in FIG. 4, recording from the personal computer 210 can be done.

In this case, it is assumed that an output screen of the personal computer 210 be displayed on the television receiver 250 and a television control GUI (Graphical User Interface) screen be displayed on this output screen. In this status, the beginning of recording is instructed by the user through this GUI.

In response to this user operation, the CPU 214 of the personal computer 210 generates a recording start instruction notifying packet and transmits the generated packet to the television receiver 250 by use of the high-speed data line. Namely, the CPU 214 supplies the recording start instruction notifying packet to the high-speed data line interface 213 via the Ethernet interface 223. The high-speed data line interface 213 transmits the received notifying packet to the HDMI cable 351 from the HDMI terminal 211, eventually transmitting this packet to the television receiver 250.

The high-speed data line interface 253 of the television receiver 250 receives the above-mentioned recording start instruction notifying packet from the personal computer 210 via the HDMI cable 351 and supplies the received packet to the CPU 271 via the Ethernet interface 274. On the basis of this notifying packet, the CPU 271 controls the recording function or the externally connected recording device, thereby starting recording.

Figure 17:
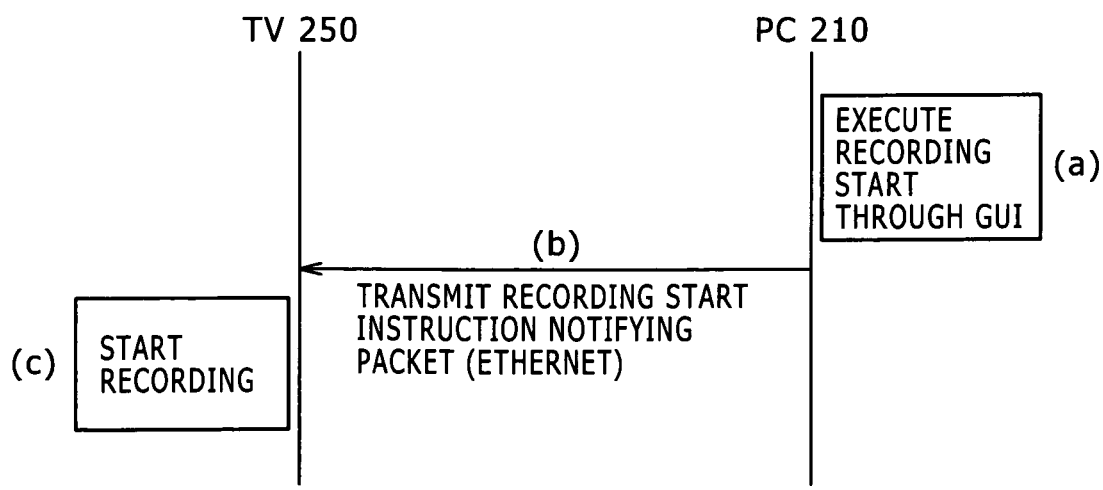
FIG. 17 is a sequence diagram illustrating an exemplary operation sequence in which recording by the recording function of the television receiver or an externally attached recording device is started from the personal computer.

FIG. 17 shows an exemplary operation sequence in which recording by a recording function of the television receiver 250 or an externally connected recording device is started from the personal computer 210.

(a) When the user executes an operation of recording start through the GUI, (b) the personal computer 210 transmits a recording start instruction notifying packet to the television receiver 250 by use of the high-speed data line. (c) In response, the television receiver 250 controls the recording function or the externally connected recording device to start recording.

Also, in the AV system 200 shown in FIGS. 1 and 2, the power to the television receiver 250 is turned on in cooperation with the turning on of the power to the personal computer 210.

In this case, when the power to the personal computer 210 is turned on by the user, the CPU 214 of the personal computer 210 generates a WakeOnLAN packet and transmits the generated WakeOnLAN packet to the television receiver 250 by use of the high-speed data line. Namely, the CPU 214 supplies the WakeOnLAN packet to the high-speed data line interface 213 via the Ethernet interface 223. The high-speed data line interface 213 transmits the received packet from the HDMI terminal 211 to the HDMI cable 351, eventually transmitting the packet to the television receiver 250.

The high-speed data line interface 253 of the television receiver 250 receives the above-mentioned WakeOnLAN packet transmitted from the personal computer 210 via the HDMI cable 351 and supplies the received notifying packet to the CPU 271 via the Ethernet interface 274. On the basis of the received notifying packet, the CPU 271 turns on the power to the television receiver 250 and executes input switching so as to display a screen of the personal computer 210.

Figure 18:
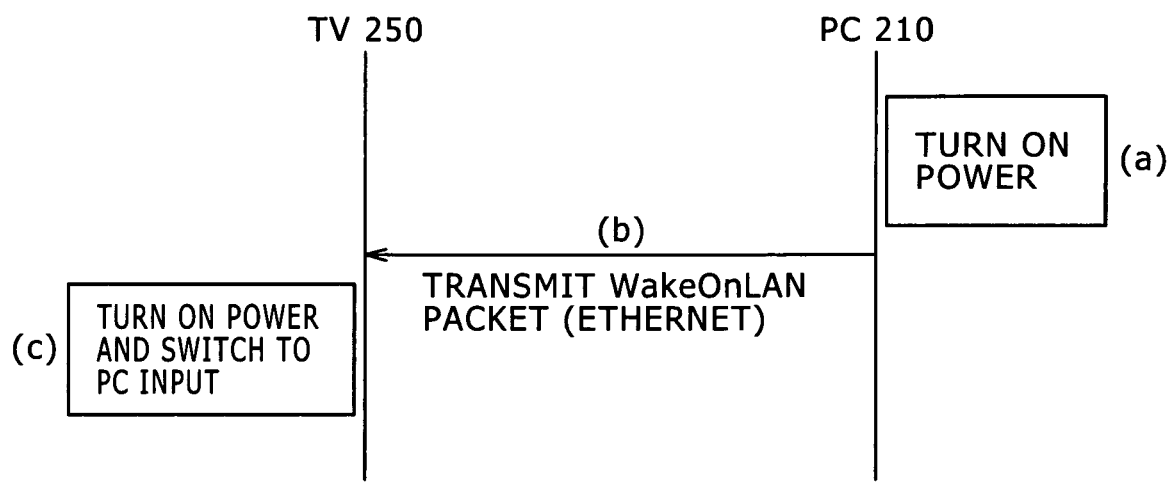
FIG. 18 is a sequence diagram illustrating an exemplary operation sequence the television receiver is powered on upon powering on of the personal computer.

FIG. 18 shows an exemplary operation sequence in which the power to the television receiver 250 is turned on in cooperation with the turning on of the power to the personal computer 210 as described above.

(a) When the user turns on the power to the personal computer 210 as described above, (b) the personal computer 210 transmits a WakeOnLAN packet to the television receiver 250 by use of the high-speed data line. (c) In response, the television receiver 250 turns on the power or executes an operation of switching to the PC input.

Further, the AV system 200 shown in FIGS. 1 and 2 can upload photographs (still images) held in the digital camera 310 to a server on the Internet in a status where the television receiver 250 is connected to the Internet.

Figure 19:
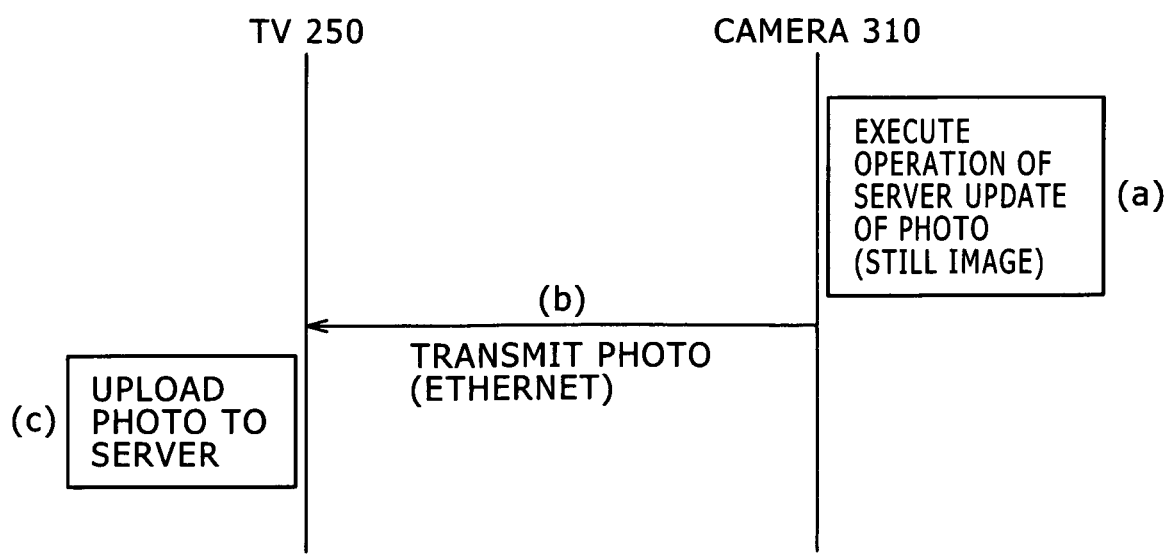
FIG. 19 is a sequence diagram illustrating an exemplary operation sequence in which a photograph (or a still image) held in the digital camera is uploaded to a server on the Internet with the television receiver connected thereto.

In this case, as shown in FIG. 19, (a) when the user executes a photograph (still image) server updating operation in the digital camera 310, (b) the digital camera 310 transmits a photograph (still image) to the television receiver 250 by use of the high-speed data line. (c) In response, the television receiver 250 uploads the photograph (still image) received from the digital camera 310 to a server on the Internet.

Further, the AV system 200 shown in FIGS. 1 and 2 is configured such that the digital camera 310 requests the television receiver 250 for a streaming of still images or moving images to record the streaming. The still images or moving images in this case include photographs (still images), television screen captures, program stream data, and so on held in the flash ROM 272 by the television receiver 250.

Figure 20:
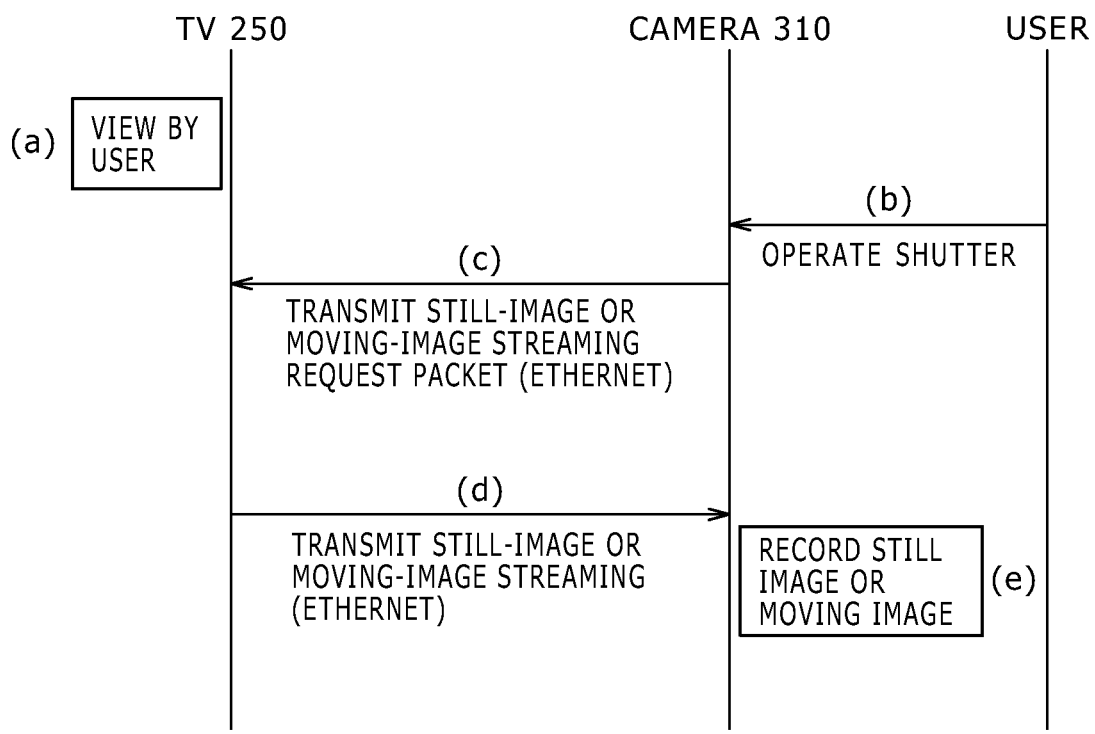
FIG. 20 is a sequence diagram illustrating an exemplary operation sequence in which a still image or moving image streaming is obtained by the digital camera from the television receiver and the obtained streaming is recorded by the digital camera.

In this case, as shown in FIG. 20, (a) in a status where the user is viewing a predetermined program on the television receiver 250, (b) if the user operates the shutter button of the digital camera 310, (c) the digital camera 310 transmits a still image or moving image streaming request packet to the television receiver 250 by use of the high-speed data line. It should be noted that a type (still image or moving image, for example) of image data that the television receiver 250 is requested is set in advance.

(d) Upon reception of the request packet, the television receiver 250 transmits the requested still image or moving image streaming to the digital camera 310 by use of the high-speed data line. (e) The digital camera 310 records the still image or moving image streaming received from the television receiver 250 to a recording media, such as a memory card, a flash ROM, or the like.

As described above, in the AV system 200 shown in FIGS. 1 and 2, the personal computer 210 receives stream data from the television receiver 250 by use of the high-speed data line and executes image analysis on the received stream data, thereby controlling stream data associated operations by use of a result of the image analysis. For example, the personal computer 210 analyzes stream data for ticker or face recognition and tags a recognition result to the stream data when recording the stream data. Also, for example, the personal computer 210 analyzes stream data to detect the beginning and end of a commercial to suppress displaying of the commercial on the television receiver 250. Further, for example, the personal computer 210 analyzes stream data to detect a particular subject (person or object) or a particular scene, thereby suppressing the turning on of the power to the television receiver 250. Therefore, in the AV system 200, the image analysis capabilities of the personal computer 210 can be effectively used.

It should be noted that, in the AV system 200 shown in FIGS. 1 and 2, the communication section that executes bidirectional communication is configured by the reserved line (Ethernet–line) or the HPD line (Ethernet+line) of the HDMI cable 351. However, the configuration of the communication section that executes bidirectional communication is not restricted to the above-mentioned configuration. The following describes other exemplary configurations. In each of the configurations shown below, it is assumed that the personal computer 210 be the source device and the television receiver 250 be the sink device.

Figure 21:
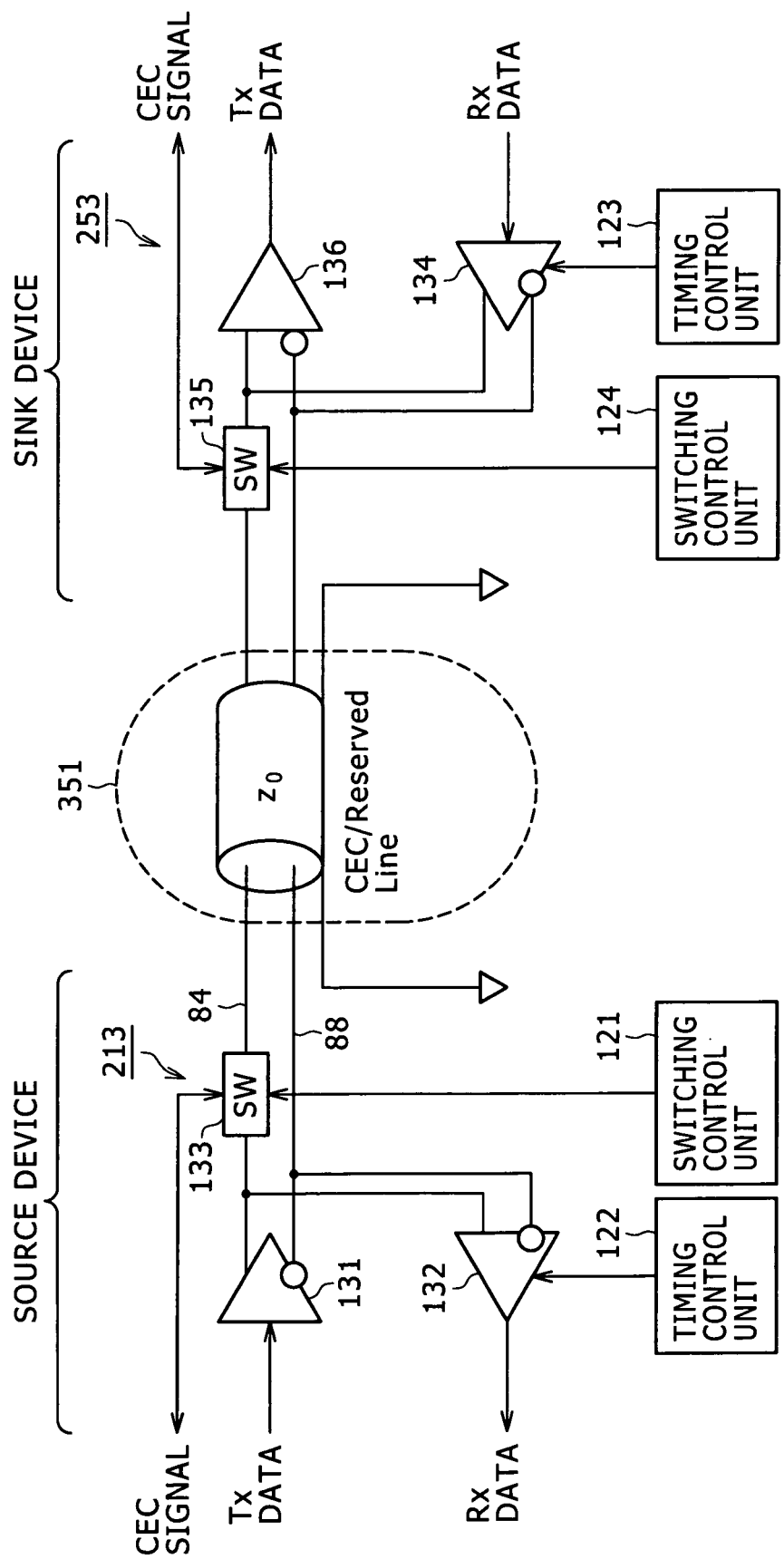
FIG. 21 is a connection diagram illustrating another exemplary configuration of a high-speed data line interface of the personal computer and the television receiver.

FIG. 21 shows an example in which IP communication is executed in a half-duplex communication manner by use of the CEC line 84 and the reserved line 88. With reference to FIG. 21, components similar to those previously described with FIG. 6 are denoted by the same reference numerals and the description thereof will be omitted as appropriate.

A high-speed data line interface 213 that is a source device has a conversion unit 131, a decoding unit 132, a switch 133, a switching control unit 121, and a timing control unit 122. The conversion unit 131 is supplied with Tx data that is data transmitted from the source device to the sink device by bidirectional IP communication between the source device and the sink device.

The conversion unit 131, made up of a differential amplifier for example, converts the supplied Tx data into a differential signal composed of two part signals. Also, the conversion unit 131 transmits a differential signal obtained by the conversion to the sink device via a CEC line 84 and a reserved line 88. Namely, the conversion unit 131 supplies one of the part signals making up the differential signal obtained by the conversion to the switch 133 via the CEC line 84, to be more specific, a signal line arranged on the source device and connected to the CEC line 84 of a HDMI cable 351, and the other part signal to the sink device via the reserved line 88, to be more specific, a signal line arranged on the source device and connected to the reserved line 88 of the HDMI cable 351.

The decoding unit 132, made up of a differential amplifier for example, is connected at an input terminal thereof to the CEC line 84 and the reserved line 88. Under the control of the timing control unit 122, the decoding unit 132 receives a differential signal transmitted from the sink device via the CEC line 84 and the reserved line 88, namely, a differential signal made up of a part signal on the CEC line 84 and a part signal on the reserved line 88, decodes the received differential signal into Rx data that is the original data, and outputs the decoded signal. The Rx data denotes data that is transmitted from the sink device to the source device by the bidirectional IP communication therebetween.

At the time of data transmission, the switch 133 is supplied with a CEC signal from a control section (CPU) of the source device or a part signal making up a differential signal corresponding to Tx data transmitted from the conversion unit 131; at the time of data reception, the switch 133 is supplied with a CEC signal from the sink device or a part signal making up a differential signal corresponding to Rx data from the sink device. Under the control of the switching control unit 121, the switch 133 selects a CEC signal from the control section (CPU), a CEC signal from the sink device, a part signal making up a differential signal corresponding to Tx data, or a part signal making up a differential signal corresponding to Rx data and outputs the selected signal.

Namely, when the source device transmits data to the sink device, the switch 133 selects a CEC signal transmitted from the control section (CPU) or one of the part signals supplied from the conversion unit 131 and transmits the selected CEC signal or part signal to the sink device via the CEC line 84.

Also, when the source device receives data from the sink device, the switch 133 receives a CEC signal transmitted from the sink device via the CEC line 84 or a part signal of a differential signal corresponding to Rx data and supplies the received CEC signal or part signal to the control section (CPU) or the decoding unit 132.

The switching control unit 121 controls the switch 133 to select one of signals that are supplied to the switch 133. The timing control unit 122 controls the timing of receiving a differential signal by the decoding unit 132.

The high-speed data line interface 253 has a conversion unit 134, a decoding unit 136, a switch 135, a switching control unit 124, and a timing control unit 123. the conversion unit 134, made up of a differential amplifier for example, is supplied with Rx data. The conversion unit 134 converts the supplied Rx data into a differential signal made up of two part signals and transmits the differential signal obtained by the conversion to the source device via the CEC line 84 and the reserved line 88.

Namely, the conversion unit 134 supplies one of the part signals making up a differential signal obtained by the conversion to the switch 135 via the CEC line 84, to be more specific, a signal line arranged on the sink device and connected to the CEC line 84 of the HDMI cable 351 and the other part signal making up the differential signal to the source device via the reserved line 88, to be more specific a signal line arranged on the sink device and connected to the reserved line 88 of the HDMI cable 351 and the reserved line 88.

When data is received, the switch 135 is supplied with a CEC signal from the source device or a part signal making up a differential signal corresponding to Tx data from the source device; when data is transmitted, the switch 135 is supplied with a part signal making up a differential signal corresponding to Rx data from the conversion unit 134 or a CEC signal from the control section (CPU) of the sink device. Under the control of the switching control unit 124, the switch 135 selects a CEC signal from the source device, a CEC signal from the control section (CPU), a part signal making up a differential signal corresponding to Tx data, or a part signal making up a differential signal corresponding to Rx data and outputs the selected signal.

Namely, when the sink device transmits data to the source device, the switch 135 selects a CEC signal transmitted from the control section (CPU) of the sink device or one of the part signals supplied from the conversion unit 134 and transmits the selected CEC signal or part signal to the source device via the CEC line 84.

Also, when the sink device receives data from the source device, the switch 135 receives a CEC signal transmitted from the source device via the CEC line 84 or a part signal of a differential signal corresponding to Tx data and supplies the received CEC signal or part signal to the control section (CPU) or the decoding unit 136.

The decoding unit 136, made up of a differential amplifier for example, is connected at an input terminal thereof to the CEC line 84 and the reserved line 88. The decoding unit 136 receives a differential signal transmitted from the source device via the CEC line 84 and the reserved line 88, namely, a differential signal made up of a part signal on the CEC line 84 and a part signal on the reserved line 88, decodes the received differential signal into Tx data that is the original data, and outputs the decoded signal.

The switching control unit 124 controls the switch 135 to select one of signals that are supplied to the switch 135. The timing control unit 123 controls the timing of transmitting a differential signal by the conversion unit 134.

Figure 22:
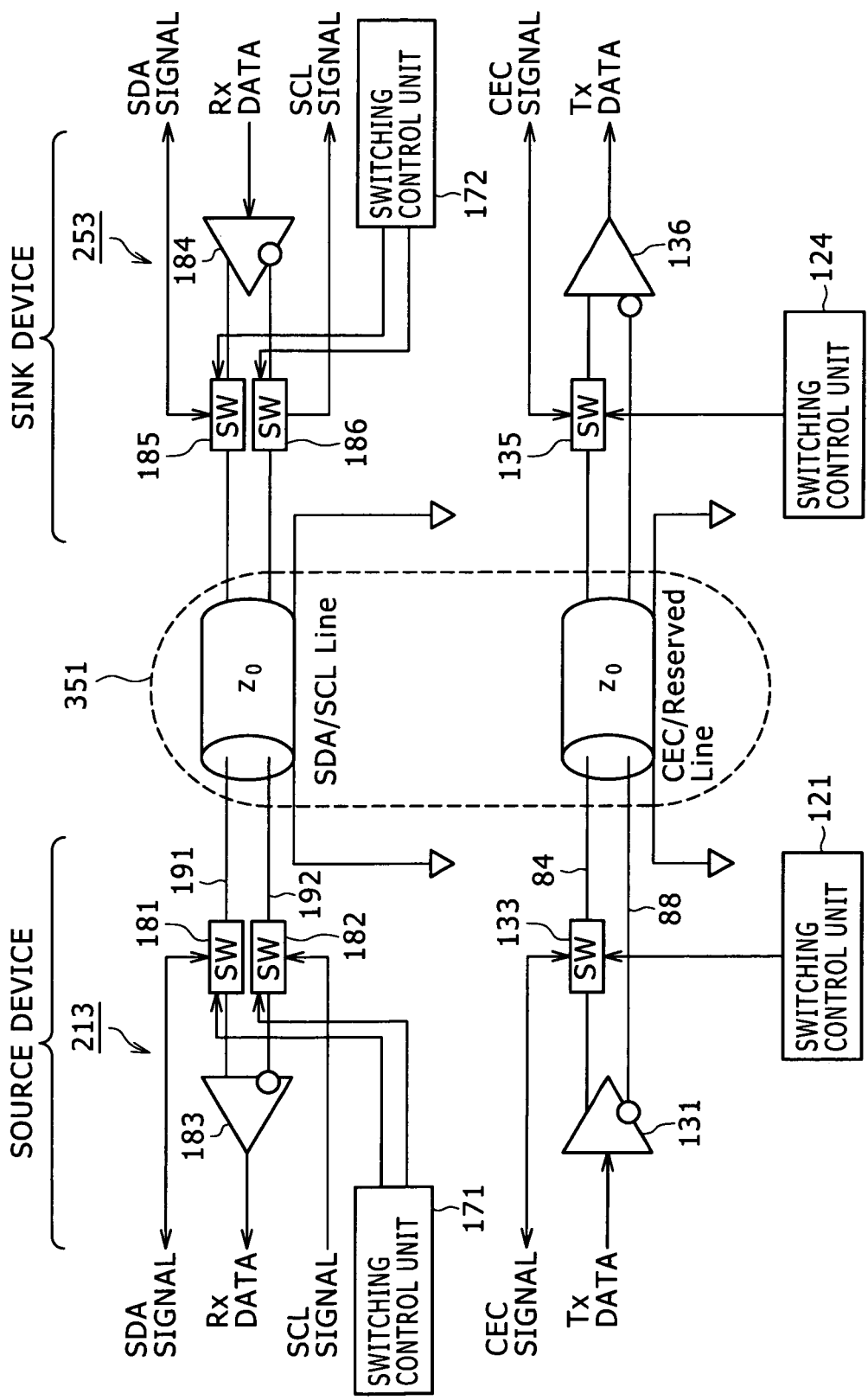
FIG. 22 is a connection diagram illustrating still another exemplary configuration of a high-speed data line interface of the personal computer and the television receiver.

FIG. 22 shows an example in which IP communication based on full-duplex communication is executed by use of a signal line (an SDA line) along which an SDA signal is transmitted and a signal line (an SCL line) along which an SCL signal is transmitted. It should be noted that, with reference to FIG. 22, components similar to those previously described with reference to FIG. 21 are denoted by the same reference numerals and the description thereof will be omitted appropriately.

A high-speed data line interface 213 of a source device has a conversion unit 131, a switch 133, a switch 181, a switch 182, a decoding unit 183, a switching control unit 121, and a switching control unit 171.

When data is transmitted, the switch 181 is supplied with an SDA signal from a control section (CPU) of a source device; when data is received, the switch 181 is supplied with an SDA signal from a sink device or a part signal making up a differential signal corresponding to Rx data from the sink device. Under the control of the switching control unit 171, the switch 181 selects an SDA signal from the control section (CPU), an SDA signal from the sink device, or a part signal making up a differential signal corresponding to Rx data and outputs the selected signal.

Namely, when the source device receives data from the sink device, the switch 181 receives an SDA signal transmitted from the sink device via an SDA line 191 that is a signal line along which an SDA signal is transmitted or a part signal of a differential signal corresponding to Rx data and supplies the received SDA signal or part signal to the control section (CPU) or the decoding unit 183.

When the source device transmits data to the sink device, the switch 181 transmits an SDA signal supplied from the control section (CPU) to the sink device via the SDA line 191 or nothing to the sink device.

When data is transmitted, the switch 182 is supplied with an SCL signal from the control section (CPU) of the source device; when data is received, the switch 181 is supplied with a part signal making up a differential signal corresponding to Rx data from the sink device. Under the control of the switching control unit 171, the switch 182 selects the SCL signal or the part signal making up the differential signal corresponding to Rx data and outputs the selected signal.

Namely, when the source device receives data from the sink device, the switch 182 receives the part signal of the differential signal corresponding to Rx data transmitted from the sink device via an SCL line 192 that is the signal line along which an SCL signal is transmitted and supplies the received part signal or nothing to the decoding unit 183.

When the source device transmits data to sink device, the switch 182 transmits an SCL signal supplied from the control section (CPU) of the source device to the sink device via the SCL line 192 or nothing to the sink device.

The decoding unit 183, made up of a differential amplifier for example, is connected at an input terminal thereof to the SDA line 191 and the SCL line 192. The decoding unit 183 receives a differential signal transmitted from the sink device via the SDA line 191 and the SCL line 192, namely, a differential signal made up of a part signal on the SDA line 191 and a part signal on the SCL line 192, decodes the received differential signal into Rx data that is the original data, and outputs the decoded signal.

The switching control unit 171 controls the switch 181 and the switch 182 such that one of the signals to be supplied is selected for each switch.

The high-speed data line interface 253 making up the sink device has a conversion unit 184, a switch 135, a switch 185, a switch 186, a decoding unit 136, a switching control unit 172, and a switching control unit 124.

The conversion unit 184, made up of a differential amplifier for example, is supplied with Rx data. The conversion unit 184 converts the supplied Rx data into a differential signal made up of two part signals and transmits the differential signal obtained by the conversion to the source device via the SDA line 191 and the SCL line 192. Namely, the conversion unit 184 transmits one part signal making up the differential signal obtained by the conversion to the source device via the switch 185 and the other part signal making up the differential signal to the source device via the switch 186.

When data is transmitted, the switch 185 is supplied with a part signal making up a differential signal corresponding to Rx data from the conversion unit 184 or an SDA signal from the control section (CPU) of the sink device; when data is received, the switch 185 is supplied with an SDA signal from the source device. Under the control of the switching control unit 172, the switch 185 selects an SDA signal from the control section (CPU), an SDA signal from the source device, or a part signal making up a differential signal corresponding to Rx data and outputs the selected signal.

Namely, when the data is received by the sink device from the source device, the switch 185 receives the SDA signal transmitted from the source device via the SDA line 191 and supplies the received SDA signal to the control section (CPU) or receives nothing.

Also, when the sink device transmits data to the source device, the switch 185 transmits an SDA signal supplied from the control section (CPU) or a part signal supplied from the conversion unit 184 to the source device via the SDA line 191.

When data is transmitted, the switch 186 is supplied with a part signal making up a differential signal corresponding to Rx data from the conversion unit 184; when data is received, the switch 186 is supplied with an SCL signal from the source device. Under the control of the switching control unit 172, the switch 186 selects the part signal making up the differential signal corresponding to Rx data or the SCL signal and outputs the selected signal.

Namely, when data is received by the sink device from the source device, the switch 186 receives an SCL signal transmitted from the source device via the SCL line 192 and supplies the received SCL signal to the control section (CPU) or receives nothing.

Also, when data is received by the source device from the sink device, the switch 186 transmits a part signal supplied from the conversion unit 184 to the source device via the SCL line 192 or transmits nothing.

The switching control unit 172 controls switching the switch 185 and the switch 186 such that one of the supplied signals is selected for each switch.

It should be noted that, when IP communication is executed between the source device and the sink device, the availability of half-duplex communication or full-duplex communication is determined by the configurations of the source device and the sink device. Therefore, the source device references E-EDID received from the sink device to determine whether to execute half-duplex communication, full-duplex communication, or bidirectional communication based on CEC signal transfer.

Figure 23:
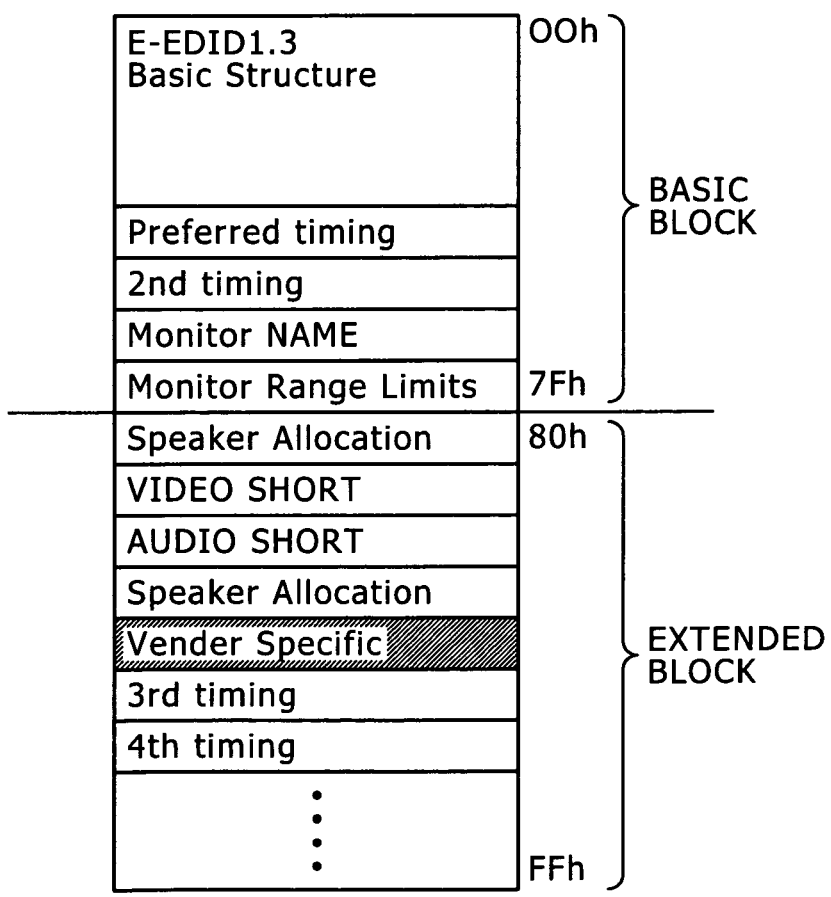
FIG. 23 is a schematic diagram illustrating a structure of E-EDID to be received by the source device.

The E-EDID that is received by the source device is made up of a basic block and an extended block as shown in FIG. 23, for example.

The basic block of E-EDID starts with data defined by the E-EDID 1.3 standard represented by "E-EDID 1.3 Basic Structure" followed by timing information for maintaining compatibility with the EDID of the past represented by "Preferred timing" and timing information, different from "Preferred timing," for maintaining the EDID of the past represented by "2nd timing."

In the basic block, "2nd timing" is followed by information indicative of the name of a display apparatus represented by "Monitor NAME" and information indicative of the number of displayable pixels represented by "Monitor Range Limits" when aspect ratios are 4:3 and 16:9, in this order.

The extended block starts with information associated with right and left loudspeakers represented by "Speaker Allocation," information indicative of displayable image size, frame rate, and interlaced/progressive, represented by "VIDEO SHORT," data written with information such as aspect ratio, data written with information such as reproducible audio codec, sampling frequency, cutoff frequency, and codec bit count, represented by "AUDIO SHORT," and information associated with right and left loudspeakers represented by "Speaker Allocation," in this order.

Also, in the extended block, "Speaker Allocation" is followed by data uniquely defined for each maker represented by "Vender Specific," timing information for maintaining compatibility with the EDID of the past represented by "3rd timing," and timing information for maintaining compatibility with the EDID of the past represented by "4th timing."

Further, data represented by "Vender Specific" has a data structure shown in FIG. 24. Namely, the data represented by "Vender Specific" has block 0 through block N, each being one byte long.

Block 0 arranged at the beginning of data represented by "Vender Specific" includes a header indicative of a data area of data "Vender Specific" represented by "Vender-Specific tag code (=3)" and information indicative of a length of data "Vender Specific" represented by "Length (=N)."

Also, block 1 through block 3 have information indicative of number "0x000C03" registered for HDMI(R) represented by "24 bit IEEE Registration Identifier (0x000C03) LSB first." In addition, block 4 and block 5 have information indicative of the physical address of the sink device of 24 bits represented by "A," "B," "C," and "D," respectively.

Block 6 has a flag indicative of a function corresponding to the sink device represented by "Supports-AI," information for specifying the number of bits per pixel represented by "DC-48 bit," "DC-36 bit," and "DC-30 bit," a flag indicative of the compatibility of the sink device with the transmission of an image of YCbCr4:4:4 represented by "DC-Y444," and a flag indicative of the compatibility of the sink device with dual DVI (Digital Visual Interface) represented by "DVI-Dual."

Block 7 has information indicative of a maximum frequency of TMDS pixel clock represented by "Max-TMDS-Clock." Block 8 has a flag indicative of presence or absence of video and audio latency information represented by "Latency", a full-duplex flag indicative of the availability of full-duplex communication represented by "Full Duplex", and a half-duplex flag indicative of the availability of half-duplex communication represented by "Half Duplex."

For example, if the full-duplex flag is set (set to "1" for example), it is indicative that the sink device has a function of executing full-duplex communication, namely, the sink device has the configuration shown in FIG. 22; if the full-duplex flag is reset (set to "0" for example), it indicates that the sink device has no function of executing full-duplex communication.

Likewise, if the half-duplex flag is set (set to "1" for example), it is indicative that the sink device has a function of executing half-duplex communication, namely, the sink device has the configuration shown in FIG. 21; if the half-duplex flag is reset (set to "0" for example), it indicates that the sink device has no function of executing half-duplex communication.

Block 9 of the data represented by "Vender Specific" has progressive video latency time data represented by "Video Latency." Block 10 has audio latency time data accompanying progressive video represented by "Audio Latency." Block 11 has interlaced video latency time data represented by "Interlaced Video Latency." Block 12 has audio latency time data accompanying interlaced video represented by "Interlaced Audio Latency."

On the basis of the full-duplex flag and the half-duplex flag included in the E-EDID received from the sink device, the source device determines whether to execute half-duplex communication or full-duplex communication or bidirectional communication based on CEC signal transfer. According to a result of this decision, the source device carries out bidirectional communication with the sink device.

For example, if the source device has the configuration shown in FIG. 21, the source device can execute half-duplex communication with the sink device shown in FIG. 21 but not with the sink device shown in FIG. 22. Therefore, the source device starts communication processing when the power to the source device is turned on, hereby carrying out bidirectional communication according to the capabilities of the sink device connected to the source device.

Figure 25:
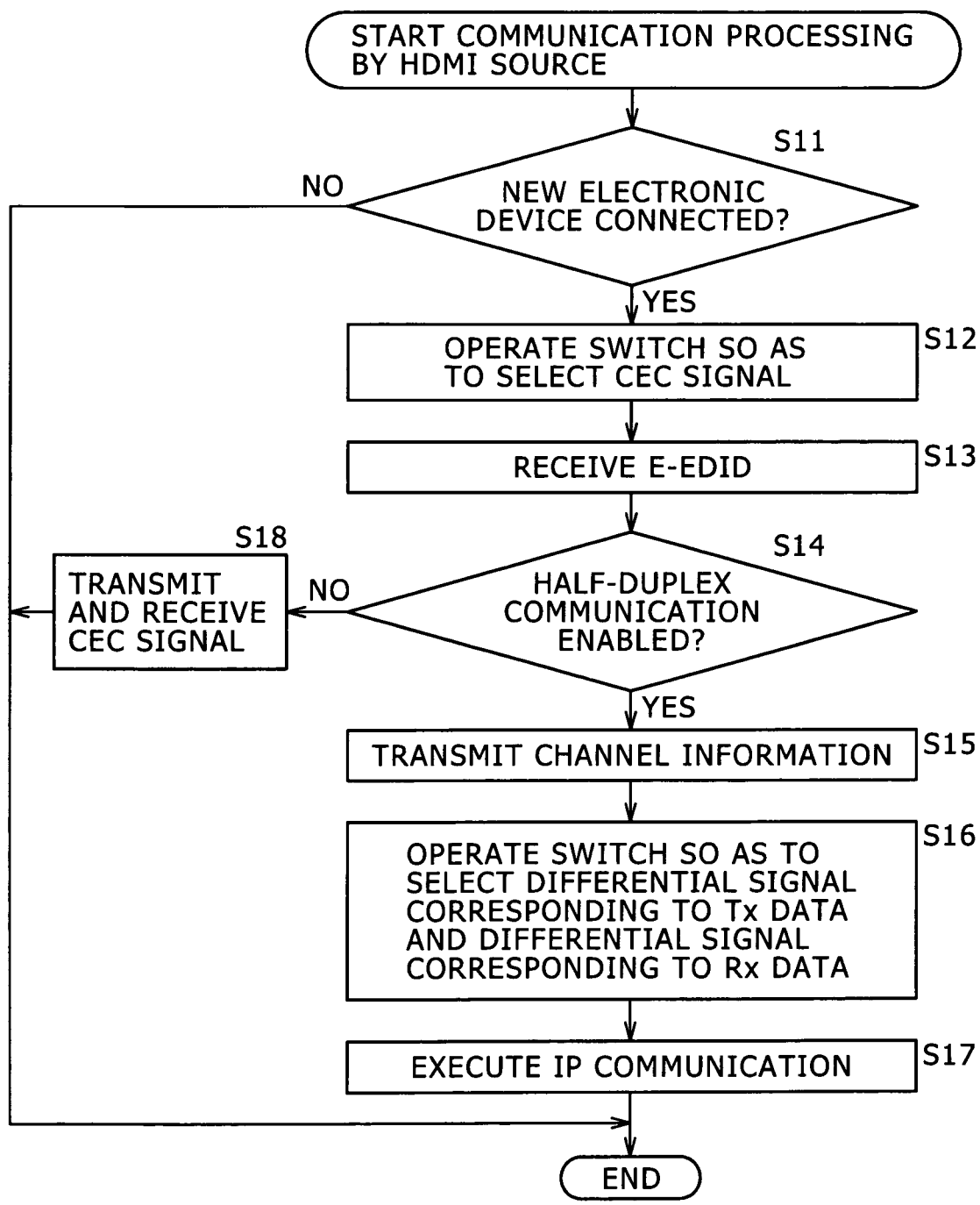
FIG. 25 is a flowchart indicative of communication processing by the source device.

The following describes communication processing to be executed by the source device shown in FIG. 21 with reference to the flowchart shown in FIG. 25.

In step S11, the source device determines whether a new electronic device has been connected to the source device. For example, on the basis of the magnitude of a voltage applied to a pin called Hot Plug Detect to which the line 86 is connected, the source device determines whether a new electronic device (or a sink device) has been connected or not.

If no new electronic device is found connected in step S11, then no communication is carried out, so that the communication processing comes to an end. If a new electronic device is found connected in step S11, then the switching control unit 121 controls the switch 133 in step S12 so as to set the switch 133 to select a CEC signal from the control section (CPU) of the source device at the time of data transmission and select a CEC signal from the sink device at the time of data reception.

In step S13, the source device receives the E-EDID transmitted from the sink device via the DDC 83. Namely, upon detection of the connection with the source device, the sink device reads E-EDID from the EDID ROM 85 and transmits the read E-EDID to the source device via the DDC 83, so that the source device receives the E-EDID transmitted from the sink device.

In step S14, the source device determines whether half-duplex communication with the sink device can be carried out or not. Namely, referencing the E-EDID received from the sink device, the source device determines whether half-duplex flag "Half Duplex" shown in FIG. 24 is set or not. If the half-duplex flag is found set, for example, the source device determines that the bidirectional IP communication based on half-duplex communication is enabled, namely, half-duplex communication enabled.

If half-duplex communication is found enabled in step S14, then, the source device transmits, in step S15, a signal telling that IP communication based on half-duplex communication using the CEC line 84 and the reserved line 88 is carried out to the sink device via the switch 133 and the CEC line 84 as channel information indicative of a channel for use in bidirectional communication.

Namely, if the half-duplex flag is set, the source device knows that the sink device has the configuration shown in FIG. 21 and the half-duplex communication using the CEC line 84 and the reserved line 88 is enabled, so that the source device transmits the channel information to the sink device to notify the sink device of the execution of half-duplex communication.

In step S16, the switching control unit 121 controls the switch 133 to select a differential signal corresponding to Tx data from the conversion unit 131 at the time of data transmission and select a differential signal corresponding to Rx data from the sink device at the time of data reception.

In step S17, each section of the source device executes bidirectional IP communication with the sink device by half-duplex communication, upon which the communication processing comes to an end. To be more specific, at the time of data transmission, the conversion unit 131 converts the Tx data supplied from the control section (CPU) into a differential signal, transmits one of the part signals making up the differential signal obtained by the conversion to the switch 133, and transmits the other part signal to the sink device via the reserved line 88. The switch 133 transmits the part signal supplied from the conversion unit 131 to the sink device via the CEC line 84. Consequently, the differential signal corresponding to Tx data is transmitted from the source device to the sink device.

At the time of data reception, the decoding unit 132 receives a differential signal corresponding to Rx data transmitted from the sink device. To be more specific, the switch 133 receives a part signal of a differential signal corresponding to Rx data transmitted from the sink device via the CEC line 84 and supplies the received part signal to the decoding unit 132. Under the control of the timing control unit 122, the decoding unit 132 decodes differential signal made up of the part signal supplied from the switch 133 and the part signal supplied from the sink device via the reserved line 88 into the Rx data that is the original data and outputs the Rx data to the control section (CPU).

Consequently, the source device transmits and receives various data, such as control data, pixel data, and audio data, with the sink device.

If half-duplex communication is found not enabled in step S14, then the source device transmits and receives CEC signals in step S18 to carry out bidirectional communication with the sink device, upon which the communication processing comes to an end.

Namely, at the time of data transmission, the source device transmits a CEC signal to the sink device via the switch 133 and the CEC line 84 and, at the time of data reception, receives a CEC signal transmitted from the sink device via the switch 133 and the CEC line 84, thereby transmitting and receiving control data with the sink device.

Thus, the source device refers to the half-duplex flag to carry out half-duplex communication with the sink device enabled for half-duplex communication, by use of the CEC line 84 and the reserved line 88.

As described above, carrying out the half-duplex communication based on the CEC line 84 and the reserved line 88, namely, the IP communication based on half-duplex communication with the sink device by selecting the data to be transmitted and received by setting the switch 133 allows high-speed bidirectional communication while maintaining the compatibility with the HDMI of the past.

Further, as with the source device, the sink device also starts communication processing when the power to the sink device is turned on, thereby carrying out bidirectional communication with the source device.

Figure 26:
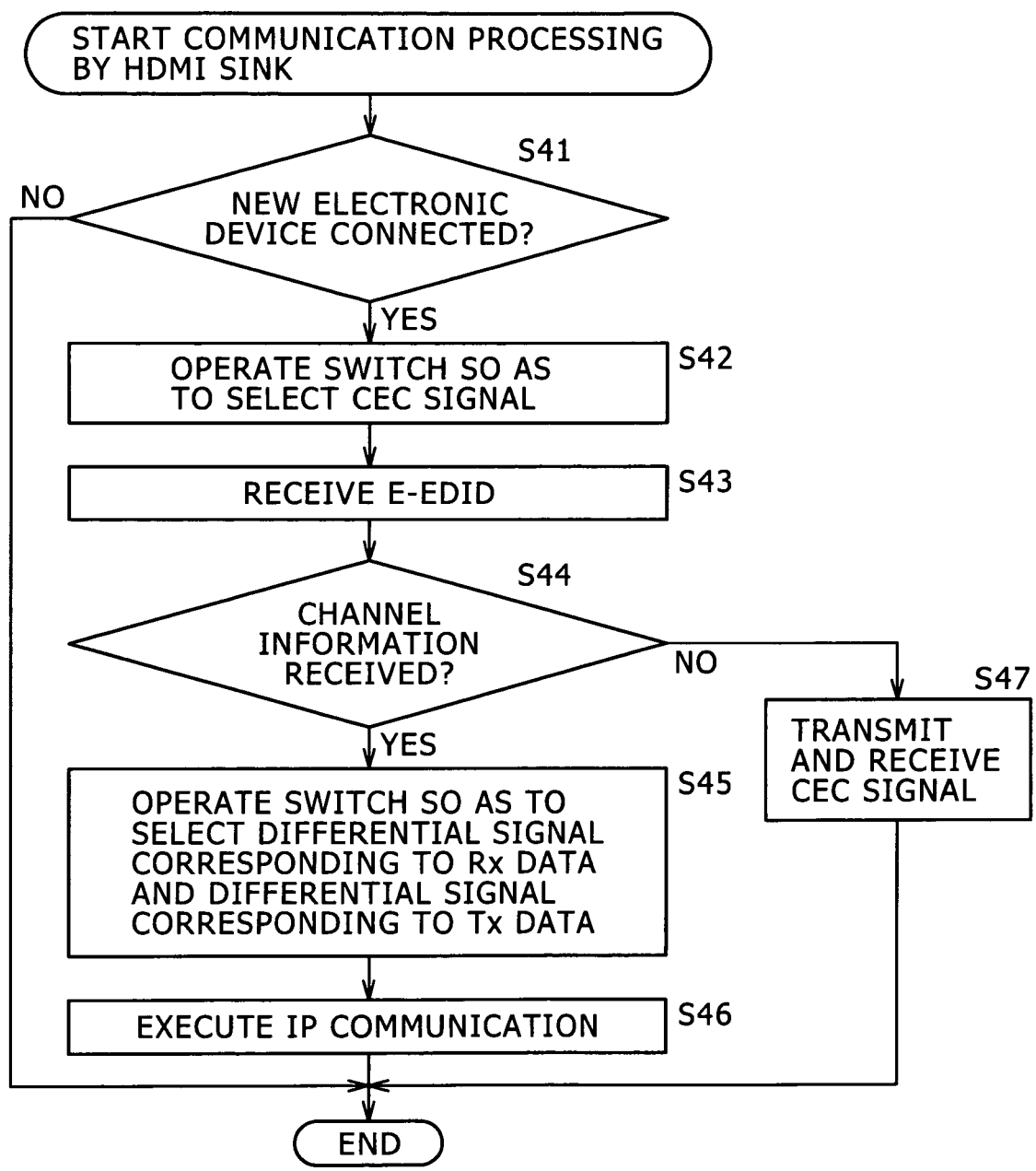
FIG. 26 is a flowchart indicative of communication processing by the sink device.

The following describes communication processing to be executed by the sink device shown in FIG. 21 with reference to the flowchart shown in FIG. 26.

In step S41, a sink device determines whether a new electronic device (or a source device) has been connected to the sink device. For example, on the basis of the magnitude of a voltage applied to a pin called Hot Plug Detect to which the line 86 is connected, the sink device determines whether a new electronic device has been connected or not.

If no new electronic device is found connected in step S41, then no communication is carried out, so that the communication processing comes to an end. If a new electronic device is found connected in step S41, then the switching control unit 124 controls the switch 135 in step S42 so as to set the switch 135 to select a CEC signal from the control section (CPU) of the sink device at the time of data transmission and select a CEC signal from the source device at the time of data reception.

In step S43, the sink device reads E-EDID from the EDID ROM 85 and transmits the read E-EDID to the source device via the DDC 83.

In step S44, the sink device determines whether channel information has been received from the source device.

To be more specific, channel information indicative of a bidirectional communication channel is transmitted from the source device depending on the functions of the source device and the sink device. For example, if the source device has the configuration shown in FIG. 21, the source device and the sink device are enabled for the half-duplex communication based on the CEC line 84 and the reserved line 88. Hence, from the source device to the sink device, channel information is transmitted telling that the IP communication based on the CEC line 84 and the reserved line 88 is carried out. The sink device receives the channel information transmitted from the source device via the switch 135 and the reserved line 88, thereby determining that the channel information has been received.

In contrast, if the source device has no function of executing half-duplex communication, no channel information is transmitted from the source device to the sink device, so that the sink device determines that no channel information has been received.

If the channel information is found received in step S44, then the procedure goes to step S45, in which the switching control unit 124 controls the switch 135 to select a differential signal corresponding to Rx data from the conversion unit 134 at the time of data transmission and select a differential signal corresponding to Tx data from the source device at the time of data reception.

In step S46, the sink device carries out bidirectional IP communication with the source device by half-duplex communication, upon which the communication processing comes to an end. To be more specific, at the time of data transmission, under the control of the timing control unit 123, the conversion unit 134 converts the Rx data supplied from the control section (CPU) of the sink device into a differential signal, supplies one of the part signals making up the differential signal obtained by this conversion to the switch 135, and supplies the other part signal to the source device via the reserved line 88. The switch 135 transmits the part signal supplied from the conversion unit 134 to the source device via the CEC line 84. Consequently, the differential signal corresponding to Rx data is transmitted from the sink device to the source device.

At the time of data reception, the decoding unit 136 receives the differential signal corresponding to Tx data transmitted from the source device. To be more specific, the switch 135 receives the part signal of the differential signal corresponding to Tx data transmitted from the source device via the CEC line 84 and supplies the received part signal to the decoding unit 136. The decoding unit 136 decodes the differential signal made up of the part signal supplied from the switch 135 and the part signal supplied from the source device via the reserved line 88 into the Tx data that is the original data and outputs the Tx data to the control section (CPU).

Consequently, the sink device transmits and receives various data, such as control data, pixel data, and audio data, with the source device.

If no channel information is found received in step S44, then the sink device transmits and receives CEC signals in step S47 to carry out bidirectional communication with the source device, upon which the communication processing comes to an end.

Namely, at the time of data transmission, the sink device transmits a CEC signal to the sink device via the switch 135 and the CEC line 84 and, at the time of data reception, receives a CEC signal transmitted from the source device via the switch 135 and the CEC line 84, thereby transmitting and receiving control data with the source device.

Thus, upon reception of the channel information, the sink device carries out half duplex communication with the source device by use of the CEC line 84 and the reserved line 88.

As described above, carrying out the half-duplex communication based on the CEC line 84 and the reserved line 88 with the source device by selecting the data to be transmitted and received by setting the switch 135 allows high-speed bidirectional communication while maintaining the compatibility with the HDMI of the past.

If the source device has the configuration shown in FIG. 22, the source device determines, in the communication processing, on the basis of the full-duplex flag contained in the E-EDID whether the sink device has a function of executing full-duplex communication, thereby carrying out bidirectional communication according to a result of this determination.

Figure 27:
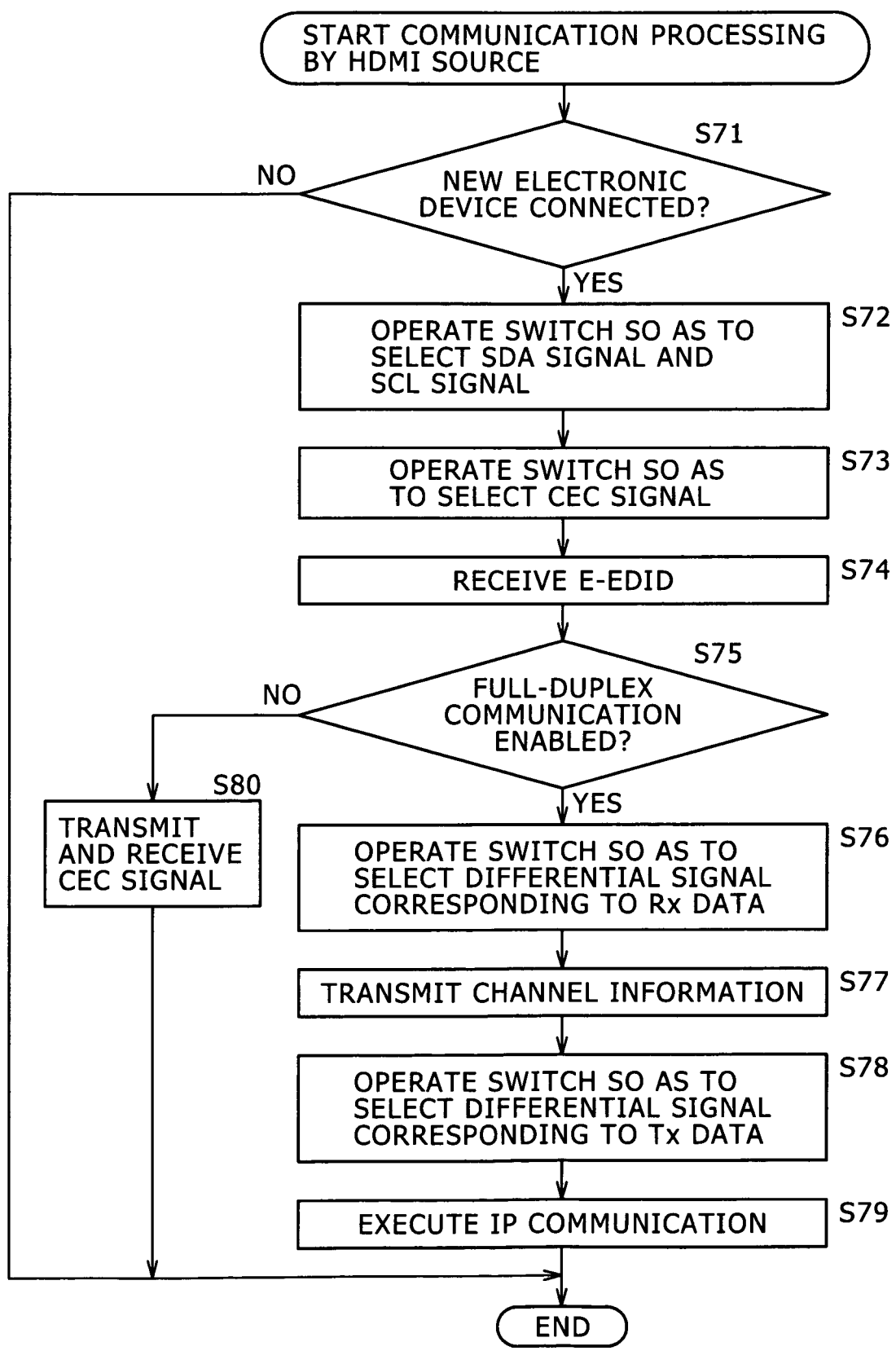
FIG. 27 is a flowchart indicative of communication processing by the source device.

The following describes communication processing to be carried out by the source device shown in FIG. 22 with reference to the flowchart shown in FIG. 27.

In step S71, the source device determines whether a new electronic device has been connected to the source device. If no new electronic device is found connected in step S71, then no communication is carried out, upon which the communication processing comes to an end.

If a new electronic device is found connected in step S71, then, the switching control unit 171 controls the switch 181 and the switch 182 in step S72 to select an SDA signal from the control section (CPU) of the source device through the switch 181 at the time of data transmission, select an SCL signal from the control section (CPU) of the source device through the switch 182, and select, at the time of data reception, an SDA signal from the sink device through the switch 181.

In step S73, the switching control unit 121 controls the switch 133 to select a CEC signal from the control section (CPU) of the source device at the time of data transmission and a CEC signal from the sink device at the time of data reception.

In step S74, the source device receives E-EDID transmitted from the sink device via the SDA line 191 of the DDC 83. Namely, upon detection of the connection with the source device, the sink device reads E-EDID from the EDID ROM 85 and transmits the read E-EDID to the source device via the SDA line 191 of the DDC 83, so that the source device receives the E-EDID transmitted from the sink device.

In step S75, the source device determines whether full-duplex communication with the sink device is enabled or not. To be more specific, the sink device references the E-EDID received from the sink device to determine whether the full-duplex flag "Full Duplex" shown in FIG. 24 is set or not. For example, if the full-duplex flag is found set, the source device determines the bidirectional IP communication based on full-duplex communication, namely, the full-duplex communication is enabled or not.

If the full-duplex communication is found enabled in step S75, then the switching control unit 171 controls the switch 181 and the switch 182 in step S76 to select a differential signal corresponding to Rx data from the sink device at the time of data reception.

Namely, the at the time if data reception, the switching control unit 171 controls the switch 181 and the switch 182 such that, of the part signals making up a differential signal corresponding to Rx data transmitted form the sink device, one part signal transmitted via the SDA line 191 is selected through the switch 181 and the other part signal transmitted via the SCL line 192 is selected through the switch 182.

The SDA line 191 and the SCL line 192 making up the DDC 83 are used no more after E-EDID has been transmitted from the sink device to the source device, namely, the transmission and reception of an SDA signal and an SCL signal via the SDA line 191 and the SCL line 192 are not carried out after the transmission of E-EDID, so that the SDA line 191 and the SCL line 192 can be used as Rx data transmission paths based on full-duplex communication by switching the switch 181 and the switch 182.

In step S77, the source device transmits a signal telling that the IP communication based on full-duplex communication using the CEC line 84 and the reserved line 88 and the SDA line 191 and the SCL line 192 is carried out to the sink device via the switch 133 and the CEC line 84 as channel information indicative of a bidirectional communication channel.

To be more specific, if the full-duplex flag is not set, the source device knows that the sink device has the configuration shown in FIG. 22 and the full-duplex communication using the CEC line 84 and the reserved line 88 and the SDA line 191 and the SCL line 192 is enabled, so that the source device transmits the channel information to the sink device telling that the full-duplex communication is carried out.

In step S78, the switching control unit 121 controls the switch 133 to select a differential signal corresponding to Tx data from the conversion unit 131 at the time if data transmission. Namely, the switching control unit 121 controls the switch 133 such that a part signal of the differential signal corresponding to Tx data supplied from the conversion unit 131 to the switch 133 is selected.

In step S79, the source device, carries out bidirectional IP communication with the sink device, upon which the communication processing comes to an end. To be more specific, at the time of data transmission, the conversion unit 131 converts Tx data supplied from the control section (CPU) of the source device into a differential signal, supplies of the part signals making up this differential signal to the switch 133, and transmits the other part signal to the sink device via the reserved line 88. The switch 133 transmits the part signal supplied from the conversion unit 131 to the sink device via the CEC line 84. Consequently, the differential signal corresponding to Tx data is transmitted from the source device to the sink device.

At the time of data reception, the decoding unit 183 receives a differential signal corresponding to Rx signal transmitted from the sink device. To be more specific, the switch 181 receives one of the part signals of a differential signal corresponding to Rx data from the sink signal via the SDA line 191 and supplies the received part signal to the decoding unit 183. The switch 182 receives the other part signal of the differential signal corresponding to Rx data from the sink signal via the SCL line 192 and supplies the received part signal to the decoding unit 183. The decoding unit 183 decodes the differential signal made up of the part signal supplied from the switch 181 and the switch 182 into the Rx data that is the original data and outputs the Rx data to the control section (CPU).

Consequently, the source device transmits and receives various data, such as control data, pixel data, and audio data, with the sink device.

If the full-duplex communication is found not enabled in step S75, then the source device carries out bidirectional communication with the sink device by transmitting and receiving CEC signals in step S80, upon which the communication processing ends.

Namely, at the time of data transmission, the source device transmits a CEC signal to the sink device via the switch 133 and the CEC line 84 and, at the time of data reception, receives a CEC signal transmitted from the sink device via the switch 133 and the CEC line 84, thereby transmitting and receiving control data with the sink device.

Thus, the source device refers to the full-duplex flag to carry out the full-duplex communication with the sink device enabled for full-duplex communication using the CEC line 84 and the reserved line 88 and the SDA line 191 and the SCL line 192.

As described above, carrying out the full-duplex communication based on the CEC line 84 and the reserved line 88 and the SDA line 191 and the SCL line 192 with the sink device by selecting the data to be transmitted and received by setting the switch 133, the switch 181, and the switch 182 allows high-speed bidirectional communication while maintaining the compatibility with the HDMI of the past.

If the sink device has the configuration shown in FIG. 22, the sink device carries out communication processing in the same manner as with the sink device shown in FIG. 21, thereby executing bidirectional communication with the source device.

Figure 28:
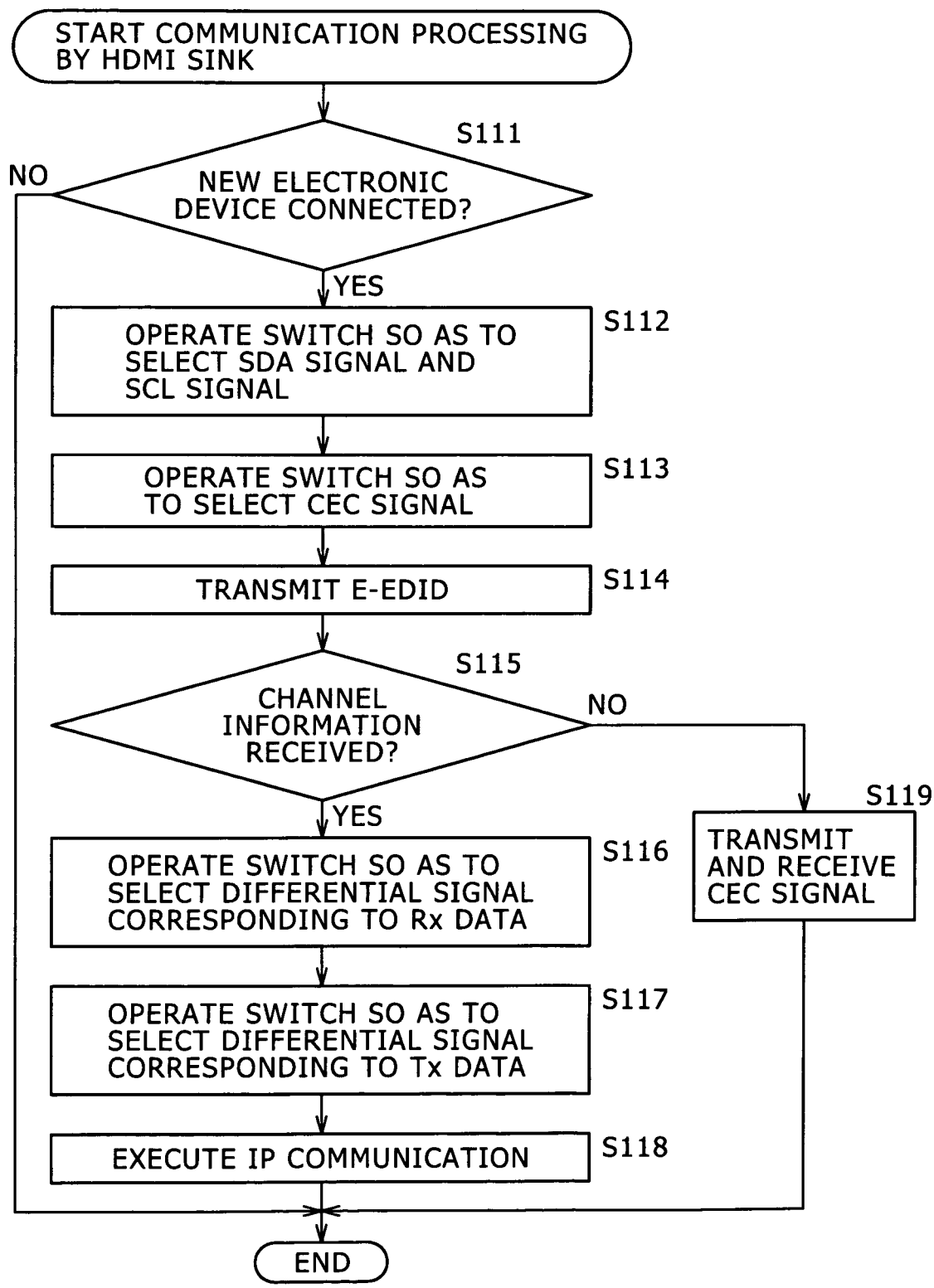
FIG. 28 is a flowchart indicative of communication processing by the sink device.

The following describes communication processing to be carried out by the sink device shown in FIG. 22 with reference to the flowchart shown in FIG. 28.

In step S111, the sink device determines whether a new electronic device (a source device) has been connected or not. If no new electronic device is found connected in step S111, no communication is carried out, upon which the communication processing comes to an end.

If a new electronic device is found connected in step S111, then the switching control unit 172 controls the switch 185 and the switch 186 in step S112 to select an SDA signal from the control section (CPU) of the sink device through the switch 185 at the time of data transmission and selects an SDA signal from the source device through the switch 185 and an SCL signal from the source device through the switch 186 at the time of data reception.

In step S113, the switching control unit 124 controls the switch 135 to select a CEC signal from the control section (CPU) of the sink device at the time of data transmission and a CEC signal from the source device at the time of data reception.

In step S114, the sink device reads E-EDID from the EDID ROM 85 and transmits the read E-EDID to the source device via the switch 185 and the SDA line 191 of the DDC 83.

In step S115, the sink device determines whether channel information transmitted from the source device has been received or not.

To be more specific, channel information indicative of a bidirectional communication channel is transmitted from the source device depending on the functions of the source device and the sink device. For example, if the source device has the configuration shown in FIG. 14, the source device and the sink device are enabled for the full-duplex communication. Hence, from the source device to the sink device, channel information is transmitted telling that the IP communication based on the CEC line 84 and the reserved line 88 and the SDA line 191 and the SCL line 192 is carried out. The sink device receives the channel information transmitted from the source device via the switch 135 and the CEC line 84, thereby determining that the channel information has been received.

In contrast, if the source device has no function of executing full-duplex communication, no channel information is transmitted from the source device to the sink device, so that the sink device determines that no channel information has been received.

If the channel information is found received in step S115, then the procedure goes to step S116, in which the switching control unit 172 controls the switch 185 and the switch 186 to select a differential signal corresponding to Rx data from the conversion unit 184 at the time of data transmission.

In step S117, the switching control unit 124 controls the switch 135 to select a differential signal corresponding to Tx data from the source device at the time of data reception.

In step S118, the sink device carries out bidirectional IP communication based on full-duplex communication, upon which the communication processing comes to an end. To be more specific, at the time of data transmission, the conversion unit 184 converts the Rx data supplied from the control section (CPU) of the sink device into a differential signal, supplies one of the part signals making up the differential signal obtained by this conversion to the switch 185, and supplies the other part signal to the control unit 186. The switch 185 and the control unit 186 transmit the part signals supplied from the conversion unit 184 to the source device via the SDA line 191 and the SCL line 192. Consequently, the differential signal corresponding to Rx data is transmitted from the sink device to the source device.

At the time of data reception, the decoding unit 136 receives the differential signal corresponding to Tx data transmitted from the source device. To be more specific, the switch 135 receives the part signal of the differential signal corresponding to Tx data transmitted from the source device via the CEC line 84 and supplies the received part signal to the decoding unit 136. The decoding unit 136 decodes the differential signal made up of the part signal supplied from the switch 135 and the part signal supplied from the source device via the reserved line 88 into the Tx data that is the original data and outputs the Tx data to the control section (CPU).

Consequently, the sink device transmits and receives various data, such as control data, pixel data, and audio data, with the source device.

If no channel information is found received in step S115, then the sink device transmits and receives CEC signals in step S119 to carry out bidirectional communication with the source device, upon which the communication processing comes to an end.

Thus, upon reception of the channel information, the sink device carries out full-duplex communication with the sink device by use of the CEC line 84 and the reserved line 88 and the SDA line 191 and the SCL line 192.

As described above, carrying out the full-duplex communication based on the CEC line 84 and the reserved line 88 and the SDA line 191 and the SCL line 192 with the source device by selecting the data to be transmitted and received by setting the switch 135, the switch 185, and the switch 186 allows high-speed bidirectional communication while maintaining the compatibility with the HDMI of the past.

It should be noted that, in the example shown in FIG. 22, the source device has the configuration in which the conversion unit 131 is connected to the CEC line 84 and the reserved line 88 and the decoding unit 183 is connected to the CEC line 84 and the reserved line 88; it is also practicable that the decoding unit 183 is connected to the CEC line 84 and the reserved line 88 and the conversion unit 131 is connected to the SDA line 191 and the SCL line 192.

In the above-mentioned case, the switch 181 and the switch 182 are connected to the CEC line 84 and the reserved line 88 and, at the same time, the decoding unit 183 and the switch 133 is connected to the SDA line 191 and, at the same time, the conversion unit 131.

Likewise, with the sink device shown in FIG. 22, the conversion unit 184 may be connected to the CEC line 84 and the reserved line 88 and the decoding unit 136 may be connected to the SDA line 191 and the SCL line 192. In this case, the switch 185 and the switch 186 are connected to the CEC line 84 and the reserved line 88 and, at the same time, the conversion unit 184 and the switch 135 is connected to the SDA line 191 and, at the same time, the decoding unit 136.

In addition, in FIG. 21, the CEC line 84 and the reserved line 88 may be the SDA line 191 and the SCL line 192. Namely, the conversion unit 131 and the decoding unit 132 of the source device and the conversion unit 134 and the decoding unit 136 of the sink device may be connected to the SDA line 191 and the SCL line 192, thereby providing the IP communication based on half-duplex communication between the source device and the sink device. Further, in this case, the reserved line 88 may be used to detect the connection of a new electronic device.

Further, each of the source device and the sink device may have both the functions of executing half-duplex communication and full-duplex communication. In this case, the source device and the sink device can execute the IP communication based on half-duplex communication or full-duplex communication in accordance with the communication functions of a connected electronic device.

Figure 29:
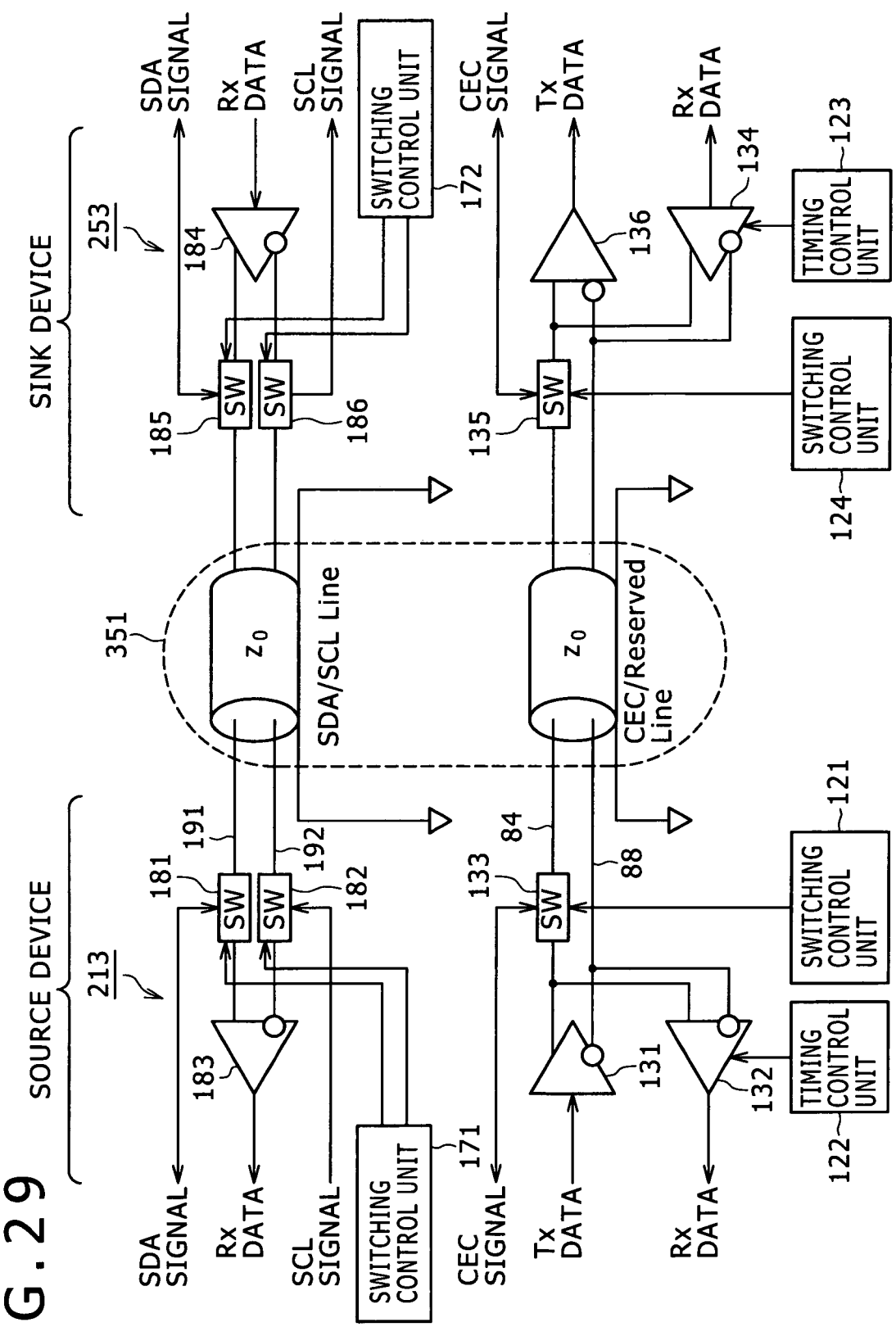
FIG. 29 is a connection diagram illustrating another exemplary configuration of a high-speed data line interface of the personal computer and the television receiver.

If each of the source device and the sink device has both the functions of executing half-duplex communication and full-duplex communication, the source device and the sink device are configured as shown in FIG. 29. It should be noted that, with reference to FIG. 29, components similar to those previously described with reference to FIG. 21 and 22 are denoted by the same reference numerals and the description thereof will be omitted as appropriate.

A high-speed data line interface 213 that is a source device shown in FIG. 29 has a conversion unit 131, a decoding unit 132, a switch 133, a switch 181, a switch 182, a decoding unit 183, a switching control unit 121, a timing control unit 122, and a switching control unit 171. Namely, the high-speed data line interface 213 in the source device shown in FIG. 29 has a configuration in which the timing control unit 122 and the decoding unit 132 shown in FIG. 21 are added to the configuration of the high-speed data line interface 213 in the source device shown in FIG. 22.

Also, the high-speed data line interface 213 that is a source device shown in FIG. 29 has a conversion unit 134, a switch 135, a decoding unit 136, a conversion unit 184, a switch 185, a switch 186, a timing control unit 123, a switching control unit 124, and a switching control unit 172. Namely, the sink device shown in FIG. 29 has a configuration in which the timing control unit 123 and the conversion unit 134 shown in FIG. 21 are added to the sink device shown in FIG. 22.

The following describes communication processing that is carried out by the source device and the sink device shown in FIG. 29.

Figure 30:
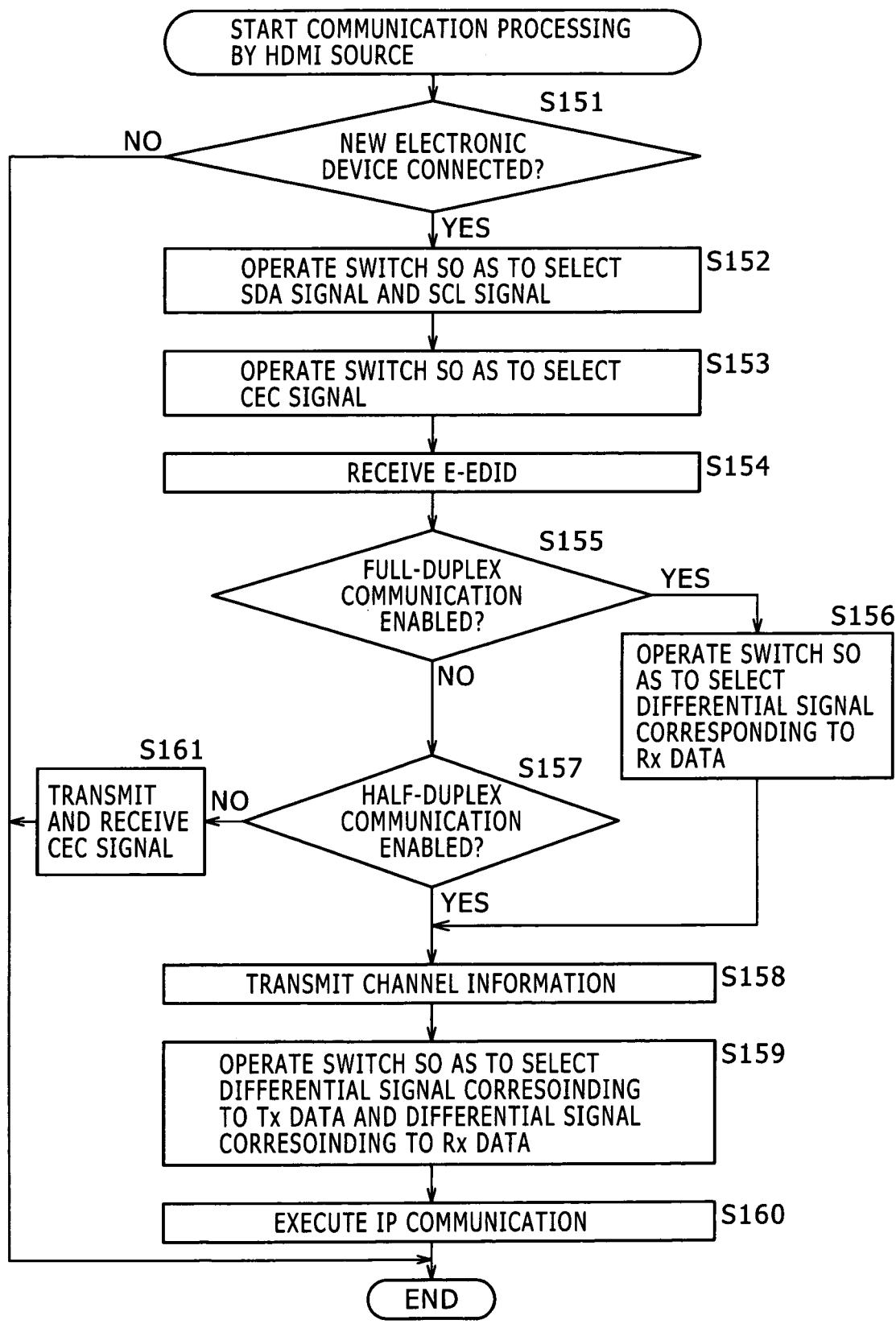
FIG. 30 is a flowchart indicative of communication processing by the source device.

First, communication processing to be executed by the source device shown in FIG. 29 with reference to the flowchart shown in FIG. 30. It should be noted that processes of steps S151 through S154 are substantially the same as those of steps S71 through S74 and therefore description thereof will be omitted.

In step S155, the source device determines whether full-duplex communication is enabled with the sink device. Namely, the source device references E-EDID received from the sink device to determine whether full-duplex flag "Full Duplex" shown in FIG. 22 is set or not.

If full-duplex communication is found enabled in step S155, namely, if the sink device shown in FIG. 29 or 22 is connected to the source device, then the switching control unit 171 controls the switch 181 and the switch 182 in step S156 to select a differential signal corresponding to Rx data from the sink device at the time of data reception.

On the other hand, if full-duplex communication is found not enabled in step S155, then the source device determines in step S157 whether half-duplex communication is enabled or not. To be more specific, the source device references the received E-EDID to determine whether half-duplex flag "Half Duplex" shown in FIG. 22 is set or not. In other words, the source device determines whether the sink device shown in FIG. 21 is connected to the source device.

If half-duplex communication is found enabled in step S157 or if the switch 181 and the switch 182 have been switched in step S156, then the source device transmits channel information to the sink device via the switch 133 and the CEC line 84 in step S158.

If full-duplex communication is found enabled in step S155, it indicates that the sink device has the function of executing full-duplex communication, so that the source device transmits, as channel information, a signal telling that IP communication using the CEC line 84, the reserved line 88 and the SDA line 191 and the SCL line 192 is carried out to the sink device via the switch 133 and the CEC line 84.

If half-duplex communication is found enabled in step S157, it indicates that the sink device does not have the function of carrying out full-duplex communication but has the function of carrying out half-duplex communication, so that the source device transmits a signal telling that IP communication using the CEC line 84 and the reserved line 88 is carried out to the sink device via the switch 133 and the CEC line 84.

In step S159, the switching control unit 121 controls the switch 133 to select a differential signal corresponding to Tx data from the conversion unit 131 at the time of data transmission and select a differential signal corresponding to Rx data transmitted from the sink device at the time of data reception. It should be noted that, if the source device and the sink device carry out full-duplex communication, the differential signal corresponding to Rx data is not transmitted from the sink device via the CEC line 84 and the reserved line 88 at the time of data reception on the source device, so that the differential signal corresponding to Rx signal is not supplied to the decoding unit 132.

In step S160, the source device carries out bidirectional IP communication with the sink device, upon which the communication processing comes to an end. Namely, if the source device carries out full-duplex communication with the sink device and the source device carries out a half-duplex communication, then, at the time of data transmission, the conversion unit 131 converts the Tx data supplied from the control section (CPU) of the source device into a differential signal, transmits one of the part signals making up the differential signal obtained by the conversion to the sink device via the switch 133 and the CEC line 84, and transmits the other part signal to the sink device via the reserved line 88.

If the source device carries out full-duplex communication with the sink device, the decoding unit 183 receives, at the time of data reception, a differential signal corresponding to Rx data transmitted from the sink device and decodes the received differential signal into Rx data that is the original data, outputting the Rx data to the control section (CPU).

If the source device carries out half-duplex communication with the sink device, the decoding unit 132 receives a differential signal corresponding to Rx data transmitted from the sink device under the control of the timing control unit 122 at the time of data reception and decodes the received differential signal into Rx data that is the original data, outputting the Rx data to the control section (CPU).

Consequently, the source device transmits and receives various data, such as control data, pixel data, and audio data, with the sink device.

If half-duplex communication is found not enabled in step S157, then the source device transmits and receives CEC signals via the CEC line 84 in step S161 to carry out bidirectional communication with the sink device, upon which the communication processing comes to an end.

Thus, the source device refers to the full-duplex flag and the half-duplex flag to carry out full-duplex communication or half-duplex communication in accordance with the communication functions of the sink device with which communication is carried out.

Thus, in accordance with the communication functions of the sink device that is the other device of communication, the data to be transmitted and the data to be received are selected by switching the switch 133, the switch 181, and the switch 182 to carry out full-duplex communication or half-duplex communication, thereby allowing the selection of the more optimum communication method to carry out high-speed bidirectional communication while maintaining the compatibility with the HDMI of the past.

Figure 31:
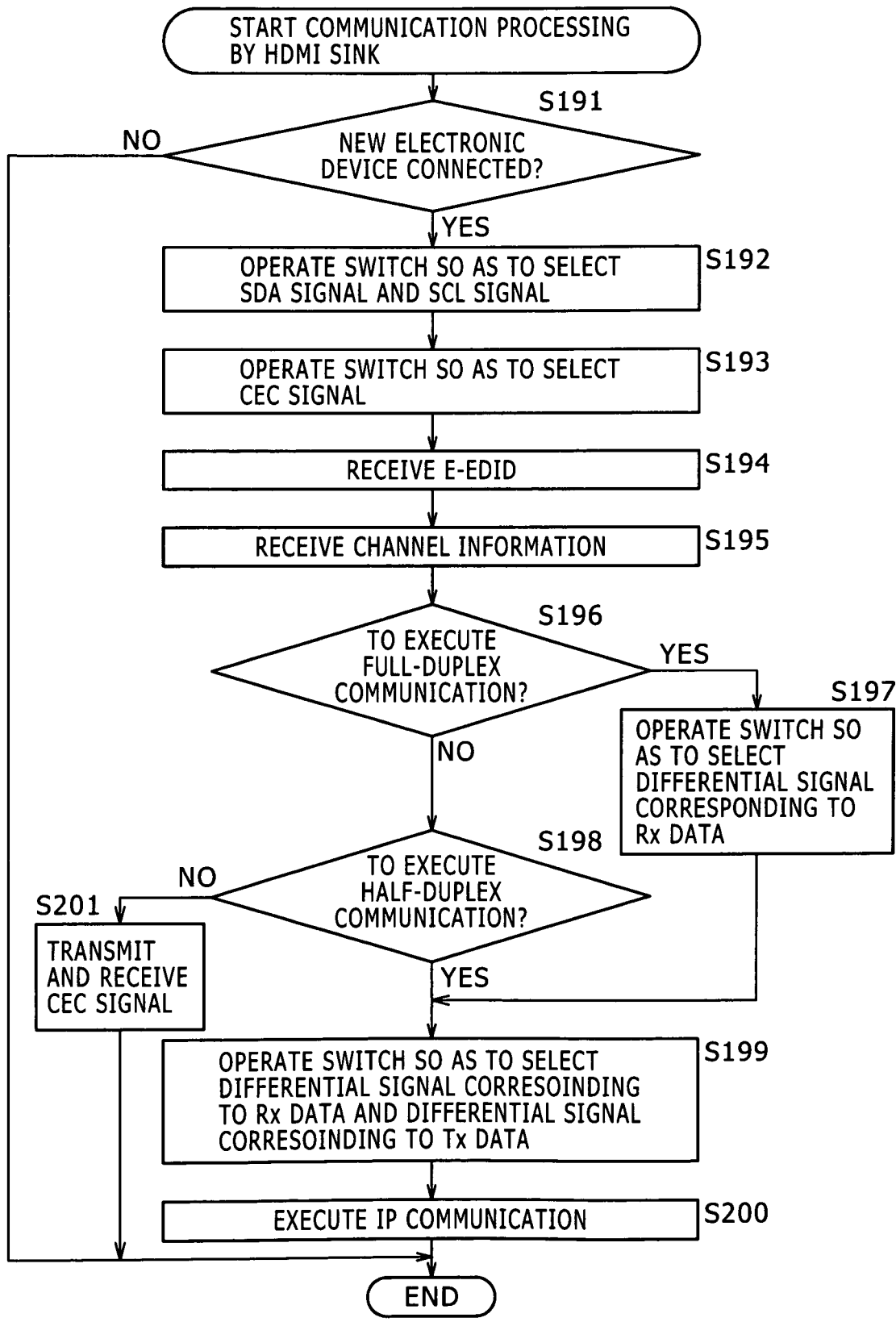
FIG. 31 is a flowchart indicative of communication processing by the sink device.

The following describes communication processing that is carried out by the sink device shown in FIG. 29 with reference to the flowchart shown in FIG. 31. It should be noted that processes of steps S191 through S194 shown in FIG. 29 are substantially the same as those of steps S111 through S114 shown in FIG. 28, so that the description thereof will be omitted.

In step S195, the sink device receives channel information transmitted from the source device via the switch 135 and the CEC line 84. It should be noted that the source device connected to the sink device has none of the full-duplex communication function and the half-duplex communication function, no channel information is transmitted from the source device to the sink device, so that the sink device does not receive channel information.

In step S196, the sink device determines on the basis of the received channel information whether to carry out full-duplex communication or not. For example, if the sink device receives channel information telling that IP communication using the CEC line 84 and the reserved line 88 and the SDA line 191 and the SCL line 192 is carried out, the sink device determines that full-duplex communication is carried out.

If full-duplex communication is found to be carried out in step S196, then the switching control unit 172 controls the switch 185 and the switch 186 in step S197 to select a differential signal corresponding to Rx data transmitted from the conversion unit 184 at the time of data reception, thereby switching the switch 185 and the switch 186.

If full-duplex communication is found not to be carried out in step S196, then the sink device determines in step S198 on the basis of the received channel information whether to carry out half-duplex communication or not. For example, if the sink device receives channel information telling that IP communication using the CEC line 84 and the reserved line 88 is executed, the sink device determines that half-duplex communication is executed.

If half-duplex communication is found in step S198 to be carried out or if the switch 185 and the switch 186 are switched in step S197, then the switching control unit 124 controls the switch 135 in step S199 to select a differential signal corresponding to Rx data from the conversion unit 134 at the time of data transmission and select a differential signal corresponding to Tx data from the source device at the time of data reception.

It should be noted that, when the source device and the sink device carry out full-duplex communication, no differential signal corresponding to Rx data is not transmitted from the conversion unit 134 to the transmitter 81 at the time of data transmission on the sink device, so that no differential signal corresponding to Rx data is supplied to the switch 135.

In step S200, the sink device carries out bidirectional IP communication with the source device, upon which the communication processing comes to an end.

To be more specific, when the sink device carries out full-duplex communication with the source device, the conversion unit 184 converts Rx data supplied from the control section (CPU) of the sink device into a differential signal at the time of data transmission, transmits one of the part signal making up the differential signal to the source device via the switch 185 and the SDA line 191, and transmits the other part signal to the source device via the switch 186 and the SCL line 192.

If the sink device carries out half-duplex communication with the source device, the conversion unit 134 converts Rx data supplied from the control section (CPU) of the sink device into a differential signal, transmits one of the part signals making up the differential signal to the transmitter 81 via the switch 135 and the CEC line 84, and transmits the other part signal to the source device via the reserved line 88.

Further, when the sink device carries out full-duplex communication and half-duplex communication with the source device, the decoding unit 136 receives a differential signal corresponding to Tx data transmitted from the source device at the time of data reception and decodes the received differential signal into Tx data that is the original data, outputting the Tx data to the control section (CPU).

If half-duplex communication is found not to be executed in step S198, namely, if no channel information is transmitted, then the sink device executes bidirectional communication with the source device in step S201 by transmitting and receiving CEC signals, upon which the communication processing comes to an end.

Thus, the sink device carries out full-duplex communication or half-duplex communication in accordance with the communication capability of the source device that is the other device of communication in accordance with the received channel information.

As described above, carrying out the full-duplex communication or half-duplex communication by selecting data to be transmitted and data to be received by switching the switch 135, the switch 185, and the switch 186 in accordance with the communication functions of the source device that is the other device of communication allows high-speed bidirectional communication by selecting the more optimum communication method while maintaining the compatibility with the HDMI of the past.

Also, interconnecting the source device and the sink device with an HDMI cable 351 containing the CEC line 84 and the reserved line 88 mutually differential twisted pair connected and shielded and connected to the ground line and the SDA line 191 and the SCL line 192 mutually differential twisted pair connected and shielded and connected to the ground line allows the high-speed bidirectional IP communication based on half-duplex communication or full-duplex communication while maintaining the compatibility with the HDMI cable of the past.

The above-mentioned sequence of processing operations may be executed by software as well as dedicated hardware. When the above-mentioned sequence of processing operations is executed by software, the programs constituting the software are installed in a microcomputer or the like that controls each of the source device and the sink device, for example.

Figure 32:
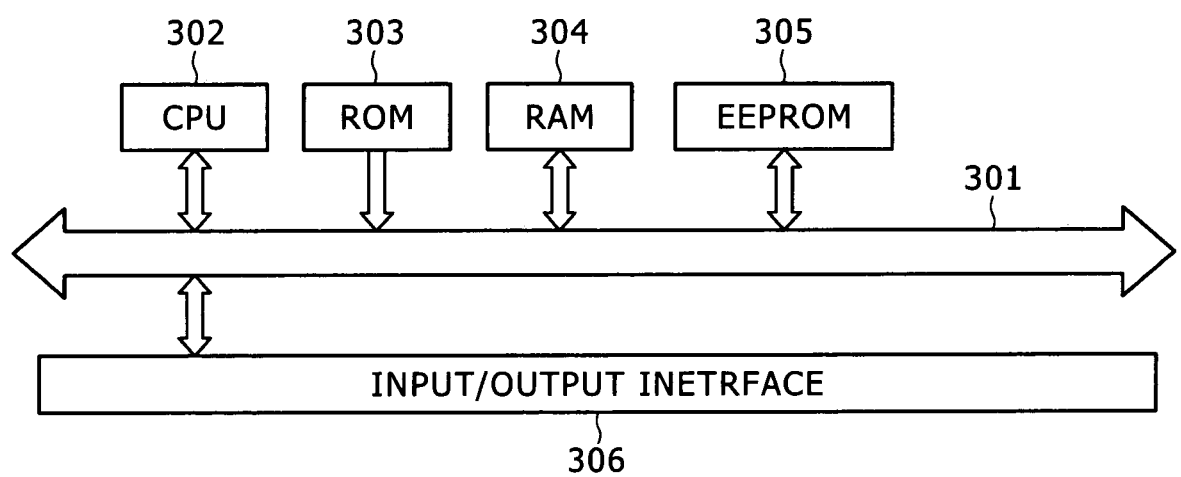
FIG. 32 is a block diagram illustrating an exemplary configuration of a computer to which the present invention is applied.

Now, FIG. 32 shows an exemplary configuration of a computer practiced as one embodiment of the invention on which a program for executing the above-mentioned series of processing operations is installed.

The above-mentioned program can be stored in an EEPROM (Electrically Erasable Programmable Read-Only Memory) 305 or a ROM 303 in advance that provides a recording media built in the computer.

Alternatively, the above-mentioned program can be stored (or recorded) in any of removable recording media, such as a flexible disc, a CD-ROM (Compact Disc Read Only Memory), an MO (Magneto Optical) disc, a DVD (Digital Versatile Disc), a magnetic disc, and a semiconductor memory in a temporary or permanent manner. This removable recording media can be provided as so-called packaged software.

It should be noted that that, in addition to the installation from removable recording media such as mentioned above into a computer, programs may be downloaded from a download site into a computer in a wireless manner or via a network such as LAN (Local Area Network) or the Internet in a wired manner. The computer can receive, by an input/output interface 306, the program transmitted as above and installed the received program into the incorporated EEPROM 305.

The computer incorporates a CPU (Central Processing Unit) 302. The CPU 302 is connected with the input/output interface 306 via a bus 301. The CPU 302 loads the program from the ROM 303 or the EEPROM 305 into a RAM (Random Access Memory) 304 for execution. Consequently, the CPU 302 executes the processing specified by the above-mentioned flowcharts or the processing to be executed by the configurations described in the above-mentioned block diagrams.

It should be noted herein that the steps for describing each program recorded in recording media include not only the processing operations which are sequentially executed in a time-dependent manner but also the processing operations which are executed concurrently or discretely. It should also be noted that the program may be one that is executed by one unit of computer or by two or more units of computer in a distributed processing manner.

The above-mentioned exemplary configuration shown in FIG. 10 allows the forming of a circuit for LAN communication regardless of the electrical specifications defined with respect to DDC. It should be noted that FIG. 33 shows another configuration that provides substantially the same effects as the configuration shown in FIG. 10.

Figure 33:
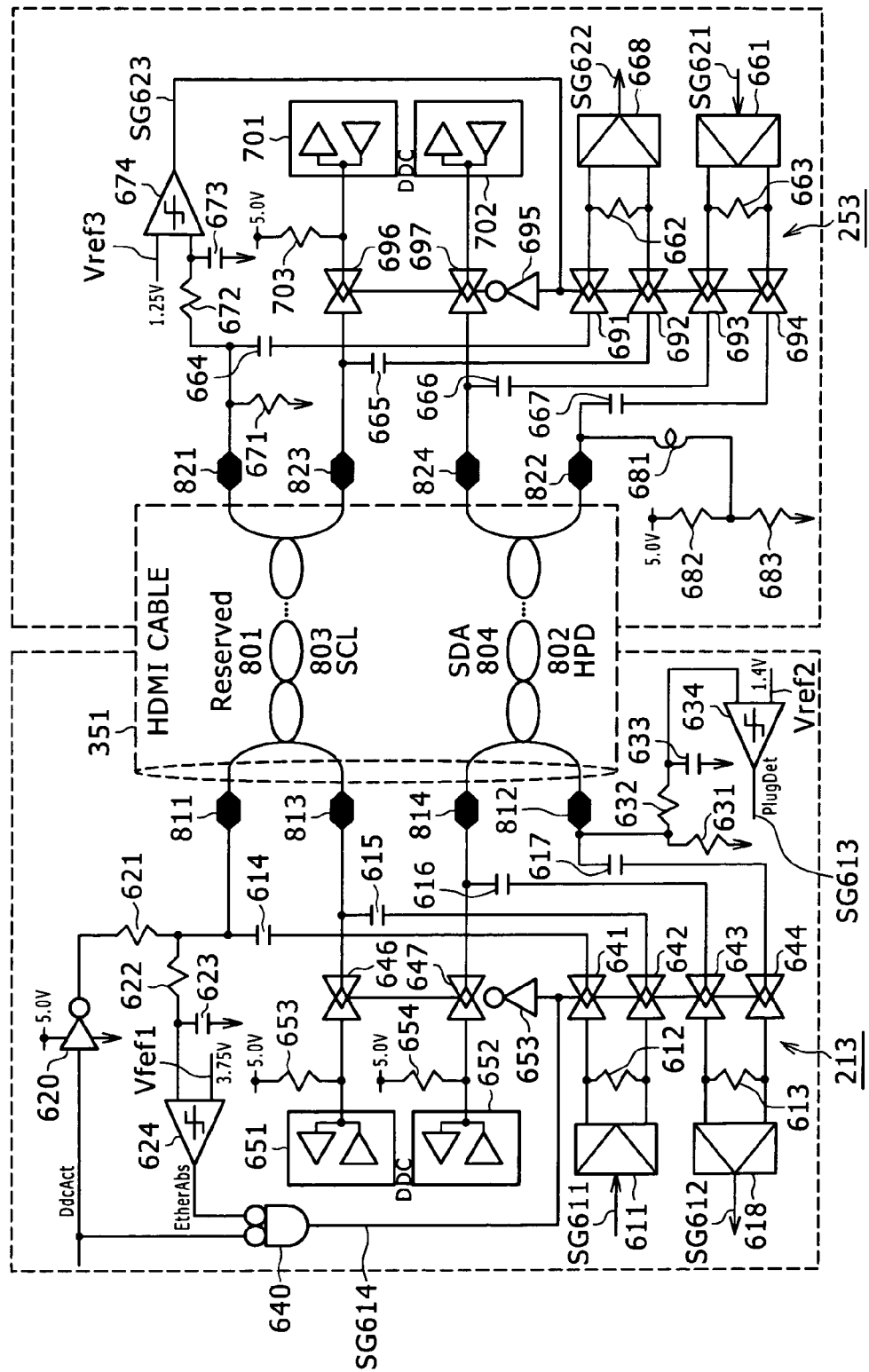
FIG. 33 is a connection diagram illustrating still another exemplary configuration of a high-speed data line interface of the personal computer and the television receiver.

With the exemplary configuration shown in FIG. 33, in an interface for executing video and audio data transmission, exchange and authentication of connected device information, device control data communication, and LAN communication by one cable, the LAN communication is executed unidirectionally via two pairs of differential transmission paths and the status of interface connection is notified by the DC bias potential of at least one of the transmission paths. At the same time, in this interface, at least two transmission paths are used for the exchange and authentication of connected device information in a time division manner with the LAN communication.

A source device has a LAN signal transmission circuit 611, terminal resistors 612, 613, AC coupling capacitors 614 through 617, a LAN signal reception circuit 618, an inverter 620, a resistor 621, a resistor 622 and a capacitor 623 that form a lowpass filter, a comparator 624, a pulldown resistor 631, a resistor 632 and a capacitor 633 that form a lowpass filter, a comparator 634, a NOR gate 640, analog switches 641 through 644, an inverter 645, analog switches 646, 747, DDC transceivers 651, 652, and pullup resistors 653, 654.

A sink device 602 has a LAN signal transmission circuit 661, terminal resistors 662, 663, AC coupling capacitors 664 through 667, a LAN signal reception circuit 668, a pulldown resistor 671, a resistor 672 and capacitor 673 that form a lowpass filter, a comparator 674, a choke coil 681, resistors 682, 683 series connected between power supply potential and reference potential, analog switches 691 through 694, an inverter 695, analog switches 696, 697, DDC transceivers 701, 702, and pullup resistors 703, 704.

The HDMI cable 351 contains a differential transmission path composed of a reserved line 801 and an SCL line 803 and a differential transmission path composed of an SDA line 804 and an HPD line 802 and source-side terminals 811 through 814 and sink-side terminals 821 through 824 of these differential transmission paths are formed.

The reserved line 801 and the SCL line 803 are connected as a differential twisted pair and the SDA line 804 and the HPD line 802 are connected as a differential twisted pair.

In the source device, the terminals 811 and 813 are connected to the transmission circuit 611 for transmitting a LAN transmission signal SG611 to the sink and the terminal resistor 612 via the AC coupling capacitors 614, 615 and analog switches 641, 642, respectively. The terminals 814 and 814 are connected to the reception circuit 618 for receiving a LAN signal from the sink device and the terminal resistor 613 via the AC coupling capacitors 616, 617 and the analog switches 643, 644, respectively.

In the sink device, the terminals 821 through 824 are connected to the transmission circuit 661 and the reception circuit 668 and the terminal resistors 662, 663 via the AC coupling capacitors 664, 665, 666, 667 and the analog switches 691 through 694, respectively. The analog switches 641 through 644, 691 through 694 conduct when LAN communication is carried out and open when DDC communication is carried out.

The source device connects the terminal 813 and the terminal 814 to the DDC transceivers 651, 652 and the pullup resistors 653, 654 via other analog switches 646, 647, respectively.

The sink device connects the terminal 823 and the terminal 824 to the DDC transceivers 791, 702 and the pullup resistor 703 via the analog switches 696, 697. The analog switches 646, 647 conduct when DDC communication is carried out and open when LAN communication is carried out.

A mechanism for recognizing e-HDMI compliant devices by means of the potential of the reserved line 801 is basically the same as the mechanism illustrated in FIG. 9 except the resistor 62 of the source device 601 is driven by the inverter 620.

When the input of the inverter 620 is High, the resistor 621 becomes a pulldown resistor, so that, when viewed from the sink device, the source device gets in the same 0 V status as when an e-HDMI non-compliant device is connected. As a result, signal SG623 indicative of an e-HDMI compliance identification result of the sink device goes Low, upon which the analog switches 691 through 694 controlled by the signal SG623 are opened and the analog switches 696, 697 controlled by a signal obtained by inverting the signal SG623 by the inverter 695 conduct. Consequently, the sink device 602 disconnects the SCL line 803 and the SDA line 804 from the LAN transceiver, connecting to the DDC transceiver.

On the other hand, in the source device, the input of the inverter 620 is also entered in a NOR gate 640 and output SG614 thereof goes Low. Analog switches 641 through 644 controlled by output signal SG614 of the NOR gate 640 are opened and analog switches 646, 647 controlled by a signal obtained by inverting signal SG614 by the inverter 645 conduct. As a result, the source device 601 also disconnects the SCL line 803 and the SDA line 804 from the LAN transceiver, connecting to the DDC transceiver.

Conversely, when the input of the inverter 620 is Low, then both the source device and the sink device disconnect the SCL line 803 and the SDA line 804 from the DDC transceiver, connected to the LAN transceiver.

Circuits 631 through 634, 681 through 683 for the confirmation of connection by the DC bias potential of the HPD line 802 have substantially the same functions as the example shown in FIG. 10. To be more specific, the HPD line 802 transmits, to the source device, information indicative that the cable 351 has been connected to the sink device at DC bias level in addition to the above-mentioned LAN communication. The resistors 682, 683 and the choke coil 681 in the sink device bias the HPD line 802 to approximately 4 V via the terminal 822 when the cable 351 is connected to the sink device.

The source device extracts the DC bias of the HPD line 802 by a lowpass filter composed of the resistor 632 and the capacitor 633 and compares the extracted DC bias with reference potential Vref2 (1.4 V for example) by the comparator 634. If the cable 351 is not connected to the sink device, the potential of the terminal 812 is lower than reference potential Vref2 by the pulldown resistor 631; if the cable 351 is connected to the sink device, this potential is higher than reference potential. Therefore, if output signal SG613 of the comparator 634 is High, it indicates that the cable 351 is connected to the sink device. On the other hand, if the output signal SG613 of the comparator 634 is Low, it indicates that the cable 351 is not connected to the sink device.

As described above and according to the exemplary configuration shown in FIG. 33, in an interface where the transmission of video and audio data, the exchange and authentication of connected device information, the communication of device control data, and LAN communication are carried out with one cable, the LAN communication is executed in unidirectional communication via two pairs of differential transmission paths, an interface connection status is notified by the DC bias potential of at least one of these transmission paths, and at least two transmission paths are used for the communication of the exchange and authentication of connected device information in a time division manner with LAN communication. Consequently, this novel configuration allows the execution of time division processing for providing a time zone in which the SCL line and the SDA line are connected to the LAN communication circuit and a time zone in which the SCL line and the SDA line are connected to the DDC circuit. This time division can form a circuit for LAN communication regardless of the electrical specifications defined for DDC, thereby realizing a stabilized, certain, and low-cost LAN communication.

It should be noted that SDA and SCL execute communication with H being 1.5 KΩ pullup and L being low impedance and CEC also executes communication with H being 27 KΩ pullup and L being low impedance. In order to maintain the compatibility with the existing HDMI, holding these functions may make it difficult to share the LAN function for high-speed data communication that requires the matched termination of each transmission path.

The exemplary configurations shown in FIGS. 10 and 33 can avoid these problems. To be more specific, in the exemplary configuration shown in FIG. 10, instead of using the SDA, SCL, and CEC lines, full-duplex communication is executed based on one-pair bidirectional communication with the reserved line and the HPD line made a differential pair. In the exemplary configuration shown in FIG. 33, two-pair full-duplex communication is executed based on unidirectional communication by making two differential pairs with the HPD line and the SDA line and with the SCL line and the reserved line.

FIGS. 34A through 34E illustrate bidirectional communication waveforms in the exemplary configuration shown in FIG. 10 or FIG. 33.

FIG. 34A shows a signal waveform transmitted from the source device; FIG. 34B shows a signal waveform received by the sink device; FIG. 34C shows a signal waveform that passes through the cable; FIG. 34D shows a signal waveform received by the source device; and FIG. 34E shows a signal waveform transmitted from the source device. As seen from these figures, according to the exemplary configuration shown in FIG. 10 or FIG. 33, good bidirectional communication can be realized.

It should be noted that, in the above-mentioned embodiments of the invention, HDMI interfaces are presumed as the transmission paths interconnecting the above-mentioned devices; however, it is also practicable to use any other like transmission standards. In the above-mentioned embodiments of the invention, a personal computer and a digital camera are used for the source device and a television receiver is used for the sink device; the above-mentioned embodiments of the invention are also practicable to any other configurations of the source and sink devices.

In the above-mentioned embodiments of the invention, the electronic devices are interconnected with HDMI cables; it is also practicable to provide this interconnection in a wireless manner.

The above-mentioned embodiments of the invention allows the effective use of the image analysis capabilities of personal computers, for example, and are applicable to AV systems in which a personal computer is connected to a television receiver via an HDMI cable.

While preferred embodiments of the present invention have been described using specific terms, such description is for illustrative purpose only, and it is to be understood that changes and variations may be made without departing from the spirit or scope of the following claims.

What is claimed is:

1. An electronic device, comprising:
a signal transmission section configured to transmit a video signal to an external device in a differential signal via a transmission path over a plurality of channels;
a communication section configured to execute bidirectional communication using a predetermined line constituting said transmission path;
a signal reception section configured to receive stream data received from said external device through said communication section, said stream data having been obtained by a broadcast reception section of said external device;
an image analysis section configured to execute image analysis on said stream data received by said signal reception section; and
a control section configured to control an operation of at least one of own electronic device and said external device on the basis of a result of analysis obtained by said image analysis section,
wherein while a first channel is a reception channel of said broadcast reception section of said external device, said image analysis section detects a start and an end of a commercial carried on the first channel based on said image analysis of the first channel, and said control section executes control such that a channel index screen is displayed on said external device during a duration of time between the start and the end of the commercial on the first channel to suppress display of commercials on the reception channel of said broadcast reception section of said external device, the index being a list or an index of channel images, and
a recording section configured to record said stream data received by said signal reception section to a predetermined recording media,
wherein said image analysis section executes one of ticker recognition and face recognition on the basis of the image analysis and
said control section adds a result of one of said ticker recognition and said face recognition to said stream data received by said signal reception section when said stream data is recorded by said recording section.

2. The electronic device according to claim 1, further comprising:

a reproduction section configured to reproduce said stream data recorded to said predetermined recording media; and
a reproduction control section configured to control a reproducing operation by said reproduction section on the basis of a result of one of said ticker recognition and said face recognition attached to said stream data.

3. The electronic device according to claim 1, wherein said control section switches the reception channel of said broadcast reception section of said external device from the first channel to another channel during a duration of time between said start and said end of said commercial.

4. The electronic device according to claim 1, wherein said control section executes control such that reception channels of said broadcast reception section of said external device sequentially change during a duration of time between said start and said end of said commercial.

5. The electronic device according to claim 1, wherein said image analysis section detects one of a particular subject and a particular scene and said control section executes control such that said external device is powered on upon detection of one of said particular subject and said particular scene.

6. A control method in an electronic device having a signal transmission section for transmitting a video signal to an external device in a differential signal via a transmission path over a plurality of channels, the method comprising:
arranging a communication section for executing bidirectional communication using a predetermined line constituting said transmission path;
receiving stream data received from said external device through said communication section, said stream data having been obtained by said broadcast reception section of said external device;
executing image analysis on said received stream data; and
controlling an operation of at least one of an operation of own electronic device and an operation of said external device on the basis of a result of analysis obtained by said image analysis section,
wherein while a first channel is a reception channel of said broadcast reception section of said external device, said image analysis detects a start and an end of a commercial carried on the first channel based on said image analysis for the first channel, and said controlling step includes executing control such that a channel index screen is displayed on said external device during a duration of time between the start and the end of the commercial on the first channel to suppress display of commercials on the reception channel of said broadcast reception section of said external device, the index being a list or an index of channel images, and
recording the received stream data to a predetermined recording media,
wherein the image analysis includes executing one of ticker recognition and face recognition based on the image analysis, and the controlling step includes adding a result of one of the ticker recognition and the face recognition to the received stream data when the stream data is recorded.

7. The control method according to claim 6, further comprising:
reproducing the stream data recorded to the predetermined recording media; and
controlling the reproducing step based on a result of one of the ticker recognition and the face recognition attached to said stream data.

8. The control method according to claim 6, wherein the controlling step includes switching the reception channel of the broadcast reception section of the external device from the first channel to another channel during a duration of time between the start and the end of the commercial.

9. The control method according to claim 6, wherein the controlling step includes executing control such that reception channels of the broadcast reception section of the external device sequentially change during a duration of time between the start and the end of the commercial.

10. The control method according to claim 6, wherein the image analysis includes detecting one of a particular subject and a particular scene and the controlling step includes executing control such that the external device is powered on upon detection of one of the particular subject and the particular scene.

11. An electronic device, comprising:
    signal transmission means for transmitting a video signal to an external device in a differential signal via a transmission path over a plurality of channels;
    communication means for executing bidirectional communication using a predetermined line constituting said transmission path;
    signal reception means for receiving stream data received from said external device through said communication means, said stream data having been obtained by a broadcast reception means of said external device;
    image analysis means for executing image analysis on said stream data received by said signal reception means; and
    control means for controlling an operation of at least one of own electronic device and said external device on the basis of a result of analysis obtained by said image analysis means,
    wherein while a first channel is a reception channel of said broadcast reception section of said external device, said image analysis means detects a start and an end of a commercial carried on the first channel based on said image analysis of the first channel, and said control means executes control such that a channel index screen is displayed on said external device during a duration of time between the start and the end of the commercial on the first channel to suppress display of commercials on the reception channel of said broadcast reception section of said external device, the index being a list or an index of channel images, and
    recording means for recording said stream data received by the signal reception means to a predetermined recording media,
    wherein the image analysis means executes one of ticker recognition and face recognition based on the image analysis, and the control means adds a result of one of the ticker recognition and the face recognition to the stream data received by said signal reception means when the stream data is recorded by the recording means.

12. The electronic device according to claim 11, further comprising:
    reproduction means for reproducing the stream data recorded to the predetermined recording media; and
    reproduction control means for controlling a reproducing operation by the reproduction means based on a result of one of the ticker recognition and the face recognition attached to the stream data.

13. The electronic device according to claim 11, wherein the control means switches the reception channel of the broadcast reception means of the external device from the first channel to another channel during a duration of time between the start and the end of the commercial.

14. The electronic device according to claim 11, wherein the control means executes control such that reception channels of the broadcast reception means of the external device sequentially change during a duration of time between the start and the end of the commercial.

15. The electronic device according to claim 11, wherein the image analysis means detects one of a particular subject and a particular scene and the control means executes control such that the external device is powered on upon detection of one of the particular subject and the particular scene.

* * * * *